US012555340B2

(12) United States Patent
Baba

(10) Patent No.: US 12,555,340 B2
(45) Date of Patent: Feb. 17, 2026

(54) STORAGE MEDIUM, METHOD, AND INFORMATION PROCESSING APPARATUS

(71) Applicant: COLOPL, Inc., Tokyo (JP)

(72) Inventor: Naruatsu Baba, Tokyo (JP)

(73) Assignee: COLOPL, Inc., Tokyo (JP)

( * ) Notice: Subject to any disclaimer, the term of this patent is extended or adjusted under 35 U.S.C. 154(b) by 232 days.

(21) Appl. No.: 18/470,461

(22) Filed: Sep. 20, 2023

(65) Prior Publication Data

US 2024/0013502 A1   Jan. 11, 2024

Related U.S. Application Data

(63) Continuation of application No. PCT/JP2022/008305, filed on Feb. 28, 2022.

(30) Foreign Application Priority Data

Mar. 23, 2021   (JP) .................................. 2021-048436

(51) Int. Cl.
 *G06T 19/20* (2011.01)
 *A63F 13/30* (2014.01)
 (Continued)

(52) U.S. Cl.
 CPC .............. *G06T 19/20* (2013.01); *G06T 13/40* (2013.01); *H04N 21/2187* (2013.01);
 (Continued)

(58) Field of Classification Search
 CPC . G06T 19/20; G06T 13/40; G06T 2219/2004; H04N 21/2187; A63F 13/30;
 (Continued)

(56) References Cited

U.S. PATENT DOCUMENTS 8,892,999 B2 * 11/2014 Nims ..................... G16H 40/67
 705/28
2007/0260984 A1 * 11/2007 Marks ..................... A63F 13/65
 715/706
(Continued)

FOREIGN PATENT DOCUMENTS

JP   2020130592 A   8/2020
JP   2020163040 A   10/2020
(Continued)

OTHER PUBLICATIONS

Extended European Search Report for counterpart European Application No. 22774924.9, issued by the European Patent Office on Feb. 10, 2025.

(Continued)

*Primary Examiner* — YuJang Tswei

(57) ABSTRACT

In a first part, a video in a virtual space where a plurality of types of objects including a character object which moves is arranged is displayed based on first data common among a plurality of computers. In a second part, a video including the character object is displayed based on second data. The second data is data including information for causing the character object to speak for a speech which is transmitted from outside to any one or more computers including a first computer used by a first user, and whose content of the speech is different from that of data transmitted to a second computer used by a second user. A specific object displayed in the first part has a variable display manner. A display manner of the specific object displayed in the second part is a display manner which is varied in the first part.

20 Claims, 32 Drawing Sheets

(51) Int. Cl.

| | |
|---|---|
| *A63F 13/35* | (2014.01) |
| *A63F 13/52* | (2014.01) |
| *A63F 13/54* | (2014.01) |
| *A63F 13/55* | (2014.01) |
| *A63F 13/60* | (2014.01) |
| *A63F 13/69* | (2014.01) |
| *A63F 13/85* | (2014.01) |
| *A63F 13/86* | (2014.01) |
| *A63F 13/87* | (2014.01) |
| *G06F 3/01* | (2006.01) |
| *G06F 3/0481* | (2022.01) |
| *G06F 13/00* | (2006.01) |
| *G06T 13/40* | (2011.01) |
| *H04L 67/00* | (2022.01) |
| *H04N 21/2187* | (2011.01) |

(52) U.S. Cl.
CPC ............... *A63F 13/30* (2014.09); *A63F 13/35* (2014.09); *A63F 13/52* (2014.09); *A63F 13/54* (2014.09); *A63F 13/55* (2014.09); *A63F 13/60* (2014.09); *A63F 13/69* (2014.09); *A63F 13/85* (2014.09); *A63F 13/86* (2014.09); *A63F 13/87* (2014.09); *G06F 3/01* (2013.01); *G06F 3/0481* (2013.01); *G06F 13/00* (2013.01); *G06T 2219/2004* (2013.01); *H04L 67/00* (2013.01)

(58) Field of Classification Search
CPC .......... A63F 13/35; A63F 13/52; A63F 13/54; A63F 13/55; A63F 13/60; A63F 13/69; A63F 13/85; A63F 13/86; A63F 13/87; G06F 3/01; G06F 3/0481; G06F 3/16; G06F 13/00; H04L 67/00
See application file for complete search history.

(56) References Cited

U.S. PATENT DOCUMENTS

| | | | | |
|---|---|---|---|---|
| 2011/0298810 | A1* | 12/2011 | Fuyuno | G06T 13/40 345/474 |
| 2016/0026253 | A1* | 1/2016 | Bradski | H04N 13/128 345/8 |
| 2018/0174347 | A1* | 6/2018 | Chaney | G09G 5/377 |
| 2019/0385613 | A1* | 12/2019 | Mindlin | G10L 17/00 |
| 2020/0306651 | A1* | 10/2020 | Tsukanaka | A63F 13/69 |
| 2020/0413144 | A1* | 12/2020 | Fukuda | H04N 21/4532 |
| 2021/0110424 | A1* | 4/2021 | Endo | G06Q 30/0224 |
| 2022/0297006 | A1 | 9/2022 | Baba | |

FOREIGN PATENT DOCUMENTS

| | | |
|---|---|---|
| JP | 6818106 B1 | 1/2021 |
| JP | 2021035454 A | 3/2021 |

OTHER PUBLICATIONS

Office Action issued for counterpart Japanese Application No. 2021-048436, transmitted from the Japanese Patent Office on Mar. 11, 2025 (drafted on Feb. 21, 2025).

Here are some words that really hit home for Vtuber otaku. Oreteki Game News @Jin [online], Nov. 20, 2020, [Retrieved Feb. 21, 2025], http://jin115.com/archives/52305840.html.

Mitsuo Okada, Donate 20 million yen to become a prostitute! The dark side of live streaming services turning into host clubs, Diamond Online [online], Jan. 22, 2019, [Retrieved Feb. 21, 2025], https://diamond.jp/articles/-/191257.

Things to be careful of when receiving gifts from customers, Cabaret hostess rental information, Cabachin, [online], Jun. 4, 2020, [Retrieved Feb. 21, 2025], http://cabachin.com/contents/12104/.

Ami Tokito is happy with the present from her friend, the taste is excellent and I'm really happy., Abema Times [online], Oct. 19, 2019, [Retrieved Feb. 21, 2025], https://times.abema.tv/articles/-/7024631?page=1.

After giving children's clothes as a gift, would you be happy to receive a photo of your child wearing the clothes? Or would you find it annoying? Yahoo! Answers [online], Sep. 24, 2014, [Retrieved Feb. 21, 2025], https://detail.chiebukuro.yahoo.co.jp/qa/questionion_detail/q10135987675.

GF, What is the secret behind the cuteness of the popular virtual beautiful girl "Megu Shinonome"?, [online], Mar. 6, 2018, MoguLive, [searched on Feb. 19, 2019], the Internet <https://www.moguravr.com/shinonome-megu/>.

International Search Report and Written Opinion (ISA/237) of the International Search Authority for International Patent Application No. PCT/JP2022/008305, mailed by the Japan Patent Office on Apr. 5, 2022.

* cited by examiner

| USER | TAG |
|---|---|
| A A A A A | MAGAZINE, 10 F, BOSS,<br>"BEAT THE BOSS THANKS TO THE MAGAZINE GIVEN AS A PRESENT" |
| B B B B B | FIRST AID KIT, 3 F, MINOR VILLAIN,<br>"RECOVERED ON THE BRINK OF GAME OVER" |
| C C C C C | BARRICADE, 5 F, MINOR VILLAIN,<br>"STOPPED TWO ZOMBIES BY THE BARRICADE" |
| : | : |

FIG.16

DISPLAY SCREEN EXAMPLE IN USER TERMINAL DURING LIVE STREAM PART (FIRST PART)

(A)

(B) USER A

INPUT

NO INPUT (C) OTHER USERS

DISPLAY SCREEN EXAMPLE DURING PLAYBACK PART (SECOND PART)
OF INDIVIDUAL MESSAGE IN USER TERMINAL (A) LIST OF INDIVIDUAL MESSAGES TO USER A (B) INDIVIDUAL MESSAGE PLAYBACK (C) LIST OF INDIVIDUAL MESSAGES TO USER B (D) INDIVIDUAL MESSAGE PLAYBACK

STORAGE MEDIUM, METHOD, AND INFORMATION PROCESSING APPARATUS

The contents of the following patent applications are incorporated herein by reference:
NO. 2021-048436 filed in JP on Mar. 23, 2021, and
NO. PCT/JP2022/008305 filed in WO on Feb. 28, 2022.

BACKGROUND

1. Technical Field

The present disclosure relates to a storage medium, a method, and an information processing apparatus.

2. Related Art

Non-Patent Document 1 discloses a technology for causing a viewer to participate in a live stream distributed by a character.

LIST OF CITED REFERENCE

Non-Patent Document

Non-Patent Document 1: GF, "What is the secret of cuteness of attention-grabbing virtual good-looking girl 'Shinonome Megu'?", [online], Mar. 6, 2018, Mogu-Live, [searched on Feb. 19, 2019], the Internet <https://www.moguravr.com/shinonome-megu/>

A technology in related art has a room to be able to encourage continuous participation in content by a viewer.

The present invention has been devised in view of the above described circumstances, and aims to provide a program, a method, and an information processing apparatus with which continuous engagement into content by a user can be encouraged.

BRIEF DESCRIPTION OF THE DRAWINGS

FIG. 16 illustrates a specific example of a list of users who have participated in a game in accordance with an embodiment.

DESCRIPTION OF EXEMPLARY EMBODIMENTS

A system according to the present disclosure is a system configured to provide a game to a plurality of users. Hereinafter, the system will be described with reference to the drawings. Note that the present invention is not limited to these exemplifications, and all alterations according to the claims which have equivalent meanings and are within a scope of the claims are intended to be included in the present invention. In the following description, a same reference sign is assigned to a same element in the description of the drawings, and a duplicated description will not be repeated.

Operation Overview of System 1

Figure 1:
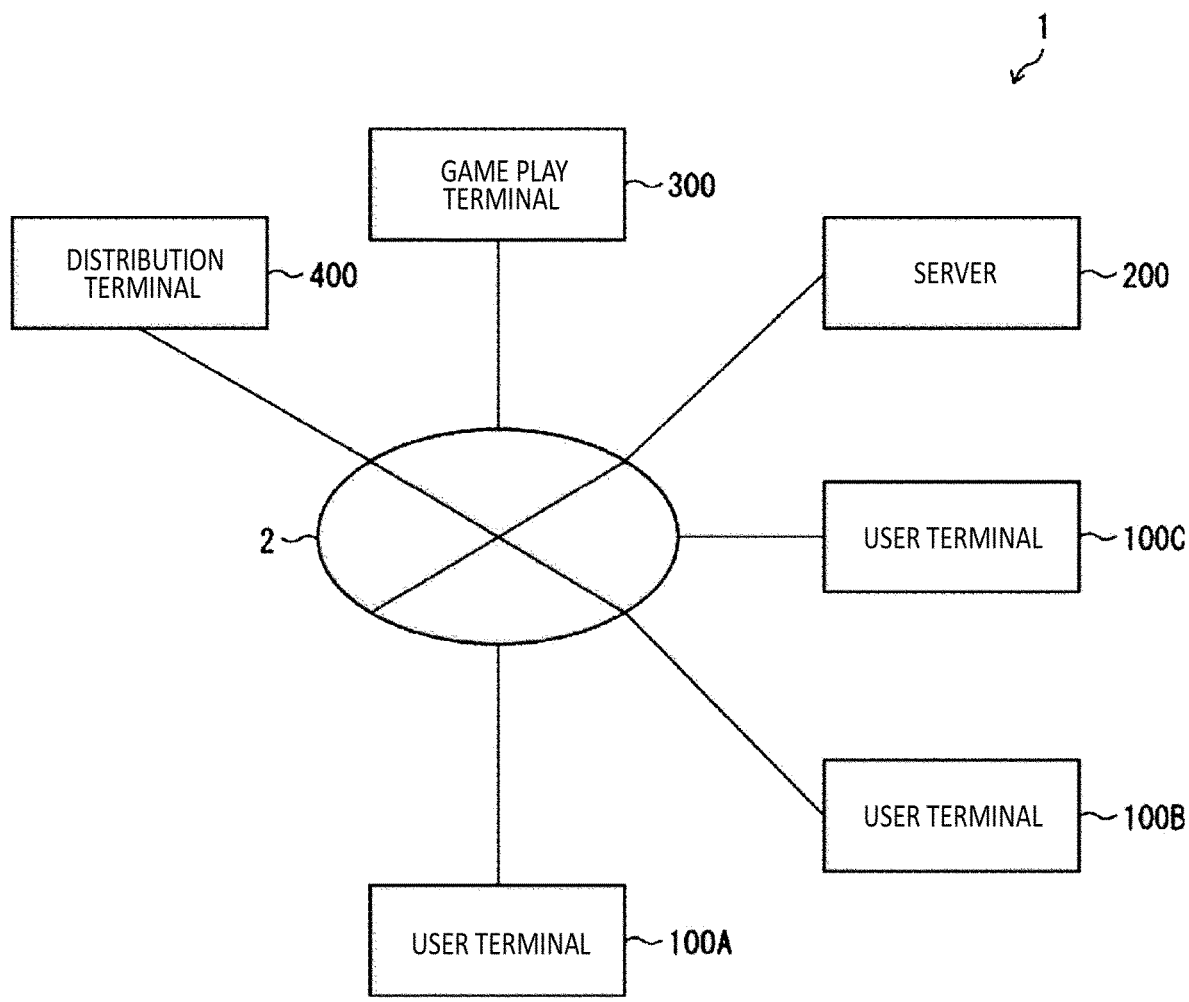
FIG. 1 illustrates an example of a system overview in accordance with an embodiment.

FIG. 1 illustrates an overview of a system 1 according to the present embodiment. The system 1 includes a plurality of user terminals 100 (computers), a server 200, a game play terminal 300 (an external device, a second external device), and a distribution terminal 400 (outside, a first external device). Note that in FIG. 1, user terminals 100A to 100C, in other words, three user terminals 100 are described as an example of the plurality of user terminals 100, but the number of user terminals 100 is not limited to the illustrated example. In addition, according to the present embodiment, when it is not required to distinguish the user terminals 100A to 100C, the user terminals 100A to 100C are referred to as a "user terminal 100" or "user terminals 100". The user terminals 100, the game play terminal 300, and the distribution terminal 400 are connected via the server 200 and a network 2. The network 2 is configured by the Internet and various mobile communication systems and the like constituted by radio base stations which are not illustrated in the drawing. Examples of this mobile communication system include, for example, so-called 3G and 4G mobile communication systems, Long Term Evolution (LTE), a wireless network connectable to the Internet by a predetermined access point (for example, Wi-Fi (registered trademark)), and the like.

Game Overview

According to the present embodiment, as an example of a game provided by the system 1 (hereinafter, the present game), a game mainly played by a user of the game play terminal 300 will be described. Hereinafter, the user of the game play terminal 300 will be referred to as a "player". As an example, by operating a character appearing in the present game, the player (performer) makes progress in the game. In addition, in the present game, a user of the user terminal 100 is responsible to assist the progress in the game by the player. A detail of the present game will be described below. Note that it suffices when the game provided by the system 1 is a game in which a plurality of users participates, and the game is not limited to this example.

Game Play Terminal 300

The game play terminal 300 makes progress in the game according to an input operation by the player. In addition, the game play terminal 300 sequentially distributes information generated by game play of the player (hereinafter, game progress information) to the server 200 in real time.

Server 200

The server 200 transmits, to the user terminal 100, the game progress information received in real time from the game play terminal 300. In addition, the server 200 mediates transmission and reception of various types of information among the user terminal 100, the game play terminal 300, and the distribution terminal 400.

Distribution Terminal 400

The distribution terminal 400 generates movement instruction data according to an input operation by a user of the distribution terminal 400, and distributes the movement instruction data to the user terminal 100 via the server 200. The movement instruction data is data for playing a moving picture in the user terminal 100, and is specifically data for moving a character appearing in the moving picture.

According to the present embodiment, as an example, the user of the distribution terminal 400 is a player of the present game. In addition, as an example, the moving picture to be played based on the movement instruction data in the user terminal 100 is a moving picture in which the character operated by the player in the game carries out a movement. The "movement" refers to moving at least part of a body of the character, and also includes a speech. Thus, the movement instruction data according to the present embodiment includes, for example, audio data for causing the character to speak, and motion data for moving the body of the character.

The movement instruction data is transmitted to the user terminal 100 after an end of the present game as an example. A detail of movement instruction data and a moving picture to be played based on the movement instruction data will be described below.

User Terminal 100

The user terminal 100 receives the game progress information in real time, and generates and displays a game screen by using the information. In other words, the user terminal 100 plays the game screen of the game played by the player by real-time rendering. With this configuration, at almost a same timing as that for the player, the user of the user terminal 100 can visually recognize the game screen that is the same as the game screen visually recognized by the player who is playing the game.

In addition, the user terminal 100 generates information for assisting the progress of the game by the player according to an input operation by the user, and transmits the information to the game play terminal 300 via the server 200. A detail of the information will be described below.

In addition, the user terminal 100 receives movement instruction data from the distribution terminal 400, and generates and plays a moving picture (video) by using the movement instruction data. In other words, the user terminal 100 renders and plays the movement instruction data.

Hardware Configuration of System 1

Figure 2:
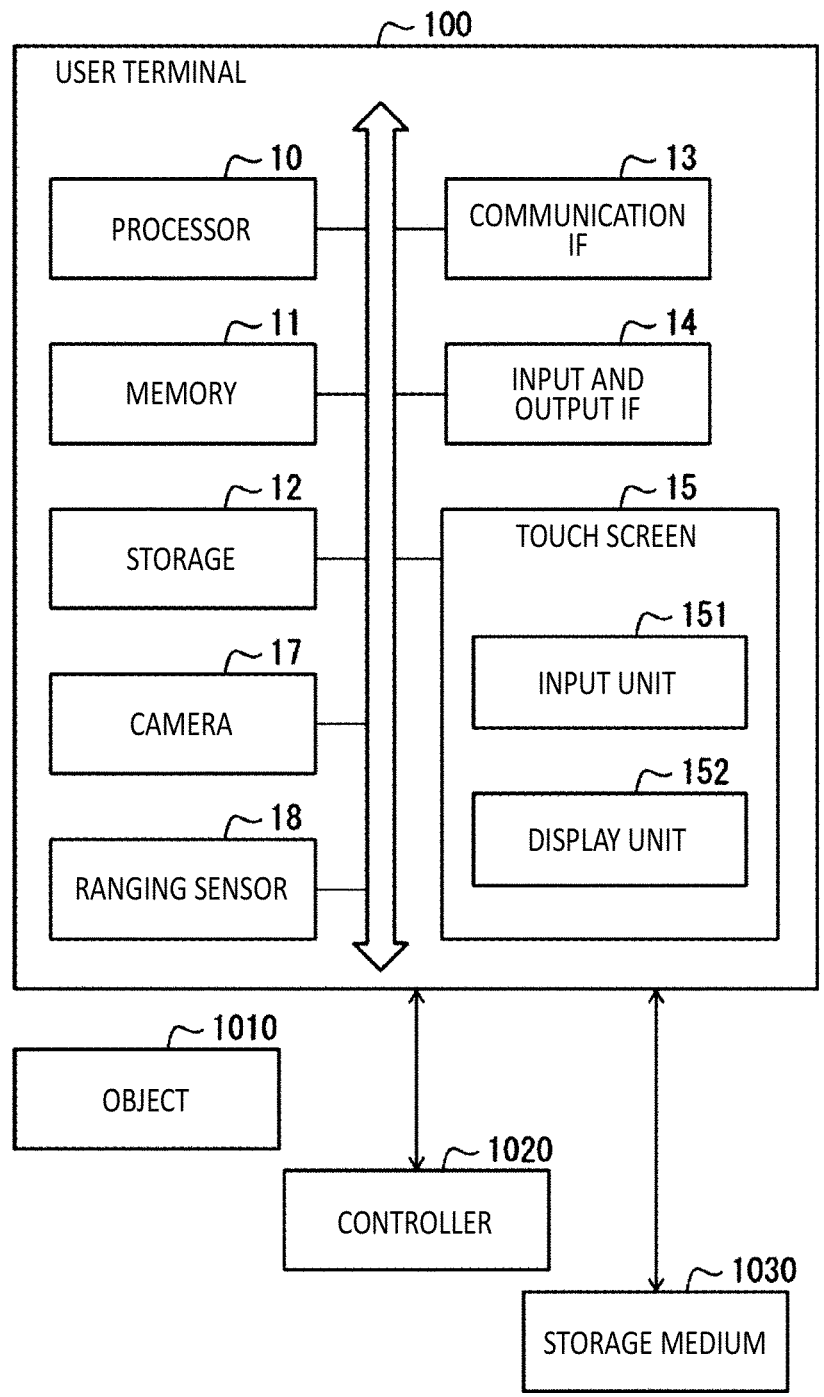
FIG. 2 is a block diagram illustrating an example of a hardware configuration of a user terminal in accordance with an embodiment.
Figure 3:
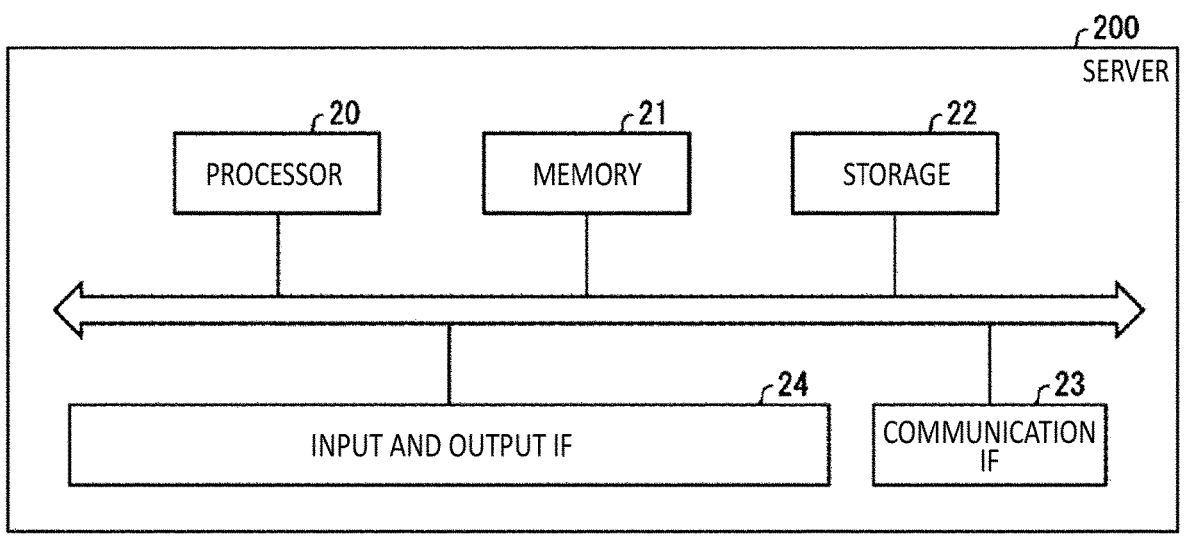
FIG. 3 is a block diagram illustrating an example of a hardware configuration of a server in accordance with an embodiment.
Figure 4:
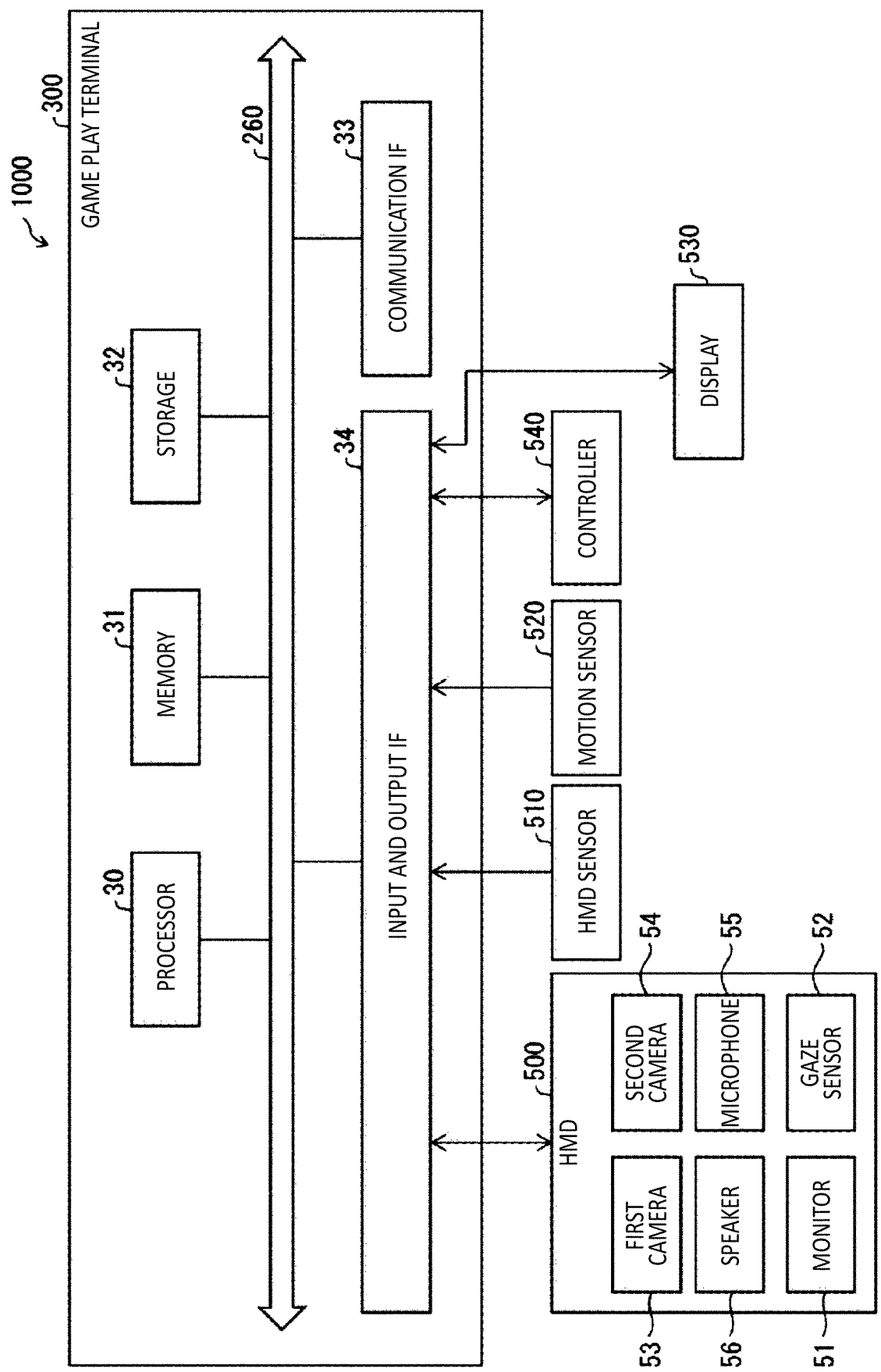
FIG. 4 is a block diagram illustrating an example of a hardware configuration of a game play terminal in accordance with an embodiment.
Figure 5:
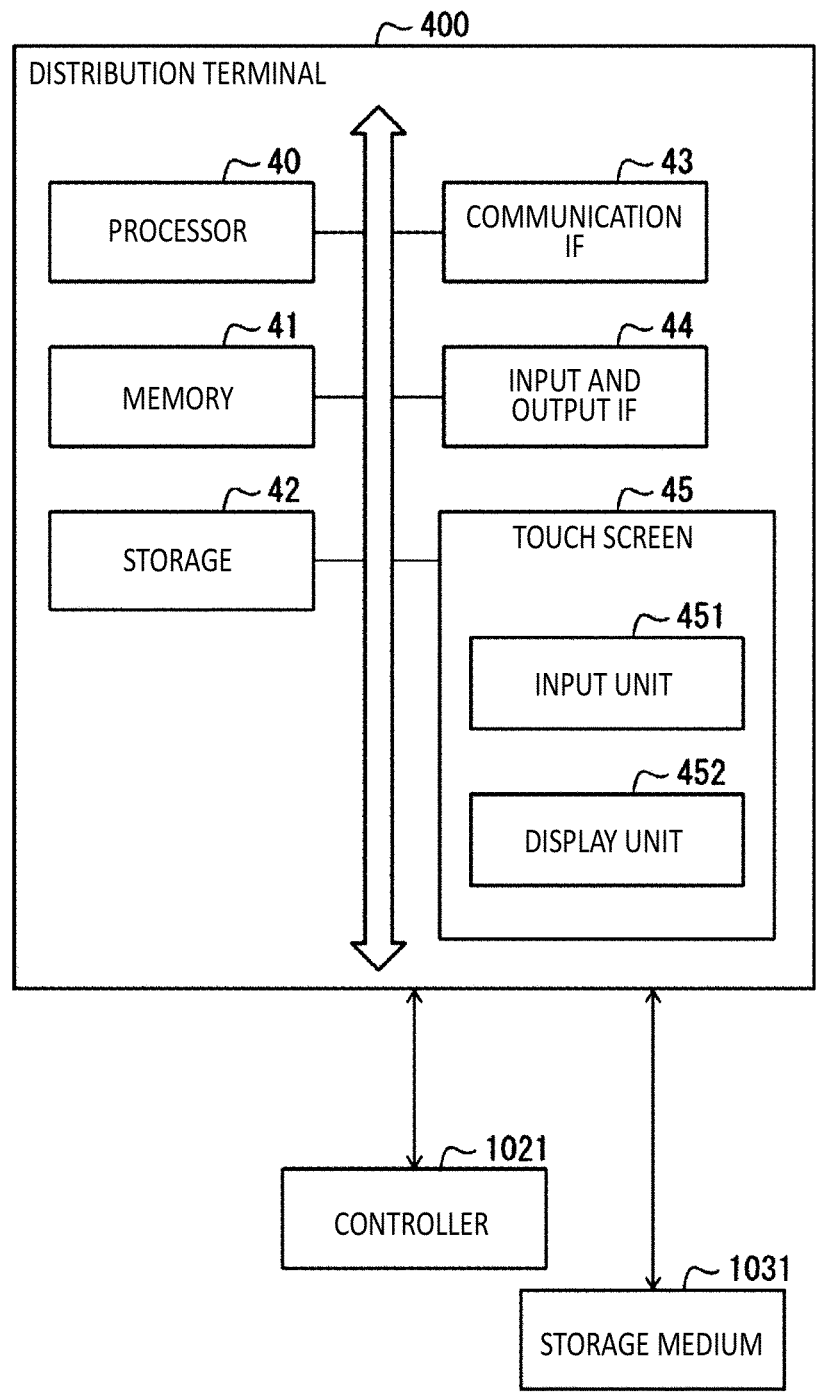
FIG. 5 is a block diagram illustrating an example of a hardware configuration of a distribution terminal in accordance with an embodiment.

FIG. 2 illustrates a hardware configuration of the user terminal 100. FIG. 3 illustrates a hardware configuration of the server 200. FIG. 4 illustrates a hardware configuration of the game play terminal 300. FIG. 5 illustrates a hardware configuration of the distribution terminal 400.

User Terminal 100

Although the present embodiment describes an example in which the user terminal 100 is realized as a smartphone as an example, the user terminal 100 is not limited to the smartphone. For example, the user terminal 100 may be realized as a feature phone, a tablet computer, a laptop computer (so-called notebook computer), a desktop computer, or the like. In addition, the user terminal 100 may be a gaming device appropriate to the game play.

As illustrated in FIG. 2, the user terminal 100 includes a processor 10, a memory 11, a storage 12, a communication interface (IF) 13, an input and output IF 14, a touch screen 15 (display unit), a camera 17, and a ranging sensor 18. These components included in the user terminal 100 are electrically connected to each other by a communication bus. Note that the user terminal 100 may include, instead of or in addition to the touch screen 15, the input and output IF 14 to which a display (display unit), which is separately configured from a main body of the user terminal 100, is connectable.

In addition, as illustrated in FIG. 2, the user terminal 100 may be configured to be able to communicate with one or more controllers 1020. The controller 1020 establishes communication with the user terminal 100 according to a communication standard such as, for example, Bluetooth (registered trademark). The controller 1020 may have one or more buttons or the like, and transmit an output value based on an input operation by a user on the button or the like to the user terminal 100. In addition, the controller 1020 may have various sensors such as an acceleration sensor and an angular rate sensor, and transmit output values of the various sensors to the user terminal 100.

Note that the controller 1020 may have the camera 17 and the ranging sensor 18 instead of or in addition to a configuration where the user terminal 100 includes the camera 17 and the ranging sensor 18.

For example, at the time of start of the game, the user terminal 100 desirably causes a user who uses the controller 1020 to input user identification information such as a name or a login ID of the user via the controller 1020. With this configuration, it becomes possible for the user terminal 100 to link the controller 1020 with the user, and the user terminal 100 can identify, based on a transmission source (controller 1020) of the received output value, from which user the output value has been output.

When the user terminal 100 communicates with a plurality of controllers 1020, since each user grips each of the controllers 1020, multi-play can be realized by the single user terminal 100 without communicating with another device such as the server 200 via the network 2. In addition, the multi-play can be locally realized by a plurality of user terminals 100 when each of the user terminals 100 performs communication connection with each other (communication connection without intermediation of the server 200) in accordance with a wireless standard such as a wireless local area network (LAN) standard. When the above described multi-play is locally realized by the single user terminal 100, the user terminal 100 may further include at least some of various functions described below which are included in the server 200. On the other hand, when the above described multi-play is locally realized by the plurality of user terminals 100, the plurality of user terminals 100 may include various functions included in the server 200 described below in a distributed manner which are.

Note that even when the above described multi-play is locally realized, the user terminal 100 may communicate with the server 200. For example, information indicating a play result such as a score or victory or defeat in a certain game may be transmitted to the server 200 in association with the user identification information.

In addition, the controller 1020 may be arranged to be detachably attached to the user terminal 100. In this case, at least any face in a housing of the user terminal 100 may be provided with a coupling section for the controller 1020. When the user terminal 100 is coupled to the controller 1020 via the coupling section by wire, the user terminal 100 and the controller 1020 transmit and receive a signal via the wire.

As illustrated in FIG. 2, the user terminal 100 may accept mounting of an external storage medium 1030 such as a memory card via the input and output IF 14. With this configuration, the user terminal 100 can read a program and data which are to be recorded in the storage medium 1030. The program to be recorded on the storage medium 1030 is, for example, a game program.

The user terminal 100 may store a game program acquired by communicating with an external device such as the server 200 in the memory 11 of the user terminal 100, or may store a game program acquired by reading the game program from the storage medium 1030 in the memory 11.

As described above, the user terminal 100 includes the communication IF 13, the input and output IF 14, the touch screen 15, the camera 17, and the ranging sensor 18 as an example of a mechanism which inputs information to the user terminal 100. Each of the units described above as the input mechanism can be regarded as an operation unit configured to accept the input operation by the user.

For example, when an operation unit is configured by at least either one of the camera 17 and the ranging sensor 18, the operation unit detects an object 1010 in the vicinity of the user terminal 100, and identifies an input operation from a detection result of the object. As an example, a hand of the user, a marker of a predetermined shape, or the like is detected as the object 1010, and the input operation is identified based on a color, a shape, a motion, a type, or the like of the object 1010 which is acquired as the detection result. More specifically, when a hand of the user is detected from a captured image of the camera 17, the user terminal 100 identifies and accepts a gesture (a series of motions of the hand of the user) detected based on the captured image as the input operation by the user. Note that the captured image may be a still image or a moving picture.

Alternatively, when the operation unit is configured by the touch screen 15, the user terminal 100 identifies and accepts an operation implemented on an input unit 151 of the touch screen 15 by the user as the input operation by the user. Alternatively, when the operation unit is configured by the communication IF 13, the user terminal 100 identifies and accepts a signal (for example, an output value) transmitted from the controller 1020 as the input operation by the user. Alternatively, when the operation unit is configured by the input and output IF 14, the user terminal 100 identifies and accepts a signal that is output from an input device (not illustrated in the drawing) which is different from the controller 1020 connected to the input and output IF 14 as the input operation by the user.

Server 200

The server 200 may be, as an example, a workstation or a general purpose computer such as a personal computer. The server 200 includes a processor 20, a memory 21, a storage 22, a communication interface (IF) 23, and an input and output IF 24. These components included in the server 200 are electrically connected to each other by a communication bus.

Game Play Terminal 300

The game play terminal 300 may be, as an example, a general purpose computer such as a personal computer. The game play terminal 300 includes a processor 30, a memory 31, a storage 32, a communication IF 33, and an input and output IF 34. These components included in the game play terminal 300 are electrically connected to each other by a communication bus.

As illustrated in FIG. 4, the game play terminal 300 according to the present embodiment is included in a head mounted display (HMD) set 1000 as an example. That is, it can be stated that the HMD set 1000 is included in the system 1, and it can also be stated that the player plays a game by using the HMD set 1000. Note that a device for the player to play the game is not limited to the HMD set 1000. As an example, the device may be any device which can allow the player to have a virtual experience of the game. In addition, the device may be realized as a smartphone, a feature phone, a tablet computer, a laptop computer (so-called notebook computer), a desktop computer, or the like. In addition, the device may be a gaming device appropriate to the game play.

The HMD set 1000 includes, in addition to the game play terminal 300, an HMD 500, an HMD sensor 510, a motion sensor 520, a display 530, and a controller 540. The HMD 500 includes a monitor 51, a gaze sensor 52, a first camera 53, a second camera 54, a microphone 55, and a speaker 56. The controller 540 may include the motion sensor 520.

The HMD 500 may be mounted to the head portion of the player, and provide a virtual space to the player during an operation. More specifically, the HMD 500 displays each of an image for a right eye and an image for a left eye on the monitor 51. When each of the eyes of the player visually recognizes the respective images, the player may recognize the images as a three-dimensional image based on a binocular disparity. The HMD 500 may include any of a so-called head mounted display including a monitor, and head mounted equipment to which a terminal having a smartphone or other monitors can be mounted.

The monitor 51 is realized as a non-transmissive display device, for example. In an aspect, the monitor 51 is arranged in a body of the HMD 500 so as to be positioned in front of the eyes of the player. Accordingly, when the player visually recognizes the three-dimensional image displayed on the monitor 51, the player can be immersed in the virtual space. In an aspect, the virtual space includes, for example, a background, an object that can be operated by the player, and an image of a menu selectable by the player. In an aspect, the monitor 51 may be realized as a liquid crystal monitor or an organic electro luminescence (EL) monitor which is included in a so-called smartphone or other information display terminals.

In another aspect, the monitor 51 may be realized as a transmissive display device. In this case, the HMD 500 may be of an open type such as a spectacle type instead of a closed type in which the eyes of the player are covered as illustrated in FIG. 1. The transmissive monitor 51 may be configurable as a temporarily non-transmissive display device by adjusting transmittance of the monitor. The monitor 51 may include a configuration in which part of an image configuring the virtual space and a reality space are simultaneously displayed. For example, the monitor 51 may display an image of a reality space captured by a camera mounted to the HMD 500, or may set partial transmittance to be high such that the reality space is visible.

In an aspect, the monitor 51 may include a sub monitor which displays an image for the right eye and a sub monitor which displays an image for the left eye. In another aspect, the monitor 51 may be configured to display the image for the right eye and the image for the left eye in an integrated manner. In this case, the monitor 51 includes a high speed shutter. The high speed shutter actuates to allow alternate display of the image for the right eye and the image for the left eye such that the image is recognized by only either one of the eyes.

In an aspect, the HMD 500 includes a plurality of light sources which is not illustrated in the drawing. Each of the light sources is realized, for example, by a light emitting diode (LED) which emits infrared rays. The HMD sensor 510 has a position tracking function with which a motion of the HMD 500 is detected. More specifically, the HMD sensor 510 reads a plurality of infrared rays emitted by the HMD 500, and detects a position and an inclination of the HMD 500 in the reality space.

In another aspect, the HMD sensor 510 may be realized by a camera. In this case, the HMD sensor 510 can detect the position and the inclination of the HMD 500 by executing image analysis processing by using image information of the HMD 500 which is output from the camera.

In another aspect, the HMD 500 may include, as a position detector, a sensor (not illustrated) instead of the HMD sensor 510 or in addition to the HMD sensor 510. The HMD 500 may detect a position and an inclination of the HMD 500 itself by using the sensor. For example, when the sensor is an angular rate sensor, a geomagnetic sensor, or an acceleration sensor, the HMD 500 may detect the position and the inclination of itself by using any of each of these sensors instead of the HMD sensor 510. As an example, when the sensor included in the HMD 500 is an angular rate sensor, the angular rate sensor detects angular rates about three axes of the HMD 500 in the reality space over time. The HMD 500 calculates temporal variations of angles about the three axes of the HMD 500 based on each angular rate, and further calculates the inclination of the HMD 500 based on the temporal variations of the angles.

The gaze sensor 52 detects a direction in which a line of sight of the right eye and left eye of the player is facing. That is, the gaze sensor 52 detects the line of sight of the player. A detection of the direction of line of sight is realized, for example, by a well known eye tracking function. The gaze sensor 52 is realized by a sensor having an eye tracking function. In an aspect, the gaze sensor 52 preferably includes a sensor for the right eye and a sensor for the left eye. The gaze sensor 52 may be a sensor which illuminates, for example, the right eye and the left eye of the player with infrared light, and also receives reflected light from a cornea and an iris for illumination light to detect a rotation angle of each eyeball. The gaze sensor 52 can sense the line of sight of the player based on each rotation angle detected.

The first camera 53 captures a lower part of a face of the player. More specifically, the first camera 53 captures a nose, a mouth, and the like of the player. The second camera 54 captures the eyes, eyebrows, and the like of the player. A housing on a side of the player of the HMD 500 is defined as an inside of the HMD 500, and a housing on a side opposite to the player of the HMD 500 is defined as an outside of the HMD 500. In an aspect, the first camera 53 may be arranged on the outside of the HMD 500, and the second camera 54 may be arranged on the inside of the HMD 500. Images generated by the first camera 53 and the second camera 54 are input to the game play terminal 300. In another aspect, the first camera 53 and the second camera 54 may be realized as a single camera, and the face of the player may be captured by this single camera.

The microphone 55 converts a speech of the player into an audio signal (electric signal) to be output to the game play terminal 300. The speaker 56 converts the audio signal into a sound to be output to the player. In another aspect, the HMD 500 may include an earphone instead of the speaker 56.

The controller 540 is connected to the game play terminal 300 in a wired or wireless manner. The controller 540 accepts an input of a command to the game play terminal 300 from the player. In an aspect, the controller 540 is configured to be able to be gripped by the player. In another aspect, the controller 540 is configured to be able to be mounted to part of the body or costume of the player. In still another aspect, the controller 540 may be configured to output at least any of vibration, sound, or light based on a signal transmitted from the game play terminal 300. In still another aspect, the controller 540 accepts an operation for controlling a position or a motion of an object arranged in the virtual space from the player.

In an aspect, the controller 540 includes a plurality of light sources. Each of the light sources is realized, for example, by an LED which emits infrared rays. The HMD sensor 510 has a position tracking function. In this case, the HMD sensor 510 reads a plurality of infrared rays emitted by the controller 540, and detects a position and an inclination of the controller 540 in the reality space. In another aspect, the HMD sensor 510 may be realized by a camera. In this case, the HMD sensor 510 can detect a position and an inclination of the controller 540 by executing image analysis processing by using image information of the controller 540 which is output from the camera.

In an aspect, the motion sensor 520 is attached to a hand of the player, and detects a motion of the hand of the player. For example, the motion sensor 520 detects a rotation speed of the hand, the number of rotations, or the like. A detected signal is transmitted to the game play terminal 300. The motion sensor 520 is provided, for example, in the controller 540. In an aspect, the motion sensor 520 is provided, for example, in the controller 540 configured to be able to be gripped by the player. In another aspect, for safety in the reality space, the controller 540 is mounted to an object that is not easily slipped off by being worn on the hand of the player as in a glove type controller. In still another aspect, a sensor that is not mounted to the player may detect a motion of the hand of the player. For example, a signal of the camera capturing the player may be input to the game play terminal 300 as a signal representing a movement of the player. As an example, the motion sensor 520 and the game play terminal 300 are wirelessly connected to each other. In a case of wireless connection, a communication mode is not limited in particular, and for example, Bluetooth or other well known communication approaches are used.

The display 530 displays an image similar to an image displayed on the monitor 51. With this configuration, it is possible to allow users other than the player wearing the HMD 500 to view an image similar to that of the player. The image to be displayed on the display 530 does not necessarily need to be a three-dimensional image, and may be an image for the right eye or an image for the left eye. Examples of the display 530 include, for example, a liquid crystal display, an organic EL monitor, and the like.

The game play terminal 300 causes a character that is set as a target of an operation by the player to carry out a movement based on various types of information acquired from each unit of the HMD 500, the controller 540, and the motion sensor 520 to make progress in the game. The "movement" herein includes moving each portion of the body, changing an attitude, changing an expression of the face, changing its position, speaking, touching or moving an object arranged in the virtual space, using a weapon, instrument, or the like gripped by the character, or the like. That is, in the present game, when the player moves each portion of the body, the character also moves each portion of the body similarly as in the player. In addition, in the present game, the character speaks content spoken by the player. In other words, in the present game, the character is an avatar object behaving as an alter ego of the player. As an example, at least part of the movement of the character may be executed by an input to the controller 540 by the player.

According to the present embodiment, as an example, the motion sensors 520 are attached to both hands of the player, both legs of the player, a waist portion of the player, and the head portion of the player. The motion sensors 520 attached to both hands of the player may be provided to the controller 540 as above described. In addition, the motion sensors 520 attached to the head portion of the player may be provided to the HMD 500. The motion sensors 520 may be further attached to both elbows and both knees of the user. By increasing the number of motion sensors 520 attached to the player, the motion of the player can be more accurately reflected on the character. In addition, instead of the motion sensor 520 attached to each portion of the body, the player may wear a suit to which one or more motion sensors 520 are attached. That is, a method for motion capture is not limited to an example in which the motion sensor 520 is used.

Distribution Terminal 400

The distribution terminal 400 may be a mobile terminal such as a smartphone, personal digital assistant (PDA) (registered trademark), or a tablet computer. In addition, the distribution terminal 400 may be a so-called stationary terminal such as a desktop personal computer.

As illustrated in FIG. 5, the distribution terminal 400 includes a processor 40, a memory 41, a storage 42, a communication IF 43, an input and output IF 44, and a touch screen 45. Note that the distribution terminal 400 may include, instead of or in addition to the touch screen 45, the input and output IF 44 to which a display (display unit), which is separately configured from a main body of the distribution terminal 400, is connectable.

A controller 1021 may have a physical input mechanism such as one or more buttons, a lever, a stick, or a wheel. The controller 1021 transmits, to the distribution terminal 400, an output value based on an input operation input to the input mechanism by a handler of the distribution terminal 400 (according to the present embodiment, the player). In addition, the controller 1021 may have various sensors such as an acceleration sensor and an angular rate sensor, and may transmit output values of the various sensors to the distribution terminal 400. The above described output value is accepted by the distribution terminal 400 via the communication IF 43.

The distribution terminal 400 may include a camera and a ranging sensor (both of which are not illustrated in the drawing). Instead of or in addition to the camera and the ranging sensor included in the distribution terminal 400, the controller 1021 may have a camera and a ranging sensor.

As described above, the distribution terminal 400 includes, as an example of the mechanism which inputs information to the distribution terminal 400, the communication IF 43, the input and output IF 44, and the touch screen 45. Each of the units described above as the input mechanism can be regarded as an operation unit configured to accept the input operation by the user.

When the operation unit is configured by the touch screen 45, the distribution terminal 400 identifies and accepts an operation implemented on an input unit 451 of the touch screen 45 by the user as the input operation by the user. Alternatively, when the operation unit is configured by the communication IF 43, the distribution terminal 400 identifies and accepts a signal (for example, an output value) transmitted from the controller 1021 as the input operation by the user. Alternatively, when the operation unit is configured by the input and output IF 44, the distribution terminal 400 identifies and accepts a signal that is output from an input device (not illustrated) connected to the input and output IF 44 as the input operation by the user.

Hardware Component of Each Device

The processors 10, 20, 30, and 40 respectively control overall operations of the user terminal 100, the server 200, the game play terminal 300, and the distribution terminal 400. The processors 10, 20, 30, and 40 include a central processing unit (CPU), a micro processing unit (MPU), and a graphics processing unit (GPU). The processors 10, 20, 30, and 40 respectively read programs from the storages 12, 22, 32, and 42 which will be described below. Then, the processors 10, 20, 30, and 40 respectively deploy the read programs onto the memories 11, 21, 31, and 41 which will be described below. The processors 10, 20, and 30 execute the deployed programs.

The memories 11, 21, 31, and 41 are main storage devices. The memories 11, 21, 31, and 41 are configured by storage devices such as read only memories (ROMs) and random access memories (RAMs). The memory 11 temporarily stores the programs and various types of data which are read from the storage 12 described below by the processor 10 to provide a working area to the processor 10. The memory 11 also temporarily stores various types of data generated while the processor 10 operates according to the programs. The memory 21 temporarily stores the various programs and data which are read from the storage 22 described below by the processor 20 to provide a working area to the processor 20. The memory 21 also temporarily stores various types of data generated while the processor 20 operates according to the programs. The memory 31 temporarily stores the various programs and data which are read from the storage 32 described below by the processor 30 to provide a working area to the processor 30. The memory 31 also temporarily stores various types of data generated while the processor 30 operates according to the programs. The memory 41 temporarily stores the programs and various types of data which are read from the storage 42 described below by the processor 40 to provide a working area to the processor 40. The memory 41 also temporarily stores various types of data generated while the processor 40 operates according to the programs.

In the present embodiment, programs to be executed by the processors 10 and 30 may be game programs of the present game. In the present embodiment, a program to be executed by the processor 40 may be a distribution program for realizing distribution of the movement instruction data. In addition, the processor 10 may further execute a viewing program for realizing playback of a moving picture.

In the present embodiment, a program to be executed by the processor 20 may be at least any of the game program, the distribution program, or the viewing program described above. The processor 20 executes at least any of the game program, the distribution program, or the viewing program according to a request or the like from at least any of the user terminal 100, the game play terminal 300, or the distribution terminal 400. Note that the distribution program and the viewing program may be executed in parallel.

That is, the game program may be a program in which a game is realized through cooperation of the user terminal 100, the server 200, and the game play terminal 300. The distribution program may be a program in which the distribution of the movement instruction data is realized through cooperation of the server 200 and the distribution terminal 400. The viewing program may be a program in which the playback of the moving picture is realized through cooperation of the user terminal 100 and the server 200.

The storages 12, 22, 32, and 42 are auxiliary storage devices. The storages 12, 22, 32, and 42 are configured by storage devices such as flash memories or hard disk drives (HDDs). The storages 12 and 32 store, for example, various types of data related to the game. The storage 42 stores various types of data related to the distribution of the movement instruction data. In addition, the storage 12 stores various types of data related to the playback of the moving picture. The storage 22 may store at least some of various types of data related to each of the game, the distribution of the movement instruction data, and the playback of the moving picture.

The communication IFs 13, 23, 33, and 43 respectively control transmission and reception of various types of data in the user terminal 100, the server 200, the game play terminal 300, and the distribution terminal 400. The communication IFs 13, 23, 33, and 43 control communication using, for example, communication via a wireless local area network (LAN), Internet communication via a wired LAN, a wireless LAN, or
 a mobile phone network, a near field communication, and the like.

The input and output IFs 14, 24, 34, and 44 are respectively interfaces for the user terminal 100, the server 200, the game play terminal 300, and the distribution terminal 400 to accept an input of data and also to output data. The input and output IFs 14, 24, 34, and 44 may perform input and output of the data via a universal serial bus (USB) or the like. The input and output IFs 14, 24, 34, and 44 may include a physical button, a camera, a microphone, a speaker, a mouse, a keyboard, a display, a stick, a lever, or the like. In addition, the input and output IFs 14, 24, 34, and 44 may include a connection unit which performs transmission and reception of data with peripheral equipment.

The touch screen 15 is an electronic component obtained through a combination of the input unit 151 and a display unit 152 (display). The touch screen 45 is an electronic component obtained through a combination of an input unit 451 and a display unit 452. The input units 151 and 451 are touch sensitive devices as an example, and are configured by touch pads, for example. The display units 152 and 452 are configured by a liquid crystal display, an organic electro luminescence (EL) display, or the like, for example.

The input units 151 and 451 include a function of sensing a position at which an operation on an input face by a user (mainly, a physical contact operation such as a touch operation, a sliding operation, a swipe operation, a pinching-in/pinching-out operation, and a tap operation) is input, and of transmitting information indicating the position as an input signal. It suffices when the input units 151 and 451 include a touch sensing unit which is not illustrated in the drawing. The touch sensing unit adopting any system such as an electrostatic capacitance system or a resistive film system may be used.

Although not illustrated in the drawing, the user terminal 100 and the distribution terminal 400 may respectively include one or more sensors which identify hold postures of the user terminal 100 and the distribution terminal 400. This sensor may be, for example, an acceleration sensor, an angular rate sensor, or the like.

When the user terminal 100 and the distribution terminal 400 include sensors, the processors 10 and 40 can respectively identify hold postures of the user terminal 100 and the distribution terminal 400 from outputs of the sensors, and perform processing in accordance with the hold postures. For example, when the user terminal 100 and the distribution terminal 400 are vertically held, the processors 10 and 40 may cause the display units 152 and 452 to perform portrait screen display to respectively display vertically long images. On the other hand, when the user terminal 100 and the distribution terminal 400 are horizontally held, the processors 10 and 40 may cause the display units to perform landscape screen display to respectively display horizontally long images. In this manner, the processors 10 and 40 may be respectively able to switch the portrait screen display and the landscape screen display according to the hold postures of the user terminal 100 and the distribution terminal 400.

Functional Configuration of System 1

Figure 6:
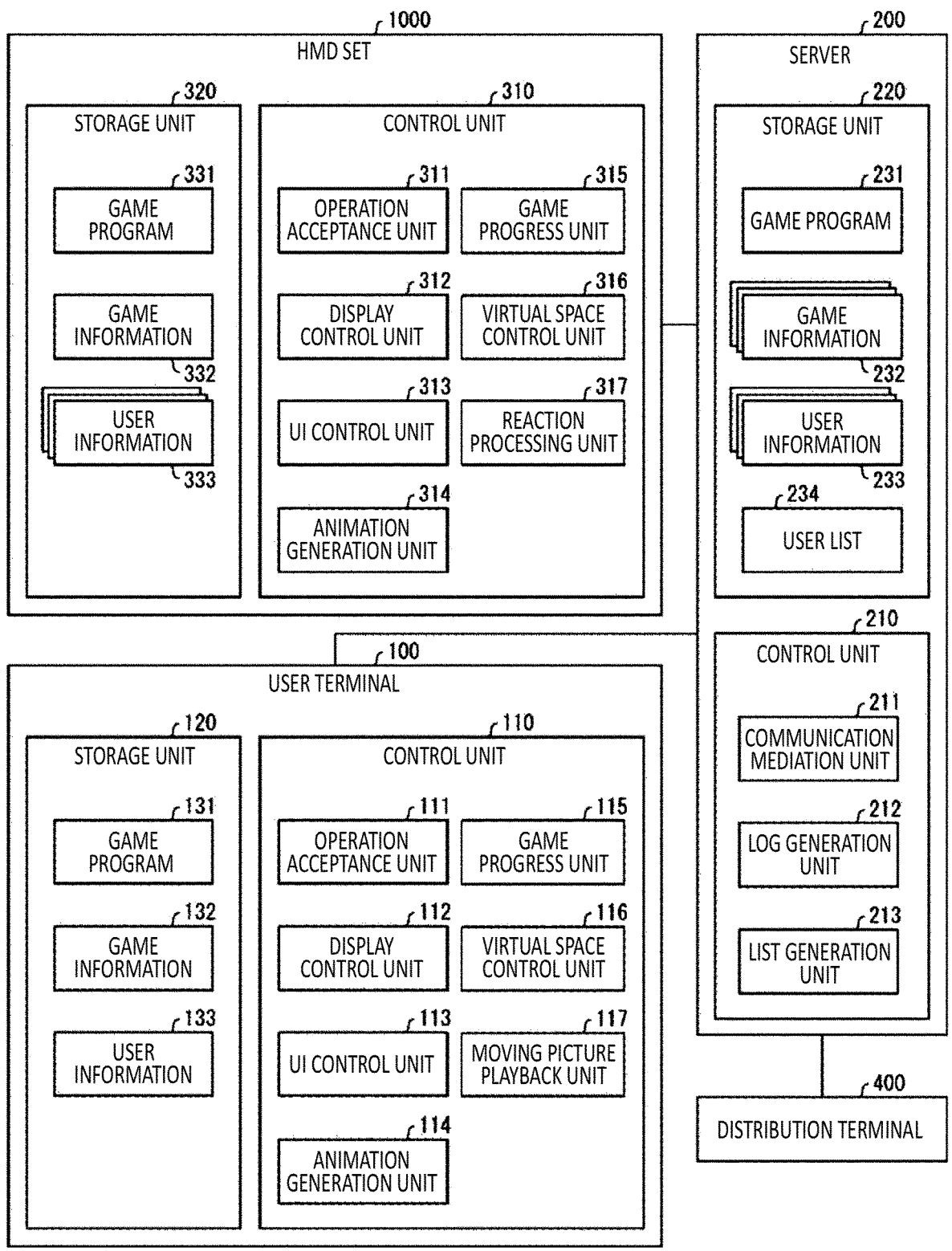
FIG. 6 is a block diagram illustrating an example of a functional configuration of the user terminal, the server, and an HMD set in accordance with an embodiment.
Figure 7:
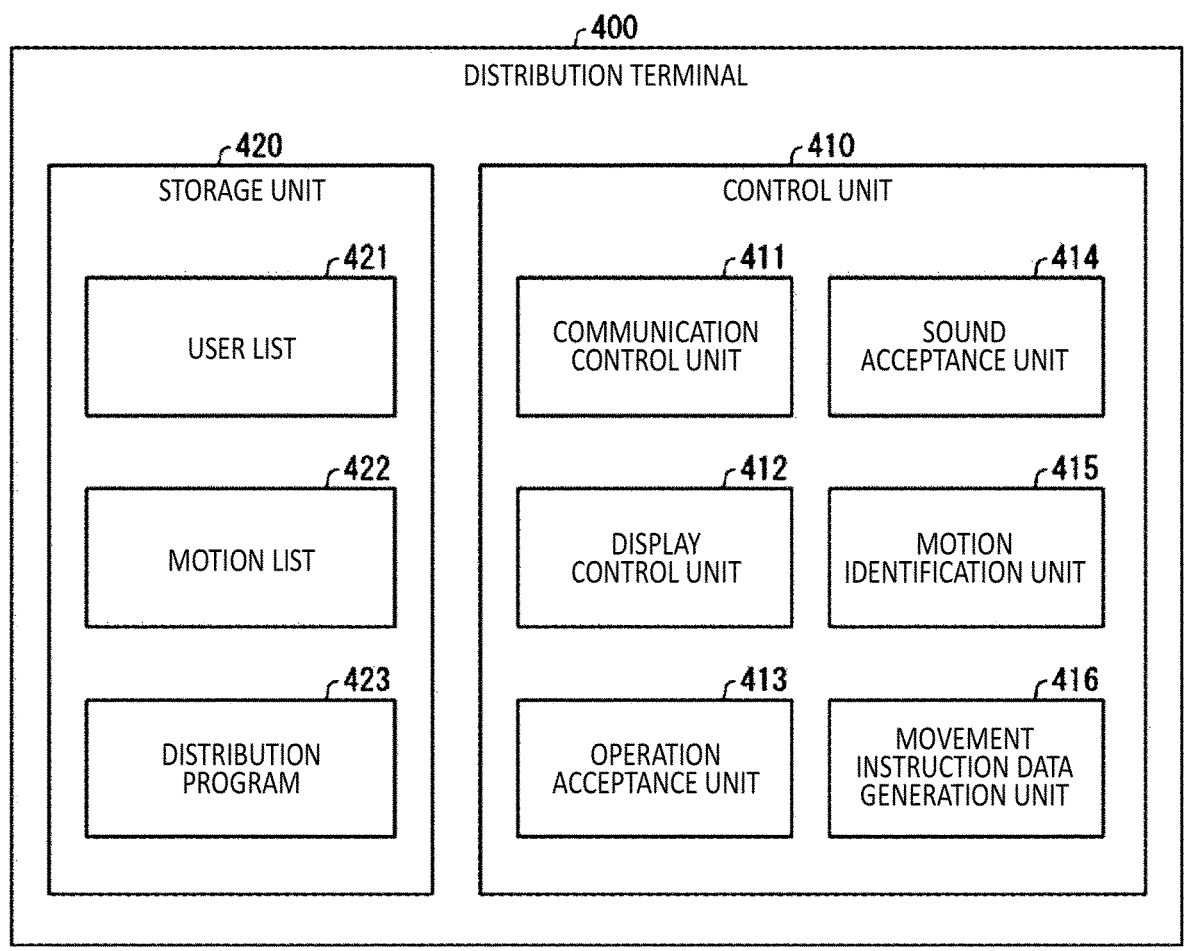
FIG. 7 is a block diagram illustrating an example of a functional configuration of the distribution terminal in accordance with an embodiment.

FIG. 6 is a block diagram illustrating a functional configuration of the user terminal 100, the server 200, and the HMD set 1000 included in the system 1. FIG. 7 is a block diagram illustrating a functional configuration of the distribution terminal 400 illustrated in FIG. 6. The user terminal 100 has a function as an input device which accepts an input operation by a user, and a function as an output device which outputs an image and a sound of a game. The user terminal 100 functions as a control unit 110 and a storage unit 120 through a cooperation of the processor 10, the memory 11, the storage 12, the communication IF 13, the input and output IF 14, the touch screen 15, and the like.

The server 200 has a function of mediating transmission and reception of various types of information among the user terminal 100, the HMD set 1000, and the distribution terminal 400. The server 200 functions as a control unit 210 and a storage unit 220 through a cooperation of the processor 20, the memory 21, the storage 22, the communication IF 23, the input and output IF 24, and the like.

The HMD set 1000 (game play terminal 300) has a function as an input device which accepts an input operation by the player, a function as an output device which outputs an image and a sound of a game, and a function of transmitting the game progress information in real time to the user terminal 100 via the server 200. The HMD set 1000 functions as a control unit 310 and a storage unit 320 through a cooperation of the processor 30, the memory 31, the storage 32, the communication IF 33, and the input and output IF 34 of the game play terminal 300, and the HMD 500, the HMD sensor 510, the motion sensor 520, the controller 540, and the like.

The distribution terminal 400 has a function of generating movement instruction data and transmitting the movement instruction data to the user terminal 100 via the server 200. The distribution terminal 400 functions as a control unit 410 and a storage unit 420 through a cooperation of the processor 40, the memory 41, the storage 42, the communication IF 43, the input and output IF 44, the touch screen 45, and the like.

Data Stored by Storage Unit of Each Device

The storage unit 120 stores a game program 131 (program), game information 132, and user information 133. The storage unit 220 stores a game program 231, game information 232, user information 233, and a user list 234. The storage unit 320 stores a game program 331, game information 332, and user information 333. The storage unit 420 stores a user list 421, a motion list 422, and a distribution program 423 (a program, a second program).

The game programs 131, 231, and 331 are respectively game programs executed by the user terminal 100, the server 200, and the HMD set 1000. The present game is realized when each device operates in cooperation based on the game programs 131, 231, and 331. Note that a configuration may be adopted where the game programs 131 and 331 are stored in the storage unit 220 to be respectively downloaded to the user terminals 100 and the HMD set 1000. Note that according to the present embodiment, the user terminal 100 renders data received from the distribution terminal 400 to play a moving picture based on the game program 131. In other words, the game program 131 is also a program for playing the moving picture by using moving picture direction data distributed from the distribution terminal 400. The program for playing the moving picture may be different from the game program 131. In this case, the storage unit 120 stores the program for playing the moving picture separately from the game program 131.

The pieces of game information 132, 232, and 332 are respectively data to be referred to when the user terminal 100, the server 200, and the HMD set 1000 execute the game program. The pieces of user information 133, 233, and 333 are data related to an account of the user of the user terminal 100. The game information 232 is the game information 132 of each of the user terminals 100, and the game information 332 of the HMD set 1000. The user information 233 is user information of the player which is included in the user information 133 of each of the user terminals 100 and the user information 333. The user information 333 is the user information 133 of each of the user terminals 100, and the user information of the player.

The user list 234 and the user list 421 are lists of users who have participated in the game. The user list 234 and the user list 421 may include, in addition to a list of users who have participated in a most recent game play by the player, a list of users who have participated in each game play before the most recent game play. The motion list 422 is a list of a plurality of pieces of previously created motion data. The motion list 422 is a list in which, for example, each information (for example, a motion name) to identify each motion is associated with motion data. The distribution program 423 is a program for realizing a distribution to the user terminal 100 of the movement instruction data for playing the moving picture in the user terminal 100.

Functional Configuration of Server 200

The control unit 210 controls the server 200 in an overall manner by executing the game program 231 stored in the storage unit 220. For example, the control unit 210 mediates transmission and reception of various types of information among the user terminal 100, the HMD set 1000, and the distribution terminal 400.

The control unit 210 functions as a communication mediation unit 211, a log generation unit 212, and a list generation unit 213 according to a description of the game program 231. The control unit 210 can also function as other functional blocks, which are not illustrated, for mediating transmission and reception of various types of information regarding the game play and the distribution of the movement instruction data and for assisting the progress of the game.

The communication mediation unit 211 mediates transmission and reception of various types of information among the user terminal 100, the HMD set 1000, and the distribution terminal 400. For example, the communication mediation unit 211 transmits the game progress information received from the HMD set 1000 to the user terminal 100. The game progress information includes data indicating information such as a motion of a character operated by the player, a parameter of the character, an item or a weapon owned by the character, or an enemy character, or the like. The server 200 transmits the game progress information to the user terminals 100 of all the users who participate in the game. In other words, the server 200 transmits the common game progress information to the user terminals 100 of all the users who participate in the game. With this configuration, the game progresses in each of the user terminals 100 of all the users who participate in the game similarly as in the HMD set 1000.

In addition, for example, the communication mediation unit 211 transmits the information for assisting the progress of the game by the player which is received from any of the user terminals 100 to the other user terminals 100 and the HMD set 1000. As an example, the information may be item information indicating an item for advantageously making progress in the game by the player, which is an item provided to the player (character). The item information includes information (such as a username or a user ID) indicating a user who has provided the item. In addition, the communication mediation unit 211 may mediate the distribution of the movement instruction data from the distribution terminal 400 to the user terminal 100.

The log generation unit 212 generates a log of a game progress based on the game progress information received from the HMD set 1000. The list generation unit 213 generates the user list 234 after the end of the game play. Although a detail will be described below, each user in the user list 234 is associated with a tag indicating content of the assistance provided to the player by the user. The list generation unit 213 generates a tag based on the log of the game progress generated by the log generation unit 212 to associate the tag with the corresponding user. Note that the list generation unit 213 may set, as a tag, the content of the assistance provided to the player by each user which has been input by using a terminal device such as a personal computer by an operator of the game or the like, and associate the tag with the corresponding user. With this configuration, the content of the assistance provided by each user becomes further detailed. Note that when the user is to participate in the game, the user terminal 100 transmits information indicating the user based on an operation by the user to the server 200. For example, the user terminal 100 transmits a user ID input by the user to the server 200. That is, the server 200 holds the information indicating each user with regard to all the users participating in the game. The list generation unit 213 may generate the user list 234 by using the information.

Functional Configuration of HMD Set 1000

The control unit 310 controls the HMD set 1000 in an overall manner by executing the game program 331 stored in the storage unit 320. For example, the control unit 310 makes progress in the game according to the game program 331 and an operation by the player. In addition, while progress is made in the game, the control unit 310 communicates with the server 200 when necessary to perform transmission and reception of information. The control unit 310 may directly perform the transmission and reception of the information with the user terminal 100 without the intermediation of the server 200.

The control unit 310 functions as an operation acceptance unit 311, a display control unit 312, a UI control unit 313, an animation generation unit 314, a game progress unit 315, a virtual space control unit 316, and a reaction processing unit 317 according to a description of the game program 331. According to a nature of a game to be executed, the control unit 310 can also function as other functional blocks which are not illustrated in the drawing for controlling a character appearing in the game or the like.

The operation acceptance unit 311 senses and accepts an input operation by the player. The operation acceptance unit 311 accepts a signal that is input from the HMD 500, the motion sensor 520, the controller 540, or the like to determine what input operation has been performed, and outputs a result of the determination to each element of the control unit 310.

The UI control unit 313 controls a user interface (hereinafter, UI) image to be displayed on the monitor 51, the display 530, or the like. The UI image is a tool for the player to perform an input to the HMD set 1000 which is required for the progress in the game, or is a tool for the player to acquire information that is output from the HMD set 1000 while the game is in progress. For example, the UI image is, but not limited to, an icon, a button, a list, a menu screen, or the like.

The animation generation unit 314 generates an animation illustrating motions of various objects based on control manners of the various objects. For example, the animation generation unit 314 may generate an animation or the like representing a situation where an object (for example, an avatar object of the player) moves as if the object were there, moves a mouth, or changes an expression.

The game progress unit 315 makes progress in the game based on the game program 331, an input operation by the player, a movement of the avatar object in accordance with the input operation, and the like. For example, when the avatar object performs a predetermined movement, the game progress unit 315 performs predetermined game processing. In addition, for example, the game progress unit 315 may receive information representing an operation by a user in the user terminal 100, and perform game processing based on the operation by the user. In addition, the game progress unit 315 generates game progress information according to the progress of the game, and transmits the game progress information to the server 200. The game progress information is transmitted to the user terminal 100 via the server 200. With this configuration, the progress of the game in the HMD set 1000 is shared in the user terminal 100. In other words, the progress of the game in the HMD set 1000 and the progress of the game in the user terminal 100 are synchronous with each other.

The virtual space control unit 316 performs various types of control related to the virtual space provided to the player according to the progress of the game. As an example, the virtual space control unit 316 generates various objects to be arranged in the virtual space. In addition, the virtual space control unit 316 arranges a virtual camera in the virtual space. In addition, the virtual space control unit 316 moves the various objects arranged in the virtual space according to the progress of the game. In addition, the virtual space control unit 316 controls a position and an inclination of the virtual camera arranged in the virtual space according to the progress of the game.

The display control unit 312 outputs, to the monitor 51 and the display 530, a game screen on which a result of processing executed by each element described above has been reflected. The display control unit 312 may display an image based on a field of view from the virtual camera arranged in the virtual space as the game screen on the monitor 51 and the display 530. In addition, the display control unit 312 may include the animation generated by the animation generation unit 314 in the game screen. In addition, the display control unit 312 may superimpose and draw the above described UI image to be controlled by the UI control unit 313 on the game screen.

The reaction processing unit 317 accepts a feedback from the user of the user terminal 100 with regard to a reaction to a game play by the player, and outputs this to the player. According to the present embodiment, for example, the user terminal 100 can create a comment (message) addressed to an avatar object based on an input operation by the user. The reaction processing unit 317 accepts comment data of the comment, and outputs this. The reaction processing unit 317 may display text data corresponding to the comment by the user on the monitor 51 and the display 530, or may output audio data corresponding to the comment by the user from a speaker which is not illustrated in the drawing. In a case of the former, the reaction processing unit 317 may superimpose and draw an image corresponding to the above described text data (that is, an image including content of the comment) on the game screen.

Functional Configuration of User Terminal 100

The control unit 110 controls the user terminal 100 in an overall manner by executing the game program 131 stored in the storage unit 120. For example, the control unit 110 makes progress in the game according to the game program 131 and an operation by the user. In addition, while progress is made in the game, the control unit 110 communicates with the server 200 when necessary to perform transmission and reception of information. The control unit 110 may directly perform the transmission and reception of the information with the HMD set 1000 without the intermediation of the server 200.

The control unit 110 functions as an operation acceptance unit 111, a display control unit 112, a UI control unit 113, an animation generation unit 114, a game progress unit 115, a virtual space control unit 116, and a moving picture playback unit 117 according to a description of the game program 131. According to a nature of a game to be executed, the control unit 110 can also function as other functional blocks which are not illustrated in the drawing for the progress of the game.

The operation acceptance unit 111 senses and accepts an input operation on the input unit 151 by the user. The operation acceptance unit 111 determines what input operation has been performed from actions caused by the user on the touch screen 15 and other consoles via the input and output IF 14, and outputs a result of the determination to each element of the control unit 110.

For example, the operation acceptance unit 111 accepts an input operation on the input unit 151 and detects coordinates of an input position of the input operation to identify a type of the input operation. The operation acceptance unit 111 identifies the touch operation, the sliding operation, the swipe operation, the pinching-in/pinching-out operation, the tap operation, and the like as the type of the input operation, for example. In addition, when an input which has been continuously sensed is interrupted, the operation acceptance unit 111 senses that a contact input is released from the touch screen 15.

The UI control unit 113 controls a UI image to be displayed on the display unit 152 for constructing a UI according to at least either the input operation by the user or the received game progress information. The UI image is a tool for the user to perform an input to the user terminal 100 which is required for the progress in the game, or is a tool for the user to acquire information that is output while the game is in progress from the user terminal 100. For example, the UI image is, but not limited to, an icon, a button, a list, a menu screen, or the like.

The animation generation unit 114 generates an animation illustrating motions of various objects based on control manners of the various objects.

The game progress unit 115 makes progress in the game based on the game program 131, the received game progress information, an input operation by the user, and the like. When predetermined game processing is performed by an input operation by the user, the game progress unit 115 transmits information related to the game processing to the HMD set 1000 via the server 200. With this configuration, the predetermined game processing is shared in the HMD set 1000. In other words, the progress of the game in the HMD set 1000 and the progress of the game in the user terminal 100 are synchronous with each other. The predetermined game processing is, for example, processing of providing an item to the avatar object, and in a case of this example, information related to the game processing is the above described item information.

The virtual space control unit 116 performs various types of control related to the virtual space provided to the user according to the progress of the game. As an example, the virtual space control unit 116 generates various objects to be arranged in the virtual space. In addition, the virtual space control unit 116 arranges a virtual camera in the virtual space. In addition, the virtual space control unit 116 moves the various objects arranged in the virtual space according to the progress of the game, specifically, the received game progress information. In addition, the virtual space control unit 316 controls a position and an inclination of the virtual camera arranged in the virtual space according to the progress of the game, specifically, the received game progress information.

The display control unit 112 outputs, to the display unit 152, a game screen on which a result of processing executed by each element described above has been reflected. The display control unit 112 may display an image based on a field of view from the virtual camera arranged in the virtual space provided to the user as the game screen on the display unit 152. In addition, the display control unit 112 may include the animation generated by the animation generation unit 114 in the game screen. In addition, the display control unit 112 may superimpose and draw the above described UI image to be controlled by the UI control unit 113 on the game screen. In any case, the game screen displayed on the display unit 152 is a game screen similar to the game screen displayed on other user terminals 100 and the HMD set 1000.

The moving picture playback unit 117 analyzes (renders) the movement instruction data received from the distribution terminal 400 to play the moving picture.

Functional Configuration of Distribution Terminal 400

The control unit 410 controls the distribution terminal 400 in an overall manner by executing a program (not illustrated) stored in the storage unit 420. For example, the control unit 410 generates movement instruction data according to the program and an operation by the user of the distribution terminal 400 (according to the present embodiment, the player), and distributes the movement instruction data to the user terminal 100. In addition, the control unit 410 communicates with the server 200 when necessary to perform transmission and reception of information. The control unit 410 may directly perform the transmission and reception of the information with the user terminal 100 without the intermediation of the server 200.

The control unit 410 functions as a communication control unit 411, a display control unit 412, an operation acceptance unit 413, a sound acceptance unit 414, a motion identification unit 415, and a movement instruction data generation unit 416 according to a description of a program. The control unit 410 can also function as other functional blocks which are not illustrated in the drawing for generating and distributing the movement instruction data.

The communication control unit 411 controls transmission and reception of information with the server 200 or the user terminal 100 via the server 200. The communication control unit 411 receives the user list 421 from the server 200 as an example. In addition, the communication control unit 411 transmits the movement instruction data to the user terminal 100 as an example.

The display control unit 412 outputs, to the display unit 452, various screens on which a result of processing executed by each element has been reflected. The display control unit 412 displays a screen including the received user list 234 as an example. In addition, the display control unit 412 displays a screen including the motion list 422 for the player to select motion data for moving the avatar object which is included in the movement instruction data to be distributed as an example.

The operation acceptance unit 413 senses and accepts an input operation by the player on the input unit 151. The operation acceptance unit 111 determines what input operation has been performed from actions caused by the player on the touch screen 45 and other consoles via the input and output IF 44, and outputs a result of the determination to each element of the control unit 410.

For example, the operation acceptance unit 413 accepts an input operation on the input unit 451 and detects coordinates of an input position of the input operation to identify a type of the input operation. The operation acceptance unit 413 identifies the touch operation, the sliding operation, the swipe operation, the pinching-in/pinching-out operation, the tap operation, and the like as the type of the input operation, for example. In addition, when an input which has been continuously sensed is interrupted, the operation acceptance unit 413 senses that a contact input is released from the touch screen 45.

The sound acceptance unit 414 accepts a sound generated in a surrounding of the distribution terminal 400, and generates audio data of the sound. As an example, the sound acceptance unit 414 accepts a spoken sound by the player, and generates audio data of the sound.

The motion identification unit 415 identifies motion data selected by the player from the motion list 422 according to the input operation by the player.

The movement instruction data generation unit 416 generates movement instruction data. As an example, the movement instruction data generation unit 416 generates movement instruction data including the generated audio data and the identified motion data.

Note that the functions of the HMD set 1000, the server 200, and the user terminal 100 which are illustrated in FIG. 6 and the function of the distribution terminal 400 illustrated in FIG. 7 are merely examples. Each device of the HMD set 1000, the server 200, the user terminal 100, and the distribution terminal 400 may include at least some of functions included in other devices. Furthermore, still another device other than the HMD set 1000, the server 200, the user terminal 100, and the distribution terminal 400 may be constituted as a component of the system 1, and the still another device may be caused to execute part of processing in the system 1. That is, the computer which performs the game program in the present embodiment may be the HMD set 1000, the server 200, the user terminal 100, the distribution terminal 400, and any of other devices other than the above, or may be realized by a combination of a plurality of these devices.

Control Processing of Virtual Space

Figure 8:
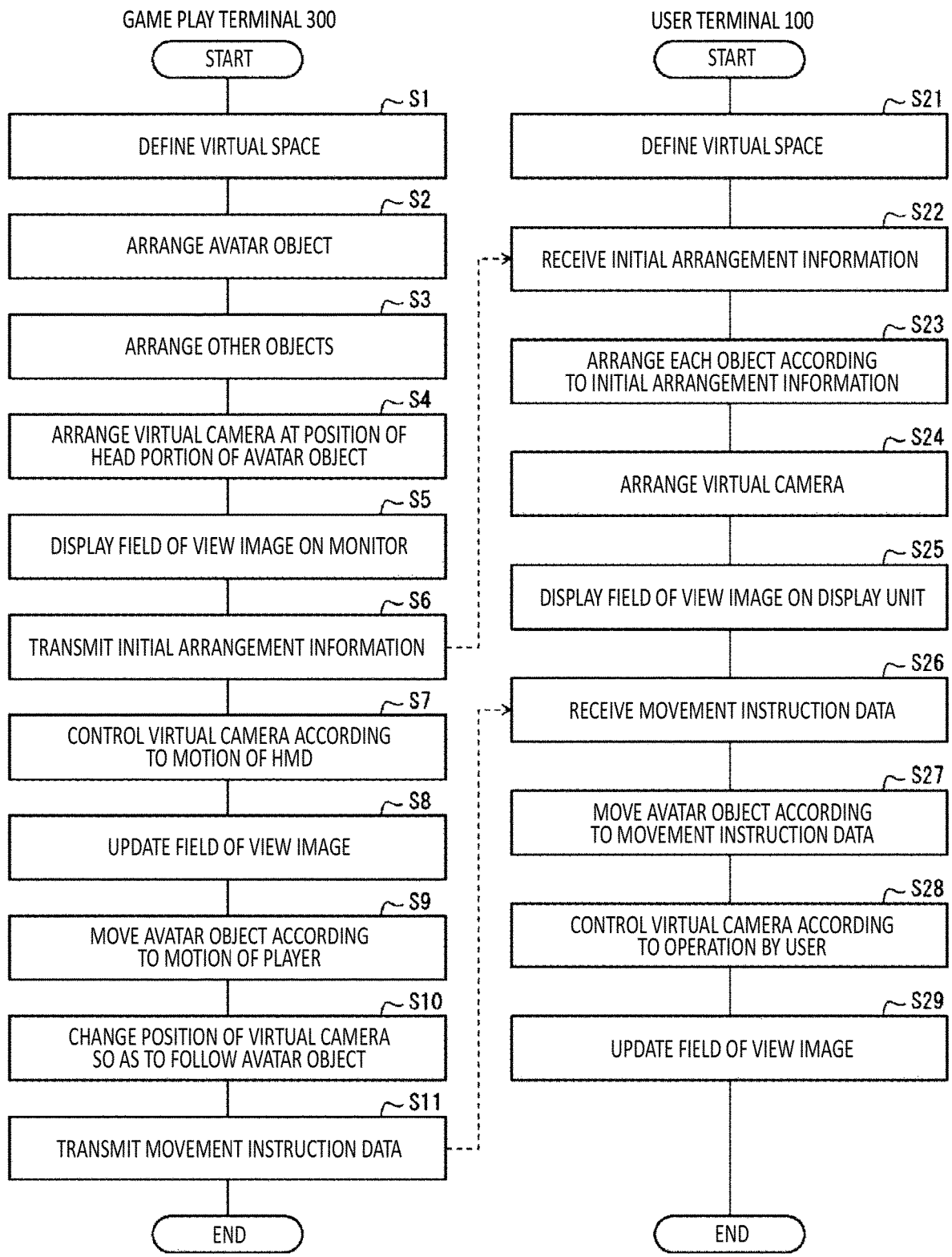
FIG. 8 is a flowchart representing part of processing executed in the user terminal and the game play terminal in accordance with an embodiment.
Figure 9:
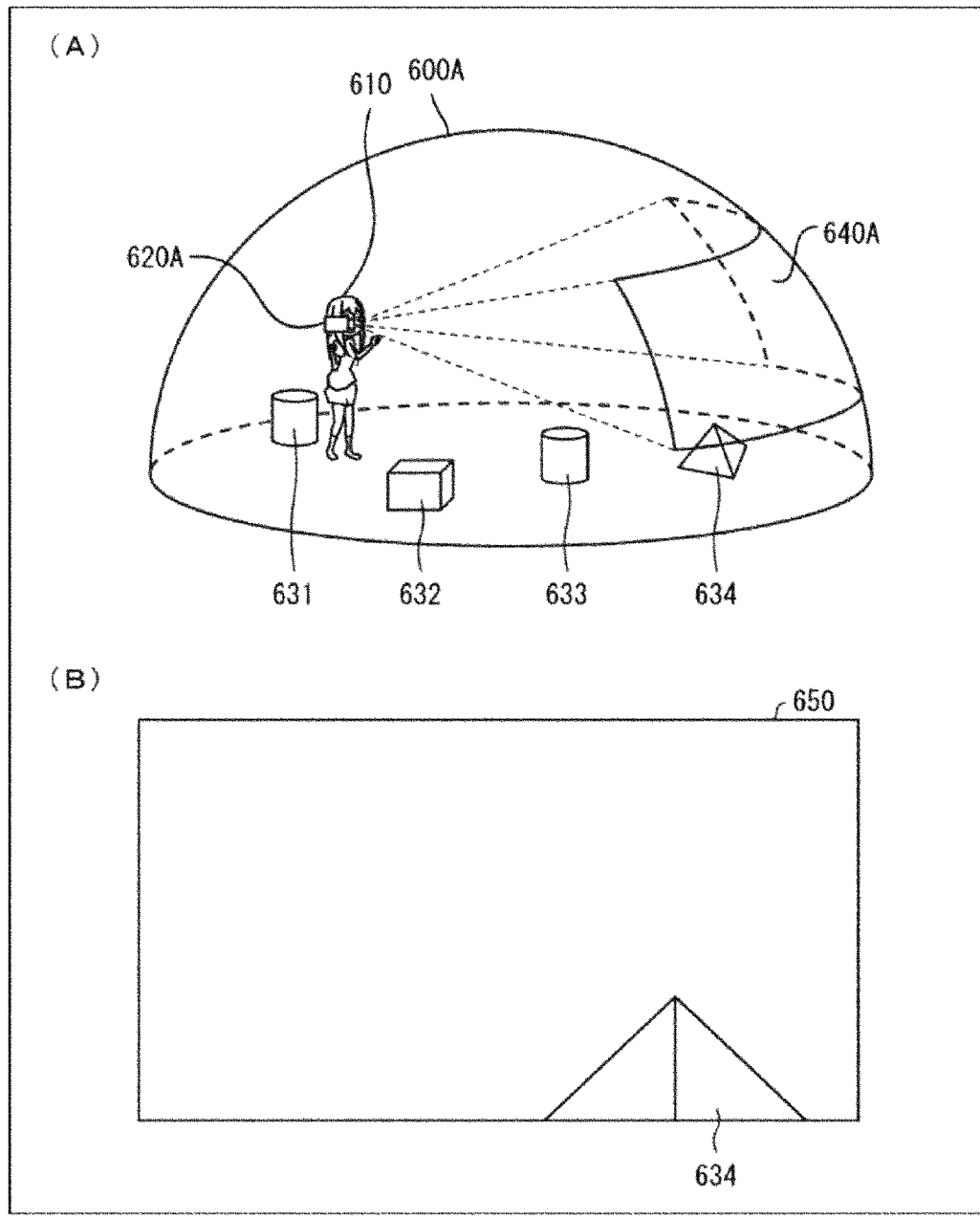
FIG. 9 illustrates an example of a virtual space provided to a player and a field of view image visually recognized by the player in accordance with an embodiment.
Figure 10:
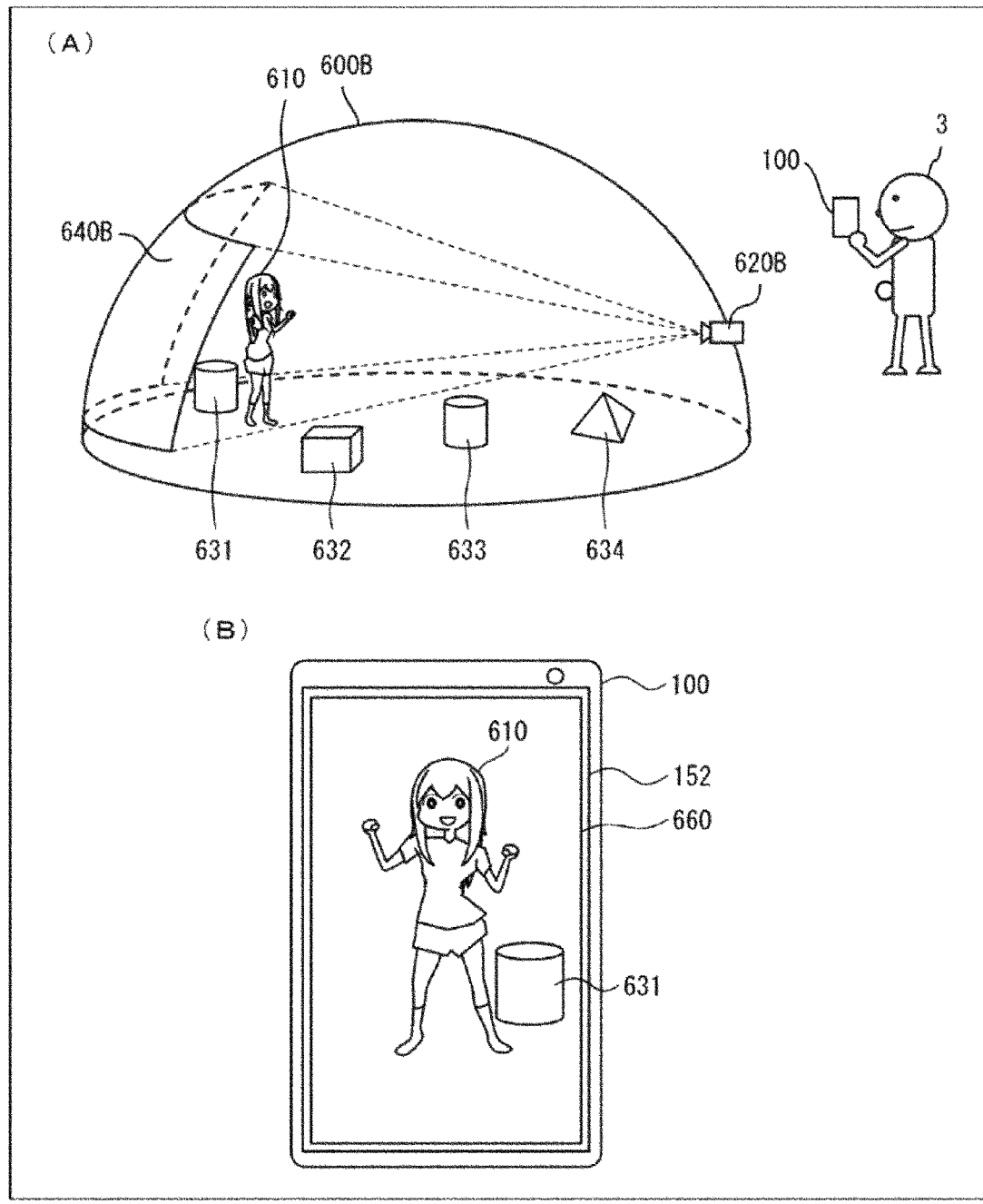
FIG. 10 illustrates an example of a virtual space provided to a user of the user terminal and a field of view image visually recognized by the user in accordance with an embodiment.

FIG. 8 is a flowchart illustrating an example of a flow of control processing of the virtual space provided to the player and the virtual space provided to the user of the user terminal 100. FIG. 9 illustrates a virtual space 600A provided to the player and a field of view image visually recognized by the player in accordance with an embodiment. FIG. 10 illustrates a virtual space 600E1 provided to the user of the user terminal 100 and a field of view image visually recognize by the user in accordance with an embodiment. Note that hereinafter, when there is no need to distinguish the virtual spaces 600A and 600B from each other, the virtual spaces 600A and 600B are referred to as a "virtual space 600" or "virtual spaces 600".

In step S1, the processor 30 defines the virtual space 600A illustrated in FIG. 9 as the virtual space control unit 316. The processor 30 defines the virtual space 600A by using virtual space data (not illustrated). The virtual space data may be stored in the game play terminal 300. The processor 30 may generate the virtual space data based on the game program 331. The processor 30 may acquire the virtual space data from an external device such as the server 200.

The virtual space 600 has a full spherical structure covering an entirety in a 360-degree direction of a point defined as a center as an example. In order not to complicate the description in FIG. 9 and FIG. 10, an upper half of a sphere of the virtual space 600 is exemplified.

In step S2, the processor 30 which serves as the virtual space control unit 316 arranges an avatar object 610 (character) in the virtual space 600A. The avatar object 610 is an avatar object associated with the player, and moves according to an input operation by the player.

In step S3, the processor 30 which serves as the virtual space control unit 316 arranges other objects in the virtual space 600A. In the example of FIG. 9, the processor 30 arranges objects 631 to 634. The other objects may include, for example, a character object (so-called non-player character (NPC)) which moves according to the game program 331, an operation object such as a virtual hand, an object which imitates an animal, a plant, an artificial material, a natural material, or the like to be arranged according to the progress of the game, and the like.

In step S4, the processor 30 which serves as the virtual space control unit 316 arranges a virtual camera 620A in the virtual space 600A. The processor 30 arranges the virtual camera 620A at a position of a head portion of the avatar object 610 as an example.

In step S5, the processor 30 displays a field of view image 650 on the monitor 51 and the display 530. The processor 30 defines a field of view area 640A which is a field of view from the virtual camera 620A in the virtual space 600A according to an initial position and an initial inclination of the virtual camera 620A. Then, the processor 30 defines the field of view image 650 corresponding to the field of view area 640A. The processor 30 causes the HMD 500 and the display 530 to display the field of view image 650 by outputting the field of view image 650 to the monitor 51 and the display 530.

In the example of FIG. 9, since part of the object 634 is included in the field of view area 640A as illustrated in (A) of FIG. 9, the field of view image 650 includes part of the object 634 as illustrated in (B) of FIG. 9.

In step S6, the processor 30 transmits initial arrangement information to the user terminal 100 via the server 200. The initial arrangement information refers to information indicating initial arrangement locations of various objects in the virtual space 600A. In the example of FIG. 9, the initial arrangement information includes information of initial arrangement locations of the avatar object 610 and the objects 631 to 634. It can be stated that the initial arrangement information is one piece of the game progress information.

In step S7, the processor 30 which serves as the virtual space control unit 316 controls the virtual camera 620A according to a motion of the HMD 500. Specifically, the processor 30 controls an orientation and an inclination of the virtual camera 620A according to the motion of the HMD 500, that is, an attitude of the head portion of the player. As described below, when the player moves the head portion (changes the attitude of the head portion), the processor 30 moves the head portion of the avatar object 610 in accordance with this motion. The processor 30 controls the orientation and the inclination of the virtual camera 620A, for example, such that a direction of a line of sight of the avatar object 610 matches a direction of a line of sight of the virtual camera 620A. In step S8, the processor 30 updates the field of view image 650 according to the changes of the orientation and the inclination of the virtual camera 620A.

In step S9, the processor 30 which serves as the virtual space control unit 316 moves the avatar object 610 according to a motion of the player. As an example, the processor 30 causes the avatar object 610 to change its position in the virtual space 600A according to the player changing its position in the reality space. In addition, the processor 30 moves the head portion of the avatar object 610 in the virtual space 600A according to the player moving the head portion in the reality space.

In step S10, the processor 30 which serves as the virtual space control unit 316 causes the virtual camera 620A to change its position so as to follow the avatar object 610. That is, even when the avatar object 610 changes its position, the virtual camera 620A is regularly at the position of the head portion of the avatar object 610.

The processor 30 updates the field of view image 650 according to the virtual camera 620A changing its position. That is, the processor 30 updates the field of view area 640A according to the attitude of the head portion of the player and the position of the virtual camera 620A in the virtual space 600A. As a result, the field of view image 650 is updated.

In step S11, the processor 30 transmits the movement instruction data of the avatar object 610 to the user terminal 100 via the server 200. The movement instruction data herein includes at least any of motion data that incorporates the movement of the player, audio data of a spoken sound by the player, or operation data indicating content of an input operation on the controller 540 during a virtual experience (for example, during a game play). When the player is playing the game, the movement instruction data is transmitted to the user terminal 100 as the game progress information, for example.

The processing in steps S7 to S11 is continuously repeatedly executed while the player is playing the game.

In step S21, the processor 10 of the user terminal 100 of a user 3 which serves as the virtual space control unit 116 defines the virtual space 600B illustrated in FIG. 10. The processor 10 defines the virtual space 600B by using virtual space data (not illustrated). The virtual space data may be stored in the user terminal 100. The processor 10 may generate the virtual space data based on the game program 131.

The processor 10 may acquire the virtual space data from an external device such as the server 200.

In step S22, the processor 10 receives the initial arrangement information. In step S23, the processor 10 which serves as the virtual space control unit 116 arranges various objects in the virtual space 600B according to the initial arrangement information. In a case of the example of FIG. 10, the various objects are the avatar object 610 and the objects 631 to 634.

In step S24, the processor 10 which serves as the virtual space control unit 116 arranges a virtual camera 620B in the virtual space 600B. The processor 10 arranges the virtual camera 620B at a position illustrated in (A) of FIG. 10 as an example.

In step S25, the processor 10 displays a field of view image 660 on the display unit 152. The processor 10 defines a field of view area 640B which is a field of view from the virtual camera 620B in the virtual space 600B according to an initial position and an initial inclination of the virtual camera 620B. Then, the processor 10 defines the field of view image 660 corresponding to the field of view area 640B. The processor 10 causes the display unit 152 to display the field of view image 660 by outputting the field of view image 660 to the display unit 152.

In the example of FIG. 10, as illustrated in (A) of FIG. 10, since the avatar object 610 and the object 631 are included in the field of view area 640B, the field of view image 660 includes the avatar object 610 and the object 631 as illustrated in (B) of FIG. 10.

In step S26, the processor 10 receives the movement instruction data. In step S27, the processor 10 which serves as the virtual space control unit 116 moves the avatar object 610 in the virtual space 600B according to the movement instruction data. In other words, the processor 10 plays a video in which the avatar object 610 moves by real-time rendering.

In step S28, the processor 10 which serves as the virtual space control unit 116 controls the virtual camera 620B according to an operation by the user which has been accepted by the processor 10 which serves as the operation acceptance unit 111. In step S29, the processor 10 updates the field of view image 660 according to the change of the position of the virtual camera 620B in the virtual space 600B and the changes of the orientation and the inclination of the virtual camera 620B. Note that in step S28, the processor 10 may automatically control the virtual camera 620B according to the motion of the avatar object 610, for example, the avatar object 610 changing its position or orientation. For example, the processor 10 may automatically cause the virtual camera 620B to change its position or change its orientation and inclination so as to regularly capture the avatar object 610 from the front. In addition, as an example, according to the motion of the avatar object 610, the processor 10 may automatically cause the virtual camera 620B to change its position or change its orientation and inclination so as to regularly capture the avatar object 610 from the back.

In this manner, in the virtual space 600A, the avatar object 610 moves according to the motion of the player. The movement instruction data indicating this movement is transmitted to the user terminal 100. In the virtual space 600B, the avatar object 610 moves according to the received movement instruction data. With this configuration, the avatar object 610 performs the similar movement in the virtual space 600A and the virtual space 600B. In other words, the user 3 can visually recognize the movement of the avatar object 610 in accordance with the movement of the player by using the user terminal 100.

Game Overview

Figure 11:
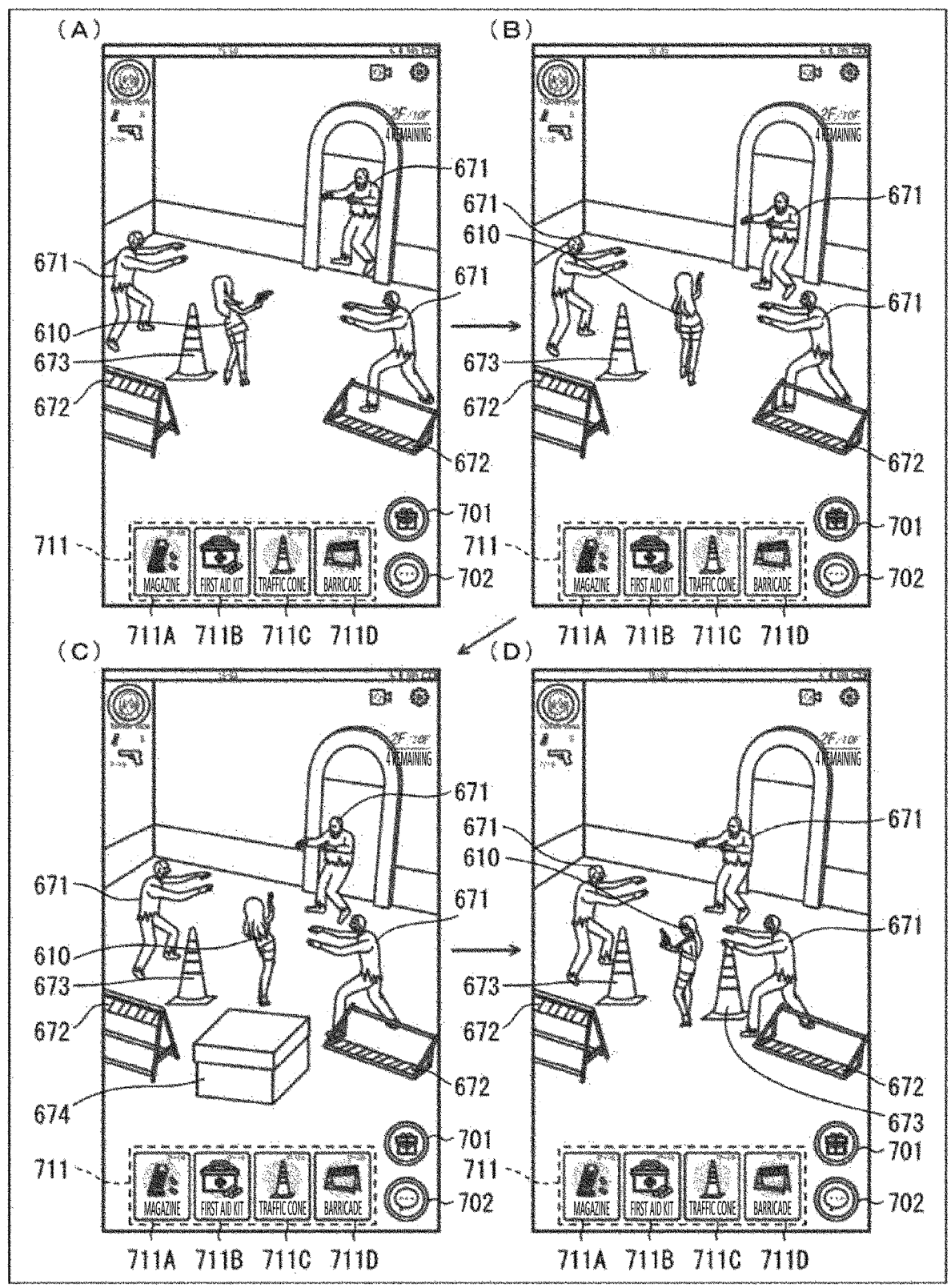
FIG. 11 illustrates another example of the field of view image visually recognized by the user of the user terminal.

FIG. 11 illustrates another example of the field of view image displayed in the user terminal 100. Specifically, FIG. 11 illustrates an example of the game screen of the game (the present game) in which the player is playing which is executed by the system 1.

The present game is, as an example, a game in which the avatar object 610 operating a weapon such as a gun or a knife and a plurality of enemy objects 671 which is an NPC are caused to appear in the virtual space 600, and the avatar object 610 is caused to fight against the enemy objects 671.

Various game parameters such as a strength of the avatar object 610, the number of usable magazines, the remaining number of bullets in the gun, and the remaining number of enemy objects 671 are updated according to the progress of the game.

A plurality of stages is prepared in the present game, and when a predetermined achievement condition associated in each stage is met, the player can clear the stage. The predetermined achievement condition may include, for example, a condition to be met by defeating all the emerging enemy objects 671, defeating a boss object among the emerging enemy objects 671, acquiring a predetermined item, reaching a predetermined position, and the like. The achievement condition is defined in the game program 131. Note that in the present game, according to content of the game, when the achievement condition is met, it is decided that the player clears the stage, in other words, winning against the enemy objects 671 by the avatar object 610 (victory or defeat between the avatar object 610 and the enemy objects 671) is decided. On the other hand, for example, when the game executed in the system 1 is a racing game or the like, when a condition of reaching a goal is met, a ranking of the avatar object 610 is decided.

In the present game, since the virtual space is shared among the HMD set 1000 and a plurality of user terminals 100, the game progress information is live streamed to a plurality of user terminals 100 every predetermined time. As a result, the field of view image in the field of view area defined by the virtual camera 620B corresponding to the user terminal 100 is displayed on the touch screen 15 of the user terminal 100 during viewing of the game. In addition, parameter images representing the strength of the avatar object 610, the number of usable magazines, the remaining number of bullets in the gun, the remaining number of enemy objects 671, and the like displayed in a superimposed manner in an upper right section and an upper left section of the field of view image. It can be stated that this field of view image is the game screen.

As described above, the game progress information includes the motion data that incorporates the movement of the player, the audio data of the spoken sound by the player, and the operation data indicating the content of the input operation on the controller 540. These pieces of data are, that is, information for identifying a position, an attitude, an orientation, and the like of the avatar object 610, information for identifying positions, attitudes, orientations, and the like of the enemy objects 671, and information for identifying positions and the like of other objects (for example, obstacle objects 672 and 673). The processor 10 identifies the position, the attitude, the orientation, and the like of each of the objects by analyzing (rendering) the game progress information.

The game information 132 includes data of various objects such as the avatar object 610, the enemy objects 671, and the obstacle objects 672 and 673. The processor 10 updates the position, the attitude, the orientation, and the like of each of the objects by using the data and a result of analyzing the game progress information. With this configuration, as the game progresses, each of the objects in the virtual space 600B similarly moves as in each of the objects in the virtual space 600A. Specifically, in the virtual space 600B, each of the objects including the avatar object 610 moves based on the game progress information irrespective of the presence or absence of the operation from the user on the user terminal 100.

UI images 701 and 702 are superimposed on the field of view image to be displayed on the touch screen 15 of the user terminal 100 as an example. The UI image 701 is a UI image which accepts an operation for displaying, on the touch screen 15, a UI image 711 which accepts an item input operation for assisting the avatar object 610 from the user 3. The UI image 702 is a UI image which accepts an operation for displaying, on the touch screen 15, a UI image (described below) which accepts, from the user 3, an operation for inputting and transmitting a comment for the avatar object 610 (in other words, a player 4). The operations to be accepted by the UI images 701 and 702 may be operations of tapping the UI images 701 and 702, for example.

When the UI image 701 is tapped, the UI image 711 is superimposed on the field of view image to be displayed. The UI image 711 includes, for example, a UI image 711A in which an icon of a magazine is drawn, a UI image 711B in which an icon of a first aid kit is drawn, a UI image 711C in which an icon of a traffic cone is drawn, and a UI image 711D in which an icon of a barricade is drawn. The item input operation is equivalent to an operation of tapping any UI image, for example.

As an example, when the UI image 711A is tapped, the remaining number of bullets in the gun used by the avatar object 610 increases. When the UI image 711B is tapped, the strength of the avatar object 610 recovers. When the UI images 711C and 711D are tapped, the obstacle objects 672 and 673 for blocking the enemy objects 671 from changing their positions are arranged in the virtual space. One of the obstacle objects 672 and 673 may be more effective than another to block the enemy objects 671 from changing their positions.

The processor 10 transmits, to the server 200, item input information indicating that the item input operation has been performed. The item input information includes at least information for identifying a type of the item which has been designated by the item input operation. The item input information may include other information related to the item such as information indicating a position at which the item is arranged. The item input information is transmitted to the other user terminals 100 and the HMD set 1000 via the server 200.

Figure 12:
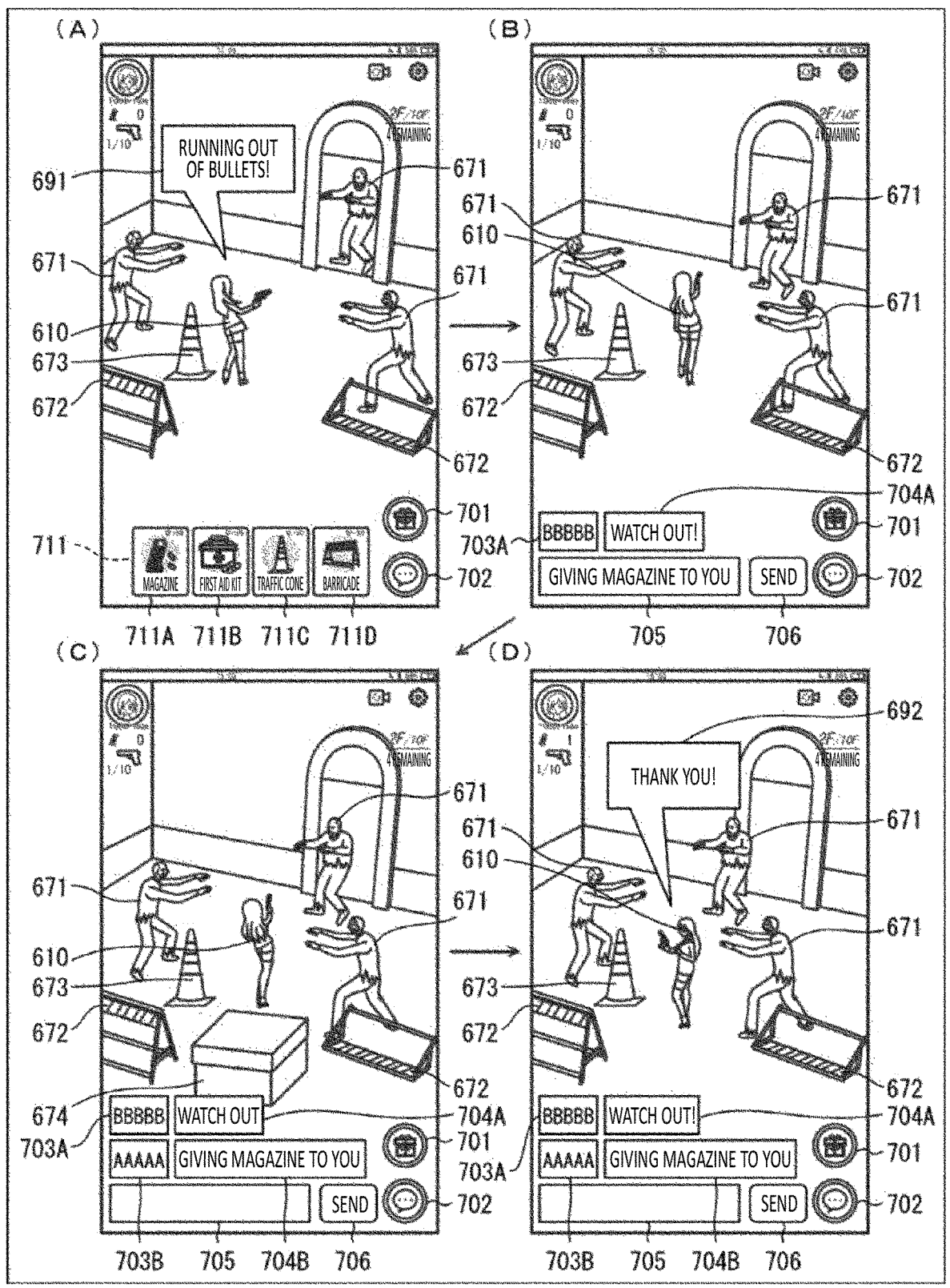
FIG. 12 illustrates still another example of the field of view image visually recognized by the user of the user terminal.

FIG. 12 illustrates another example of the field of view image displayed in the user terminal 100. Specifically, FIG. 12 illustrates an example of the game screen of the present game for describing communication between the player and the user terminal 100 during the game play.

In the example of (A) of FIG. 12, the user terminal 100 causes the avatar object 610 to execute a speech 691. Specifically, the user terminal 100 causes the avatar object 610 to execute the speech 691 according to audio data included in the game progress information. Content of the speech 691 is "running out of bullets!" which has been spoken by the player 4. That is, the content of the speech 691 is to tell each user that the player is about to lose means to attack the enemy objects 671 since the number of magazines becomes 0, and the number of bullets loaded into the gun becomes 1.

Note that in (A) of FIG. 12, a speech bubble is used to visually illustrate a speech by the avatar object 610, but in actuality, a sound is output from a speaker of the user terminal 100. Note that together with the sound output, the speech bubble illustrated in (A) of FIG. 12 (that is, a speech bubble including a text of the audio content) may be displayed in the field of view image. The same also applies to a speech 692 described below.

When the tap operation on the UI image 702 is accepted, the user terminal 100 superimposes UI images 705 and 706 (message UIs) on the field of view image to be displayed as illustrated in (B) of FIG. 12. The UI image 705 is a UI image which displays a comment for the avatar object 610 (in other words, the player). The UI image 706 is a UI image which accepts, from the user 3, a comment transmission operation for transmitting the input comment.

When the tap operation on the UI image 705 is accepted, as an example, the user terminal 100 displays a UI image imitating a keyboard (which is not illustrated in the drawing, and is hereinafter simply referred to as a "keyboard") on the touch screen 15. The user terminal 100 displays, on the UI image 705, a text in accordance with an input operation by the user on the keyboard. In the example of (B) of FIG. 12, a text "giving magazine to you" is displayed on the UI image 705.

After the text is input, as an example, when the tap operation on the UI image 706 is accepted, the user terminal 100 transmits, to the server 200, comment information including information indicating the input content (content of the text) and information indicating the user. The comment information is transmitted to the other user terminals 100 and the HMD set 1000 via the server 200.

A UI image 703A is a UI image indicating a username of the user who has transmitted the comment, and a UI image 704A is a UI image indicating content of the comment transmitted by the user. In the example of (B) of FIG. 12, a user with a username of "BBBBB" uses the user terminal 100 of its own to transmit comment information of content "watch out!", so that the UI image 703A and the UI image 704A are displayed. The UI image 703A and UI image 704A are displayed on the touch screens 15 of all the user terminals 100 participating in the present game and the monitor 51 of the HMD 500. Note that the UI images 703A and 704A may be a single UI image. That is, the username and the content of the comment may be included in a single UI image.

In the example of (C) of FIG. 12, a user with a username of "AAAAA" who is a user of the user terminal 100 illustrated in FIG. 12 inputs and transmits the comment as described above, so that UI images 703B and 704B are displayed on the touch screen 15. The UI image 703B includes the username "AAAAA", and the UI image 704B includes the comment "giving magazine to you" which has been input in the example of (B) of FIG. 12.

In addition, the example of (C) of FIG. 12 is a field of view image 611 after the user "AAAAA" further inputs the tap operation on the UI image 701, displays the UI image 711 on the touch screen 15, and inputs the tap operation on the UI image 711A. That is, as a result of the transmission of the item input information indicating the magazine from the user terminal 100 of the user "AAAAA" to the other user terminals 100 and the HMD set 1000, the user terminals 100 and the HMD set 1000 arrange a dramatization object 674 (described below) in the virtual space 600. As an example, after a lapse of an elapsed time indicated by the item input information, the user terminals 100 and the HMD set 1000 execute a dramatization related to the dramatization object 674, and execute processing to exert an effect of the item object.

In the example of (D) of FIG. 12, by executing the processing to exert the effect of the item object, the number of magazines increases from 0 to 1. As a result, the player speaks "thank you!" to the user "AAAAA", and audio data of the speech is transmitted to each of the user terminals 100. With this configuration, each of the user terminals 100 outputs the sound "thank you!" as the speech 692 by the avatar object 610.

As described above, in the present game, the communication between the user and the avatar object 610 is realized by the output of the speech sound of the avatar object 610 based on the speech of the player and the input of the comment by each user.

Game Progress Processing in Game Play Terminal 300

Figure 13:
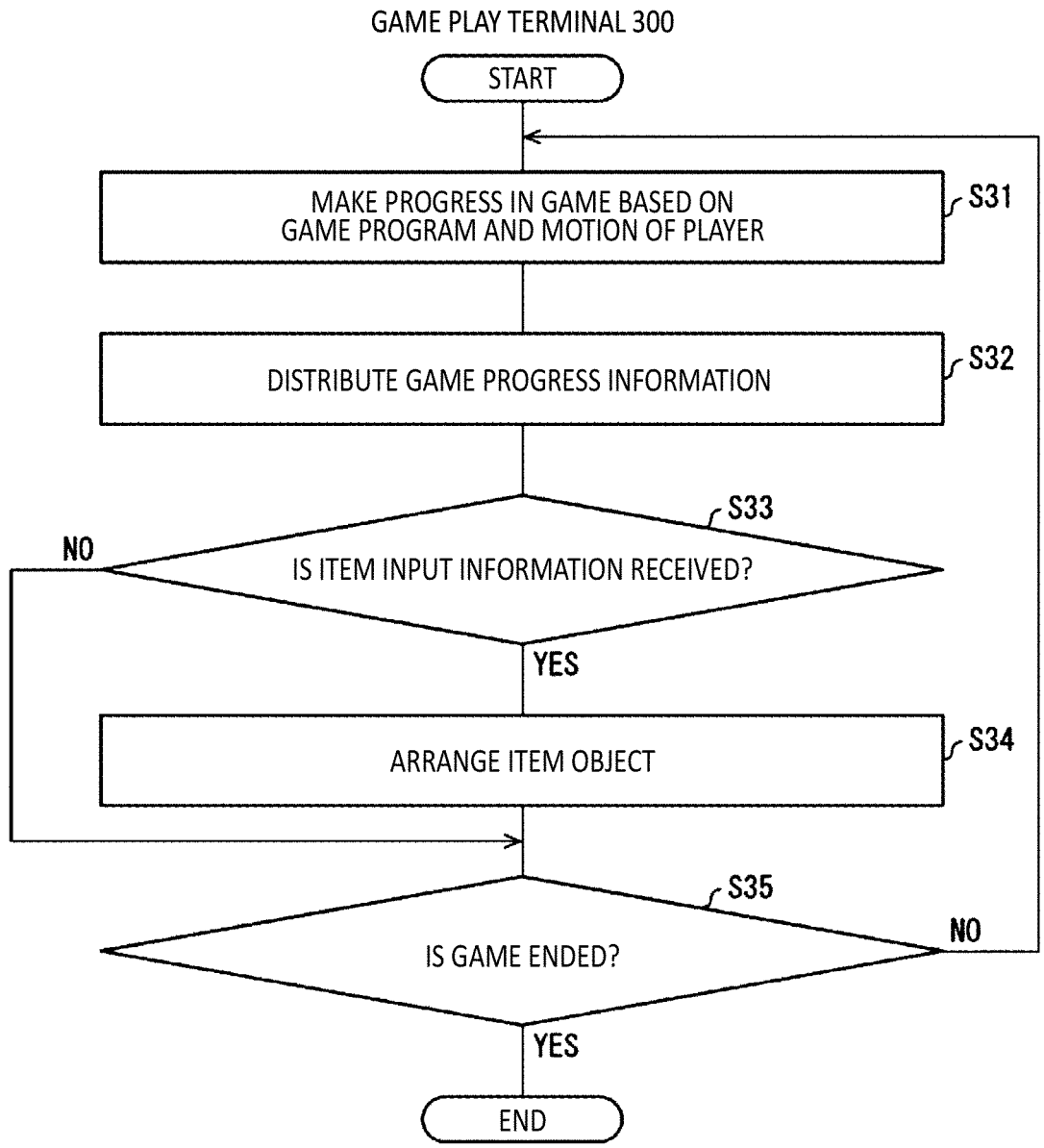
FIG. 13 is a flowchart representing part of the processing executed by the game play terminal in accordance with an embodiment.

FIG. 13 is a flowchart illustrating an example of a flow of game progress processing executed by the game play terminal 300.

In step S31, the processor 30 which serves as the game progress unit 315 makes progress in the game based on the game program 331 and motions of the player. In step S32, the processor generates game progress information to be distributed to the user terminal 100. Specifically, the processor 30 transmits the generated game progress information to each of the user terminals 100 via the server 200.

In step S33, when the item input information is received (YES in S33), the processor 30 arranges the item object in the virtual space 600A based on the item input information in step S34. As an example, before the arrangement of the item object, the processor 30 arranges the dramatization object 674 in the virtual space 600A (see (C) of FIG. 11). The dramatization object 674 may be, for example, an object imitating a present box. As an example, after a lapse of an elapsed time indicated by the item input information, the processor 30 may execute the dramatization related to the dramatization object 674. The dramatization may be, for example, an animation in which a lid of the present box opens. After the execution of the animation, the processor 30 executes the processing to exert the effect of the item object. For example, in the example of (D) of FIG. 11, the obstacle object 673 is arranged.

After the execution of the animation, the processor 30 may arrange, in the virtual space 600A, an item object corresponding to a UI image on which the tap operation has been performed. For example, when the tap operation is performed on the UI image 711A, after the execution of the animation, the processor 30 arranges a magazine object representing the magazine in the virtual space 600A. In addition, when the tap operation is performed on the UI image 7118, after the execution of the animation, the processor 30 arranges a first aid kit object representing the first aid kit in the virtual space 600A. When the avatar object 610 changes its position to a position of the magazine object or the first aid kit object, for example, the processor 30 may execute the processing to exert the effect of the magazine object or the first aid kit object.

Until the game is ended, the processor 30 continues and repeats the processing in steps S31 to S34. When the game is ended, for example, when the player inputs a predetermined input operation for ending the game (YES in step S35), the processing illustrated in FIG. 13 ends.

Game Progress Processing in User Terminal 100

Figure 14:
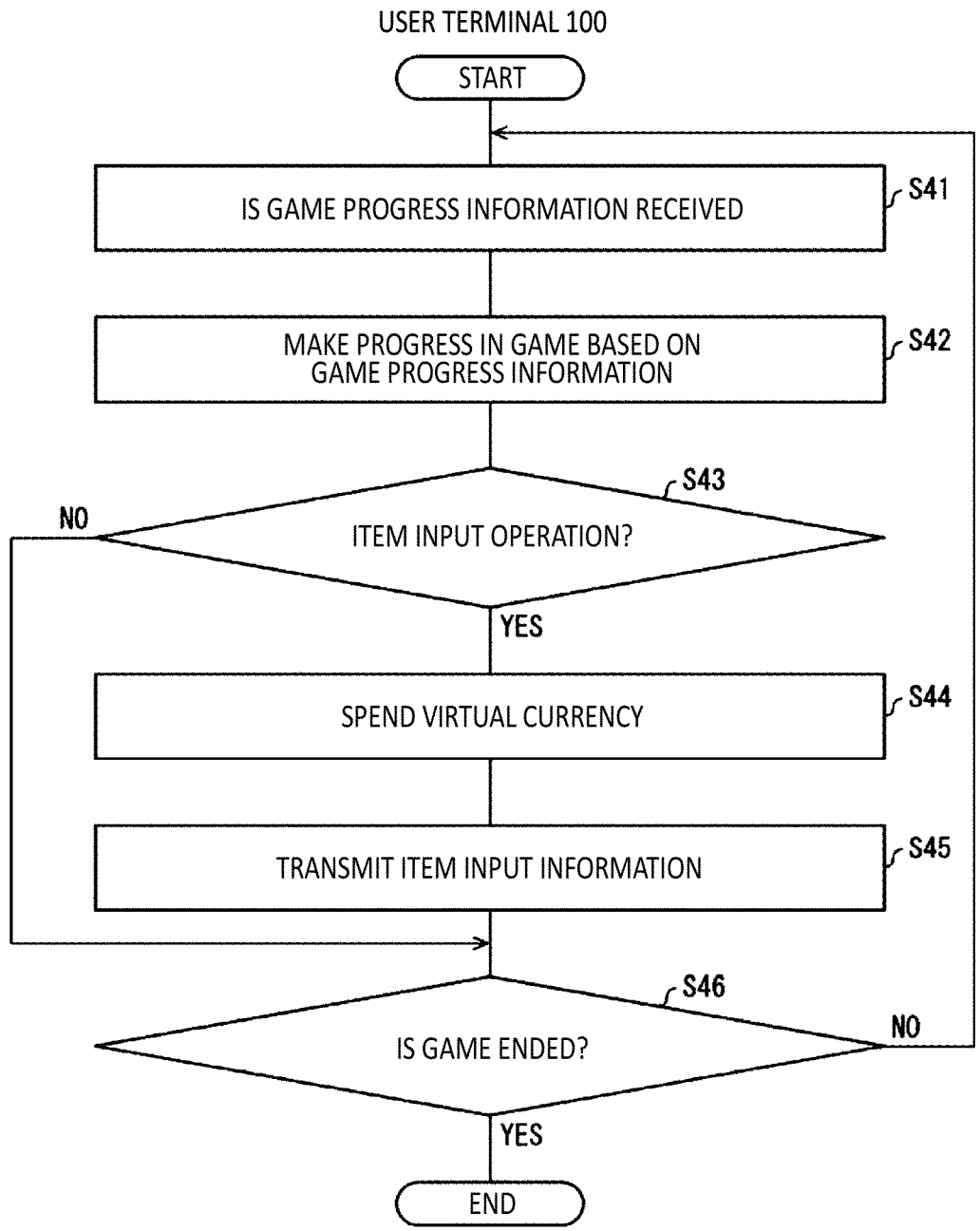
FIG. 14 is a flowchart representing part of the processing executed by the user terminal in accordance with an embodiment.

FIG. 14 is a flowchart illustrating an example of the flow of the game progress processing executed in the user terminal 100.

In step S41, the processor 10 receives the game progress information. In step S42, the processor 10 which serves as the game progress unit 115 makes progress in the game based on the game progress information.

In step S43, when the processor 10 accepts the item input operation by the user 3 (YES in step S43), the processor 10 spends a virtual currency in step S44 to arrange the dramatization object 674 in the virtual space 600B. Herein, the virtual currency may be purchased by performing a predetermined operation on the processor 10 by the user 3 before the participation in the game or during the participation in the game (paying for the present game), or may be awarded to the user 3 when a predetermined condition is satisfied. The predetermined condition may be a condition where the participation in the present game is required such as clearing a quest in the present game, or may be a condition where the participation in the present game is not required such as answering a questionnaire. An amount of the virtual currency (holding of the virtual currency) is stored in the user terminal 100 as the game information 132 as an example.

In step S45, the processor 10 transmits the item input information to the server 200. The item input information is transmitted to the game play terminal 300 via the server 200.

Upon a lapse of a predetermined time after the arrangement of the dramatization object 674, the processor 10 arranges an item object in the virtual space 600A. In the example of FIG. 11, the obstacle object 673 is arranged. That is, when the user 3 inputs the tap operation on the UI image 711C, a predetermined amount of the virtual currency is spent to arrange the obstacle object 673.

The processor 10 continues and repeats the processing in steps S41 to S45 until the game is ended. When the game is ended, for example, when the player inputs the predetermined input operation for ending the game or when the user 3 performs a predetermined input operation for leaving in the middle of the game (YES in step S46), the processing illustrated in FIG. 14 ends.

Game Progress Processing in Server 200

Figure 15:
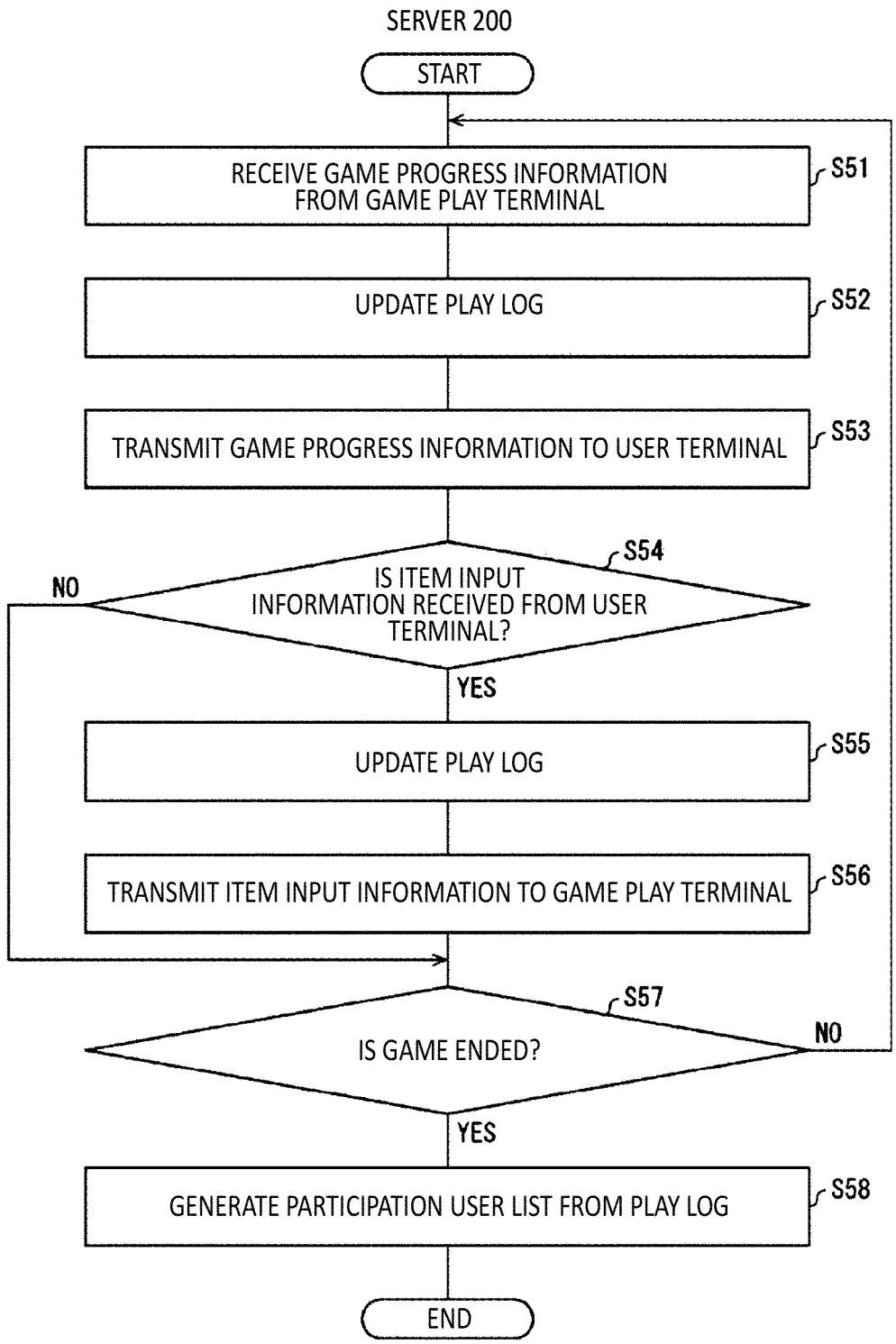
FIG. 15 is a flowchart representing part of processing executed by the server in accordance with an embodiment.

FIG. 15 is a flowchart illustrating an example of the flow of the game progress processing executed in the server 200.

In step S51, the processor 20 receives the game progress information from the game play terminal 300. In step S52, the processor 20 which serves as the log generation unit 212 updates a log of the game progress (hereinafter, a play log). Note that when the initial arrangement information is received from the game play terminal 300, as an example, the processor 20 generates the play log.

In step S53, the processor 20 transmits the received game progress information to each of the user terminals 100.

In step S54, when the item input information is received from any of the user terminals 100 (YES in step S54), the processor 20 which serves as the log generation unit 212 updates the play log in step S55. In step S56, the processor 20 transmits the received item input information to the game play terminal 300.

Until the game is ended, the processor 20 continues and repeats the processing in steps S51 to S56. When the game is ended, for example, when information indicating the end of the game is received from the game play terminal 300 (YES in step S57), the processor 20 which serves as the list generation unit 213 generates a list (user list 234) of the users who have participated in the game from the play log in step S58. The processor 20 stores the generated user list 234 in the server 200.

FIG. 16 illustrates a specific example of the user list 234. Information indicating each user who has participated in the game (for example, username) is stored in a column of "user". Information (tag) generated based on assistance provided to the player by each user is stored in a column of "tag". In the example of FIG. 16, a tag without quotation marks among the tags stored in the column "tag" is information automatically generated by the processor 20, and a tag with quotation marks is information manually input by the operator of the game.

In the example of FIG. 16, information 'magazine, 10 F, boss, "beat the boss thanks to the magazine as a present"' is associated with the user "AAAAA". This indicates, for example, that in a battle against a boss on a stage of 10 F, the user "AAAAA" has input a magazine, and the avatar object 610 beat the boss by a bullet of the magazine that has been input.

In addition, information that 'first aid kit, 3 F, minor villain, "recovered on the brink of game over"' is associated with the user "BBBBB". This indicates, for example, that in a battle against small enemies on a stage of 3 F, the user "BBBBB" has input a first aid kit, and as a result, on the brink of a moment when a strength of the avatar object 610 becomes 0 (the game is over), the strength recovered.

In addition, information 'barricade, 5 F, minor villain, "stopped two zombies by the barricade"' is associated with the user "CCCCC". This indicates, for example, that in a battle against small enemies on a stage of 5 F, the user "CCCCC" has input a barricade (obstacle object 672 in FIG. 11), and as a result, two small enemies were successfully stopped.

In the example of FIG. 16, one assistance provided is associated with the username of each of the users 3, but tags of respective assistances provided multiple times are associated with the username of the user 3 who has provided the assistances multiple times. In the user list 234, each of the tags is preferably distinct. With this configuration, after the end of the game, the player referring to the user list 421 by using the distribution terminal 400 can accurately grasp the content of each assistance.

Distribution of Movement Instruction Data

Distribution Processing in Distribution Terminal 400

Figure 17:
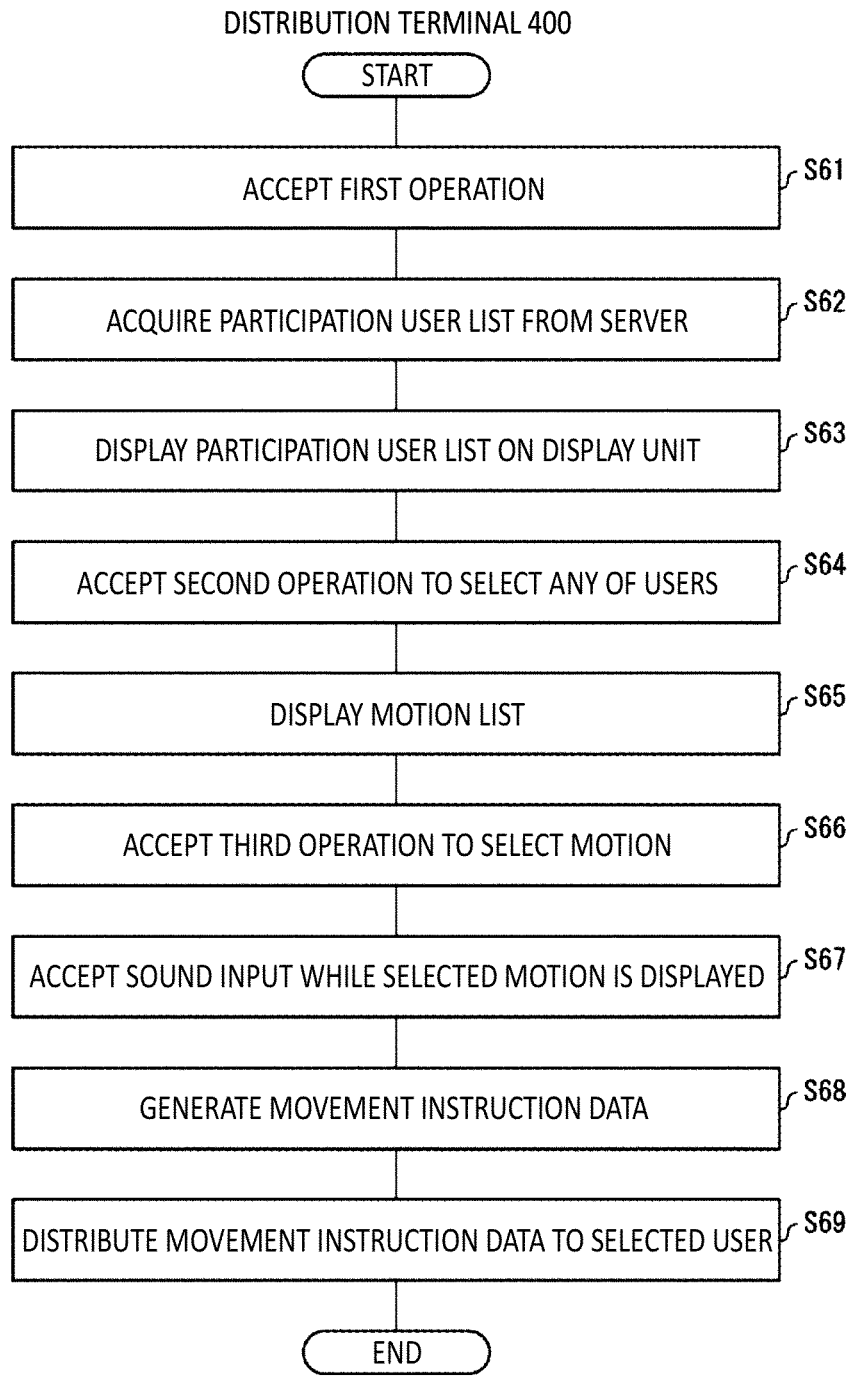
FIG. 17 is a flowchart representing part of processing executed by the distribution terminal in accordance with an embodiment.
Figure 18:
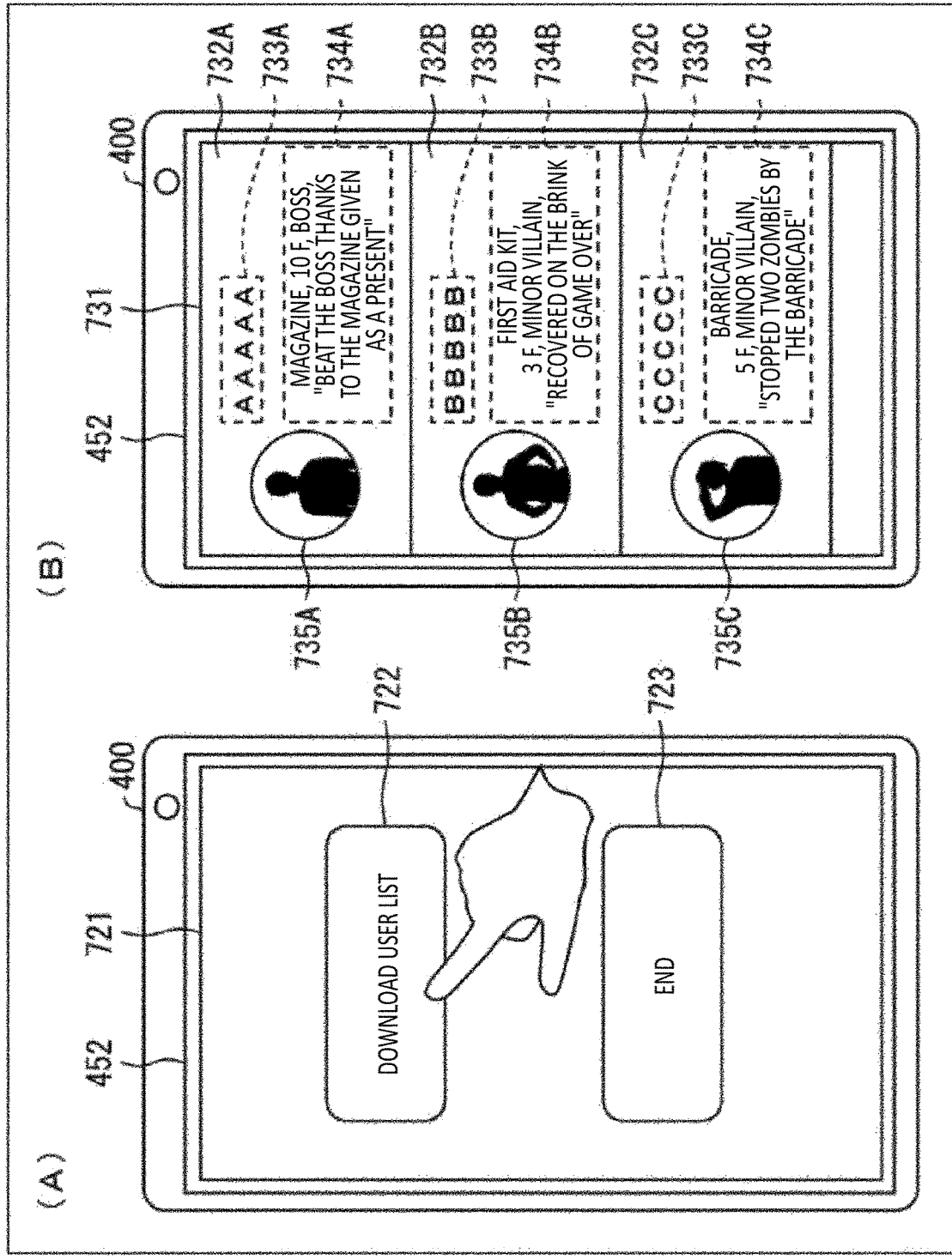
FIG. 18 illustrates a specific example of a screen displayed on the distribution terminal in accordance with an embodiment.
Figure 19:
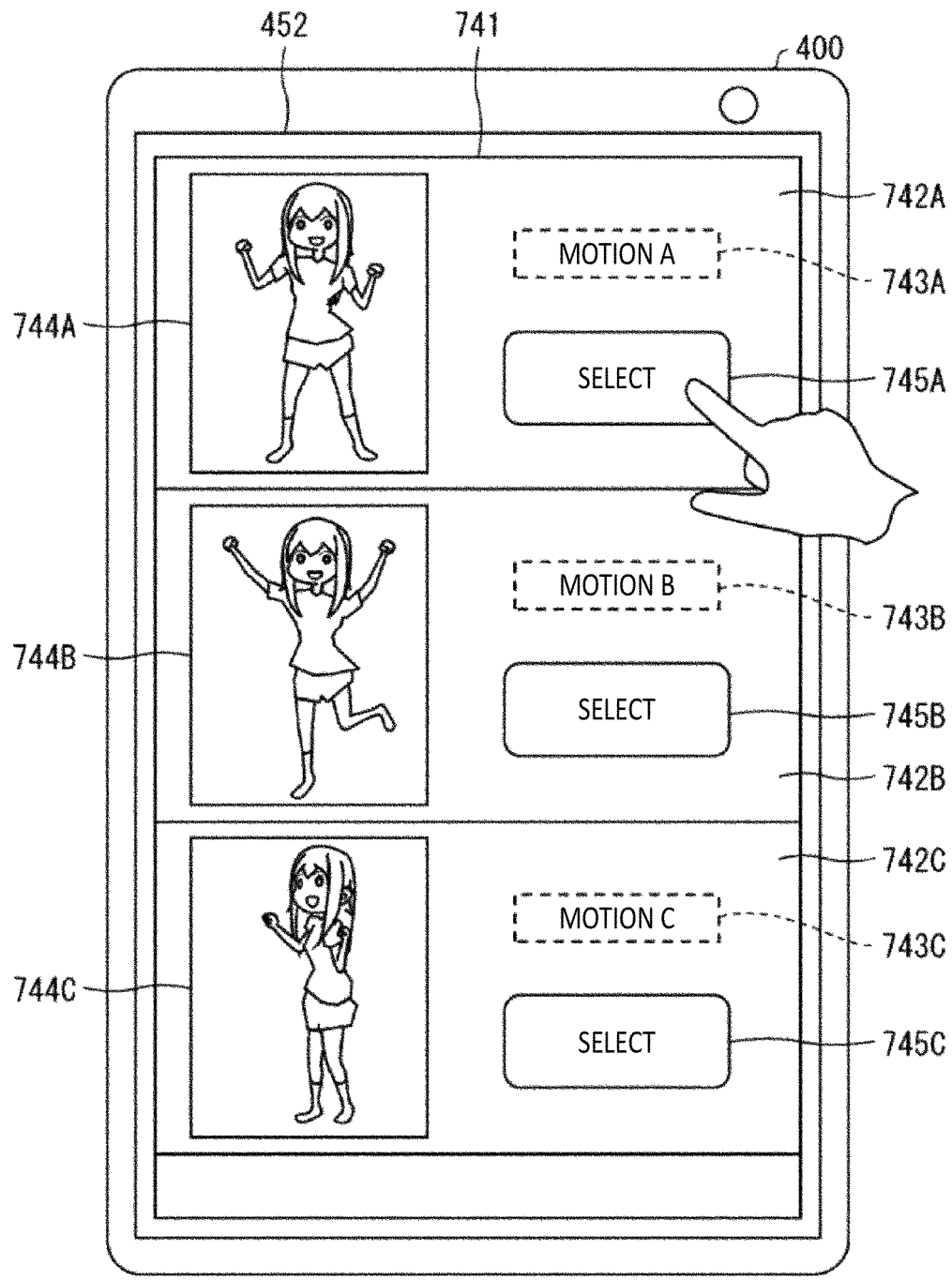
FIG. 19 illustrates another specific example of the screen displayed on the distribution terminal in accordance with an embodiment.

FIG. 17 is a flowchart illustrating an example of a flow of distribution processing executed by the distribution terminal 400. FIG. 18 illustrates a specific example of a screen displayed on the distribution terminal 400. FIG. 19 illustrates another specific example of the screen displayed on the distribution terminal.

In step S61, the processor 40 which serves as the operation acceptance unit 413 accepts a first operation for displaying a list (user list 234) of the users who have participated in the game. A download screen 721 illustrated in (A) of FIG. 18 is a screen for downloading the user list 234 from the server 200 to be displayed on the display unit 452. The download screen 721 is a screen displayed immediately after an activation operation for an application to execute the distribution processing illustrated in FIG. 17 is input to the distribution terminal 400 as an example.

The download screen 721 includes UI images 722 and 723 as an example. The UI image 722 accepts an operation for downloading the user list 234, that is, the above described first operation. The first operation may be, for example, an operation of tapping the UI image 722. The UI image 723 accepts an operation for ending the application. The operation may be, for example, an operation of tapping the UI image 723.

When the tap operation on the UI image 722 is accepted, in step S62, the processor 40 which serves as the communication control unit 411 acquires (receives) the user list 234 from the server 200. In step S63, the processor 40 which serves as the display control unit 412 causes the display unit 452 to display the user list 234. Specifically, the processor 40 causes the display unit 452 to display a user list screen generated based on the user list 234. The user list screen may be a user list screen 731 illustrated in (B) of FIG. 18 as an example. The user list screen 731 is formed of record images corresponding to respective records in the user list 234. As the record images, record images 732A to 732C are described in the example of (B) of FIG. 18, but the number of record images is not limited to three. In the example of (B) of FIG. 18, when the number of records in the user list 234 is more than three (that is, the number of users who have participated in the game is more than three), by inputting an operation of scrolling a screen (for example, a drag operation or a flicking operation) to the touch screen 45, for example, the player can cause the display unit 452 to display other record images.

As an example, the record images 732A to 732C respectively include usernames 733A to 733C, tag information 734A to 734C, and icons 735A to 735C. Hereinafter, when distinguishment is not necessarily needed, the record images 732A to 732C, the usernames 733A to 733C, the tag information 734A to 734C, and the icons 735A to 735C are respectively referred to as a "record image 732" or "record images 732", a "username 733" or "usernames 733", "tag information 734", and an "icon 735" or "icons 735".

The username 733 is information indicating each user who has participated in the game which is stored in the column of "user" in the user list 234. The tag information 734 is information indicating a tag associated with each information indicating each user who has participated in the game in the user list 234. For example, the record image 732A includes "AAAAA" as the username 733A. Thus, the record image 732A includes 'magazine, 10 F, boss, "beat the boss thanks to the magazine as a present"' which is associated with "AAAAA" in the user list 234 as the tag information 734A. The icon 735 is, for example, an image previously set by the user.

Note that the processor 40 may store the received user list in the distribution terminal 400 (the user list 421 in FIG. 7). The download screen 721 may include a UI image (not illustrated) for displaying the user list 421 in the display unit 452. In this example, when the UI image is tapped, the processor 40 does not download the user list 234, but reads a user list 421 and generates a user list screen from the user list 421 to cause the display unit 452 to display the user list screen.

In step S64, the processor 40 which serves as the operation acceptance unit 413 accepts a second operation for selecting any of users included in the user list screen 731. The second operation may be an operation of tapping any of record images 732 in the user list screen 731 as an example. In the example of (B) of FIG. 18, the player inputs the tap operation on the record image 732A. That is, the player selects the user "AAAAA" as a user to which the movement instruction data is to be distributed.

When the tap operation on the record image 732 is accepted, in step S65, the processor which serves as the display control unit 412 causes the display unit 452 to display the motion list 422. Specifically, the processor 40 causes the display unit 452 to display a motion list screen generated based on the motion list 422. The motion list screen may be a motion list screen 741 illustrated in FIG. 19 as an example. The motion list screen 741 is formed of a record image corresponding to each record in the motion list 422. In the example of FIG. 19, record images 742A to 742C are described as record images, but the number of record images is not limited to three. In the example of FIG. 19, when the number of records in the motion list 422 is more than four, for example, by inputting an operation of scrolling a screen (for example, a drag operation or a flicking operation) to the touch screen 45, the player can cause the display unit 452 to display other record images.

As an example, the record images 742A to 742C respectively include motion names 743A to 743C, motion images 744A to 744C, and UI images 745A to 745C. Hereinafter, when distinguishment is not necessarily needed, the record images 742A to 742C, the motion names 743A to 743C, the motion images 744A to 744C, and the UI images 745A to 745C are respectively referred to as a "record image 742" or "record images 742", a "motion name 743" or "motion names 743", a "motion image 744" or "motion images 744", and a "UI image 745" or "UI images 745".

The motion name 743 is information to identify a motion stored in the motion list 422. The motion image 744 is an image generated from motion data associated with each motion name in the motion list 422. The processor 40 includes an image of the avatar object 610 taking a first attitude in each motion data in the record image 742 as the motion image 744 as an example. The motion image 744 may be a UI image which accepts a predetermined operation by the player (for example, the tap operation on the motion image 744). When the predetermined operation is accepted, the processor 40 may play a motion moving picture in which the avatar object 610 moves based on the motion data. When the motion moving picture ends, the processor 40 may automatically display the motion list screen 741 again.

Note that the record image 742 may include, for example, a UI image including a text "motion playback" instead of the motion image 744.

In step S66, the processor 40 which serves as the operation acceptance unit 413 accepts a third operation to select a motion. The third operation may be a tap operation on the UI image 745 as an example. That is, the UI image 745 accepts an operation to select motion data corresponding to each of the record images 742. Since the third operation is accepted, the processor 40 which serves as the motion identification unit 415 identifies motion data selected by the player.

In step S67, the processor 40 which serves as the display control unit 412 and the sound acceptance unit 414 accepts a sound input by the player while the motion moving picture is played in which the avatar object 610 moves based on the selected motion data.

Figure 20:
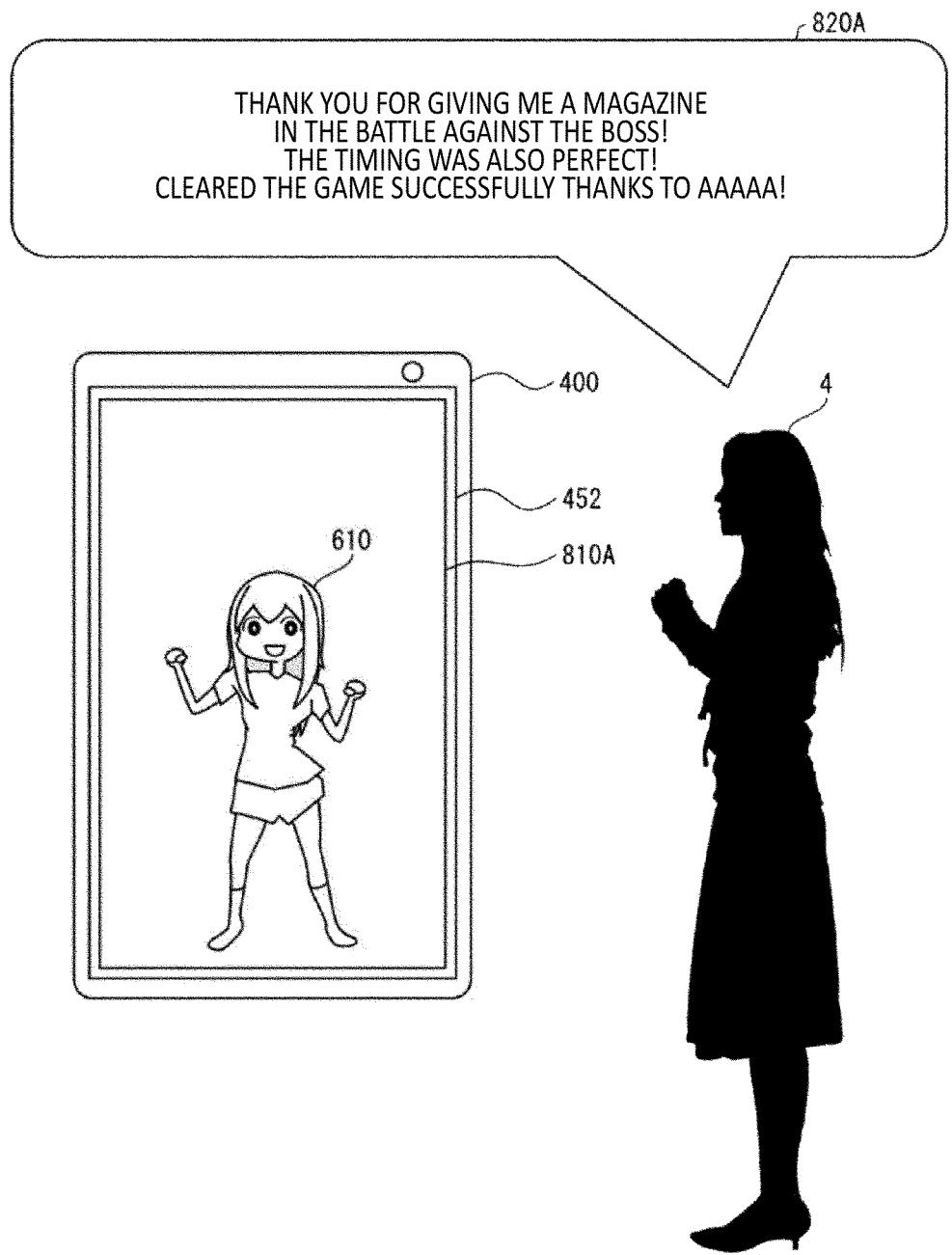
FIG. 20 illustrates a specific example of a sound input by the player in accordance with an embodiment.

FIG. 20 illustrates a specific example of the sound input by the player 4. As illustrated in FIG. 20, the player 4 inputs a speech sound 820A while playing a motion moving picture 810A. This speech sound 820A is a speech sound addressed to the user 3 with the username "AAAAA" (hereinafter, a user 3A). That is, in the example of FIG. 20, in step S64, the player 4 selects the user 3A (first user) to create movement instruction data addressed to the user 3A. Note that the user terminal 100 used by the user 3A is set as a user terminal 100A.

The speech sound 820A is a speech sound addressed to the user 3A, and is therefore a speech sound based on content of an assistance provided by the user 3A to the avatar object 610 (in other words, the player 4). Specifically, in the battle against the boss on the stage of 10 F, the user 3A has input the magazine, and the avatar object 610 beat the boss by a bullet of the magazine that has been input. Thus, the speech sound 820A has content "Thank you for giving me a magazine in the battle against the boss! The timing was also perfect! Cleared the game successfully thanks to AAAAA!". In this manner, the speech sound preferably includes the content of the assistance provided by the user 3 in the game and an acknowledgement of the user 3.

In an aspect, before the sound input is started, that is, before the third operation is input to the distribution terminal 400, the player 4 creates the speech content addressed to the user 3. In another aspect, the speech content addressed to the user 3 may be automatically generated by the processor 40. In addition, the processor 40 may superimpose and display a tag associated with the user 3 selected by the second operation on the motion moving picture 810A.

The processor 40 converts the accepted sound into audio data. In step S68, the processor 40 which serves as the movement instruction data generation unit 416 generates the movement instruction data including the audio data and the motion data of the selected motion.

Figure 21:
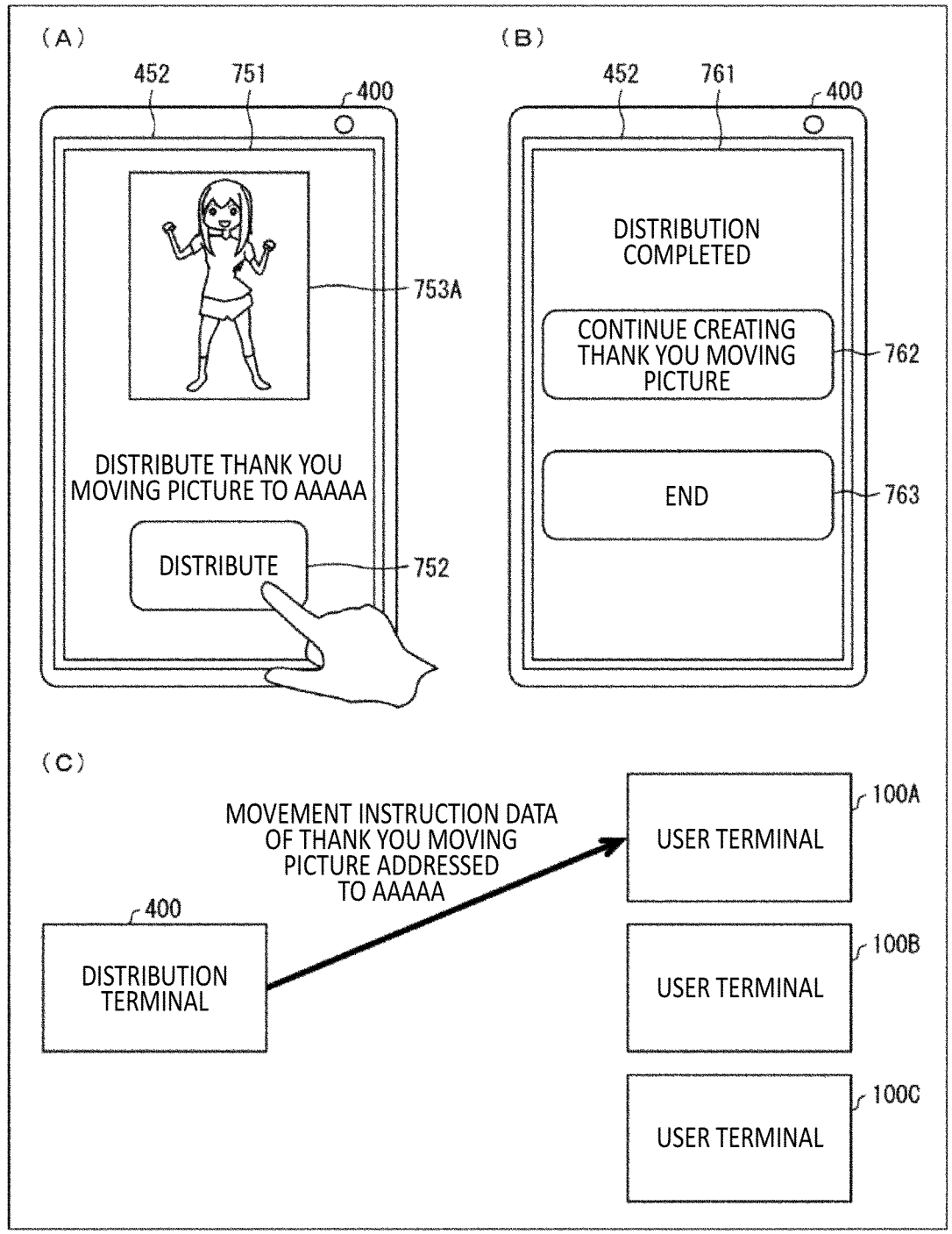
FIG. 21 illustrates still another specific example of the screen displayed on the distribution terminal and an overview of a distribution of movement instruction data in accordance with an embodiment.

In step S69, the processor 40 which serves as the communication control unit 411 distributes the generated movement instruction data to the user terminal 100 (first computer) of the selected user 3 (in the example of FIG. 20, the user 3A). FIG. 21 illustrates still another specific example of the screen displayed on the distribution terminal 400. After the execution in step S68, the processor 40 which serves as the display control unit 412 causes the display unit 452 to display a distribution screen. The distribution screen may be a distribution screen 751 illustrated in (A) of FIG. 21 as an example. The distribution screen 751 includes a UI image 752 and a motion image 753A. In addition, as illustrated in (A) of FIG. 21, the distribution screen 751 may be a screen including information indicating a user at a distribution destination of the movement instruction data.

The UI image 752 accepts an operation for distributing the movement instruction data to the selected user 3. The operation may be a tap operation on the UI image 752, for example. The motion image 753A is a UI image which accepts an operation for playing a moving picture based on the generated movement instruction data, that is, a moving picture based on the movement instruction data generated for the user 3A. The operation may be a tap operation on the motion image 753A, for example. Note that the UI image which accepts the operation for playing the generated moving picture is not limited to the motion image 753A. For example, a UI image including a text "moving picture playback" may be used. When the moving picture ends, the processor 40 may automatically display the distribution screen 751 again.

Preferably, the distribution screen 751 further includes a UI image which accepts an operation for returning to accept a sound input. The operation may be a tap operation on the UI image, for example. Since the distribution screen 751 includes the UI image, when the sound input fails, for example, if content for the speech is wrong or the like, the player 4 can perform the sound input again. Note that the UI image may be a UI image which accepts an operation for returning to select motion data.

When the tap operation on the UI image 752 is accepted, the processor 40 transmits the movement instruction data together with information indicating the user 3A to the server 200. The server 200 identifies the user terminal 100 at the transmission destination of the movement instruction data based on the information indicating the user 3A, and transmits the movement instruction data to the identified user terminal 100 (that is, the user terminal 100A).

When the transmission of the movement instruction data is ended, as an example, the processor 40 may cause the display unit 452 to display a distribution completion screen 761 illustrated in (B) of FIG. 21. The distribution completion screen 761 includes UI images 762 and 763 as an example. In addition, as illustrated in (B) of FIG. 21 the distribution completion screen 761 may be a screen including a text indicating completion of the transmission of the movement instruction data.

The UI image 762 accepts an operation for starting a creation of the movement instruction data addressed to another user 3. The operation may be an operation of tapping the UI image 762, for example. When the tap operation is accepted, the processor 40 causes the display unit 452 to display the user list screen again. That is, when the tap operation is accepted, the distribution processing returns to step S63. At this time, the processor 40 may generate a user list screen based on the user list 421 stored in the distribution terminal 400, and cause the display unit 452 to display the user list screen. The UI image 763 accepts an operation for ending the application. The operation may be an operation of tapping the UI image 763, for example. When the operation is accepted, the distribution processing ends.

In the example described with reference to FIG. 20 and FIG. 21, the distribution terminal 400 transmits the movement instruction data of the moving picture addressed to the user 3A (the user 3 with the username "AAAAA") to only the user terminal 100A as illustrated in (C) of FIG. 21.

Figure 22:
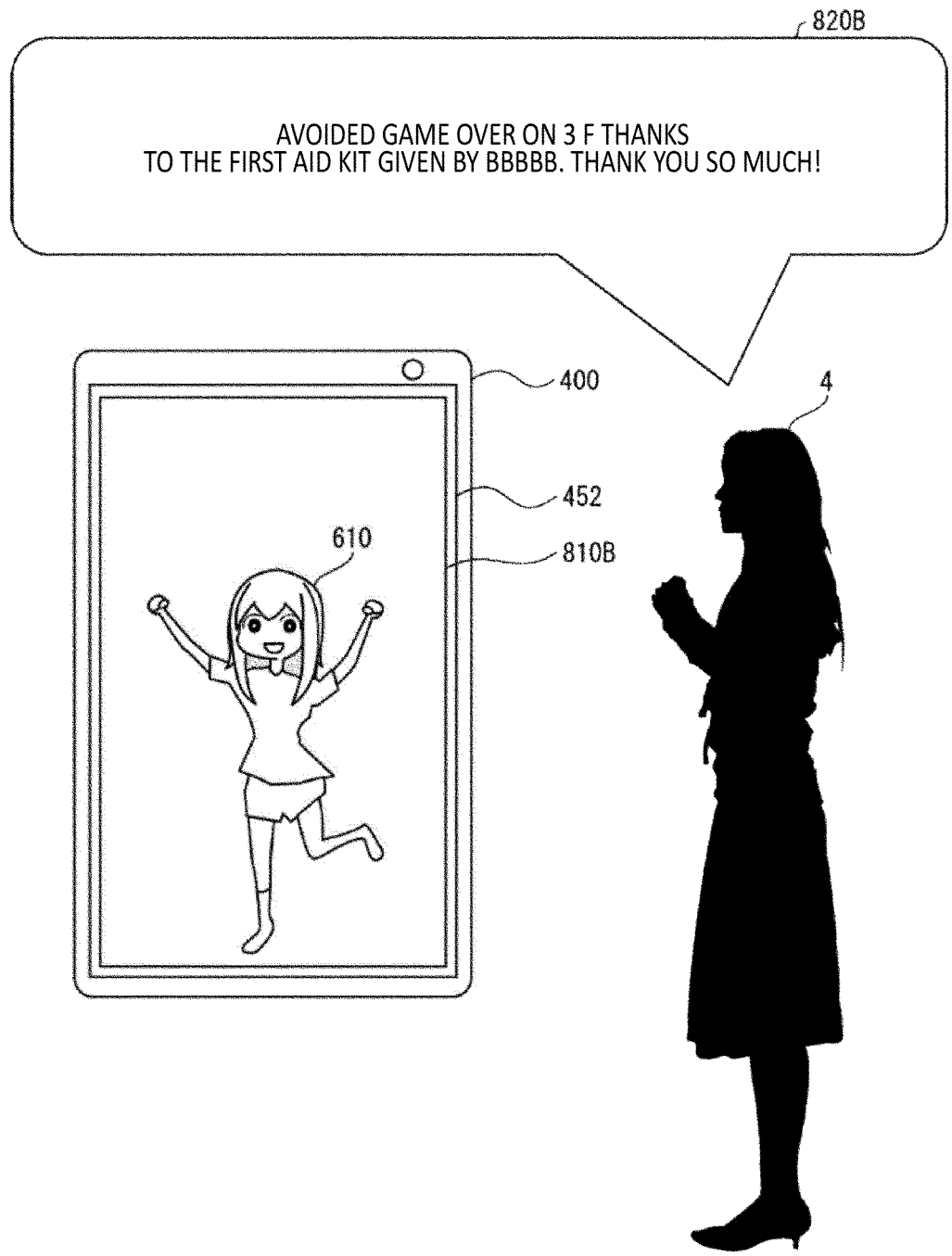
FIG. 22 illustrates another specific example of the sound input by the player in accordance with an embodiment.

FIG. 22 illustrates another specific example of the sound input by the player 4. As illustrated in FIG. 22, the player 4 inputs a speech sound 820B while playing a motion moving picture 810B. This speech sound 820B is a speech sound addressed to the user 3 with the username "BBBBB" (hereinafter, a user 3B). That is, in the example of FIG. 22, the player 4 inputs the tap operation on the record image 732B corresponding to the user 3B in step S64 to create the movement instruction data addressed to the user 3B. Note that the user terminal 100 used by the user 3B is set as a user terminal 100B.

The speech sound 820B is a speech sound addressed to the user 3B, and is therefore a speech sound based on content of an assistance provided by the user 3B to the avatar object 610 (in other words, the player 4). Specifically, with regard to the user 3B, in the battle against the small enemies on the stage of 3 F, the user "BBBBB" has input the first aid kit, and as a result, on the brink of the moment when the strength of the avatar object 610 becomes 0 (the game is over), the strength recovered. Thus, the speech sound 820B has content "Avoided game over on 3 F thanks to the first aid kit given by BBBBB. Thank you so much!".

Figure 23:
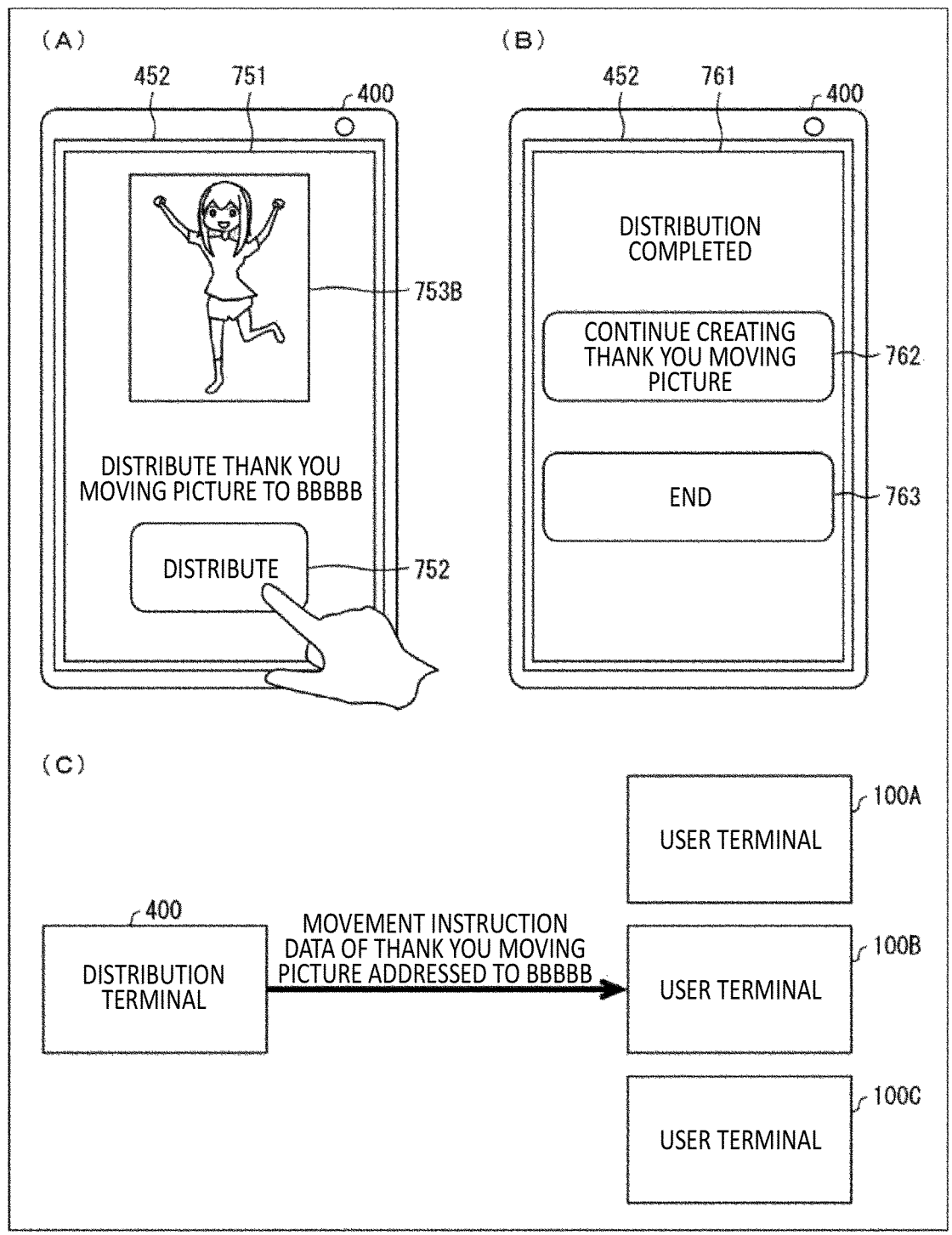
FIG. 23 illustrates still another specific example of the screen displayed on the distribution terminal and the overview of the distribution of the movement instruction data in accordance with an embodiment.

FIG. 23 illustrates still another specific example of the screen displayed on the distribution terminal 400. The distribution screen 751 illustrated in (A) of FIG. 23 includes the UI image 752 and a motion image 753B. When the tap operation is accepted, the motion image 753B plays a moving picture based on the movement instruction data generated for the user 3B.

When the tap operation on the UI image 752 is accepted, the processor 40 transmits the movement instruction data together with information indicating the user 3B to the server 200. The server 200 identifies the user terminal 100 at the transmission destination of the movement instruction data based on the information indicating the user 3B, and transmits the movement instruction data to the identified user terminal 100 (that is, the user terminal 100B).

In the example described with reference to FIG. 22 and FIG. 23, the distribution terminal 400 transmits the movement instruction data of the moving picture addressed to the user 3B (the user 3 with the username "BBBBB") to only the user terminal 100B as illustrated in (C) of FIG. 23.

As described above, the content of the sound based on the audio data included in the movement instruction data is based on the content of the assistance provided to the player 4 in the most recent participation in the game by the user 3. Since the content of the assistance varies for each of the users 3, the content of the sound has different content for each of the users 3. That is, after the end of the game, pieces of the movement instruction data including the sound of mutually different content are transmitted to the user terminals 100 of at least some of the users 3 who have participated in the game.

In addition, a motion of the avatar object 610 in the example of FIG. 22 is different from the motion in the example of FIG. 20. That is, in the generation of the movement instruction data addressed to the user 3B, the player 4 selects motion data which is different from that at the time of the generation of the movement instruction data addressed to the user 3A. Specifically, in step S66, the player 4 inputs the tap operation on the UI image 7458 to select motion data corresponding to the record image 7428. In this manner, the player 4 can set the motion data included in the movement instruction data to be different for each of the users 3.

Then, the movement instruction data for each of the users 3 which includes the audio data with the content different for each of the users 3 and the motion data selected for each of the users 3 is transmitted to only the user terminal 100 of each of the users 3. In other words, the movement instruction data unique to each of the user terminals 100 is transmitted to each of the user terminals 100 of the selected users 3.

Figure 24:
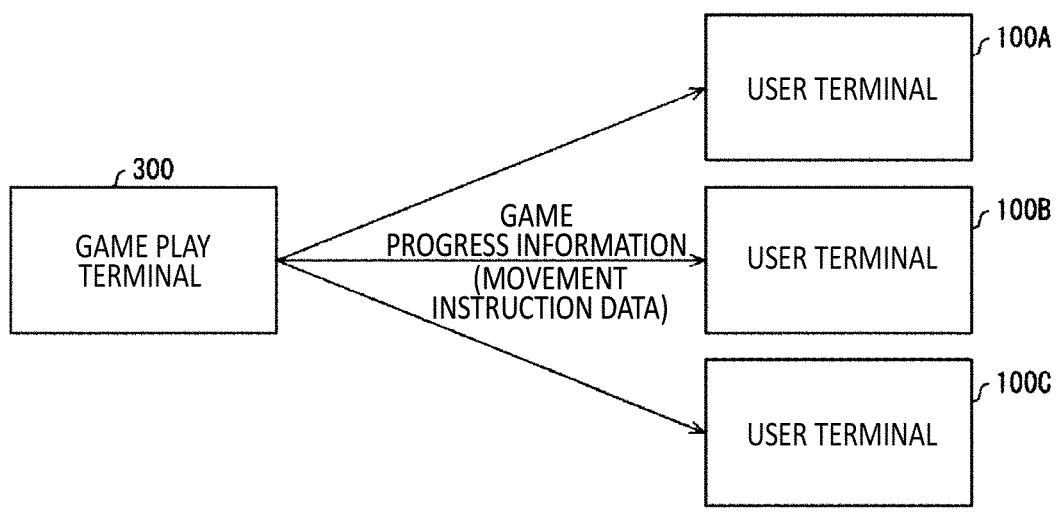
FIG. 24 illustrates an overview of transmission of game progress information from the game play terminal to the user terminal in accordance with an embodiment.

FIG. 24 illustrates an overview of transmission of the game progress information from the game play terminal 300 to the user terminal 100. The movement instruction data for the moving picture playback in the user terminal 100 is unique to each of the user terminals 100. On the other hand, as illustrated in FIG. 24, the game progress information transmitted to the user terminals 100 of all the users 3 who have participated in the game during the execution of the game is common among each of the user terminals 100. That is, the movement instruction data included in the game progress information is also common among each of the user terminals 100. In this manner, it can be mentioned that the movement instruction data for the moving picture playback and the movement instruction data for making progress in the game are different data in terms of similarity among the user terminals 100 and transmission destinations.

Moving Picture Playback Processing in User Terminal 100

Figure 25:
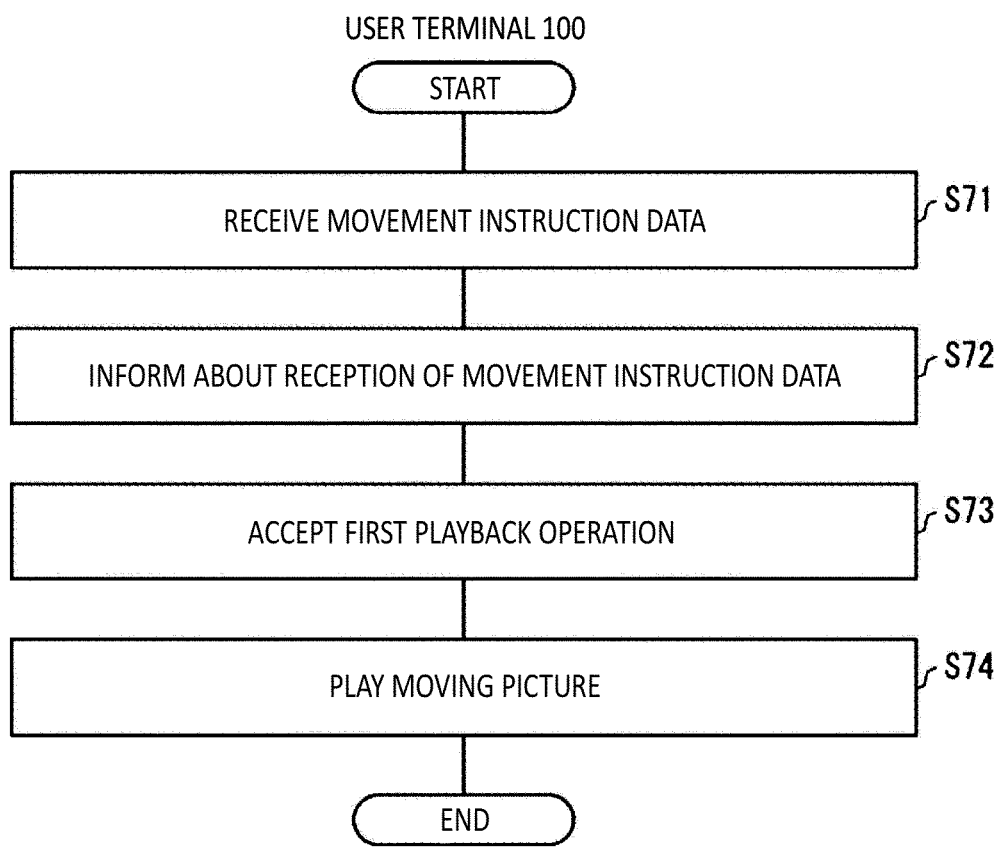
FIG. 25 is a flowchart representing part of the processing executed in the user terminal in accordance with an embodiment.

FIG. 25 is a flowchart illustrating an example of a flow of moving picture playback processing executed by the user terminal 100.

In step S71, the processor 10 which serves as the moving picture playback unit 117 receives the movement instruction data. In step S72, the processor 10 which serves as the moving picture playback unit 117 informs the user 3 of the reception of the movement instruction data. The processor 10 informs the user 3 of the reception of the movement instruction data by at least any of display of a notification image on the display unit 152, playback of a notification sound from a speaker (not illustrated), or lighting or flashing of a lighting unit (not illustrated) constituted by a light emitting diode (LED) or the like as an example.

In step S73, the processor 10 which serves as the operation acceptance unit 111 accepts a first playback operation for playing a moving picture. The first playback operation may be an operation of tapping the notification image as an example. In step S74, the processor 10 which serves as the moving picture playback unit 117 renders the movement instruction data and plays the moving picture. The processor 10 may activate an application for playing the present game to play the moving picture, or may activate an application for moving picture playback which is different from the above described application to play the moving picture as an example. Hereinafter, the moving picture will be referred to as a "thank you moving picture".

Figure 26:
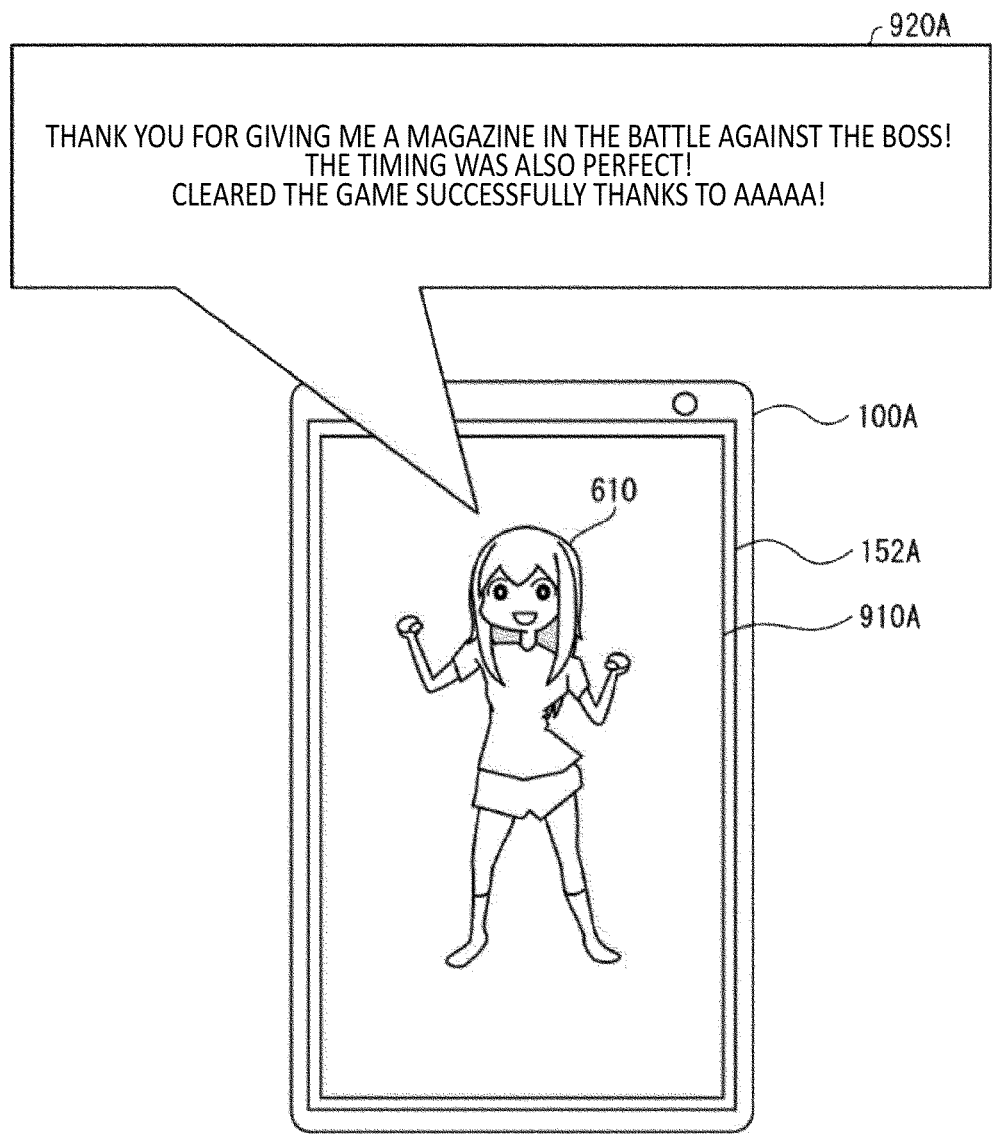
FIG. 26 illustrates a specific example of moving picture playback.

FIG. 26 illustrates a specific example of playback of the thank you moving picture. Specifically, FIG. 26 illustrates an example of the playback of the thank you moving picture in the user terminal 100 of the user 3A. In a thank you moving picture 910A played in the user terminal 100, the avatar object 610 makes a sound 920A while executing a certain motion. In other words, the processor 10 causes a speaker (not illustrated) to output the sound 920A while playing the thank you moving picture 910A including the avatar object 610 which executes the certain motion.

The motion in the thank you moving picture 910A is based on the motion data selected by the player 4 in the generation of the movement instruction data addressed to the user 3A, and the sound 920A is based on the audio data generated from the speech sound 820A input by the player 4 in the generation of the movement instruction data. That is, the sound 920A is a sound including the content of the assistance provided by the user 3A in the game, and an acknowledgement of the assistance. In this manner, by the input of the first playback operation, the user 3A can view the thank you moving picture in which the avatar object 610 speaks the content of the assistance provided by the user 3A oneself in the game and the acknowledgement of the assistance.

After the playback of the thank you moving picture 910A is ended, as an example, the user terminal 100 may cause the touch screen 15 to display at least one of UI images. The UI image may be, for example, a UI image which accepts an operation for playing the thank you moving picture 910A again, may be a UI image which accepts an operation for a shift to another screen, or may be a UI image which accepts an operation for ending an application.

In addition, during the playback of the thank you moving picture 910A, as an example, the user terminal 100 may cause the touch screen 15 to display at least one of the UI images. The UI image may be, for example, a plurality of UI images which respectively accepts an operation of temporarily stopping the thank you moving picture 910A which is being played, an operation of ending the thank you moving picture, and an operation of changing a scene to be played.

Note that these UI images which are displayed during the playback of the thank you moving picture 910A and displayed after the end of the playback of the thank you moving picture 910A do not include a UI image for responding to the avatar object 610. That is, in the thank you moving picture 910A according to the present embodiment, means to respond to the avatar object 610 is not included.

Figure 27:
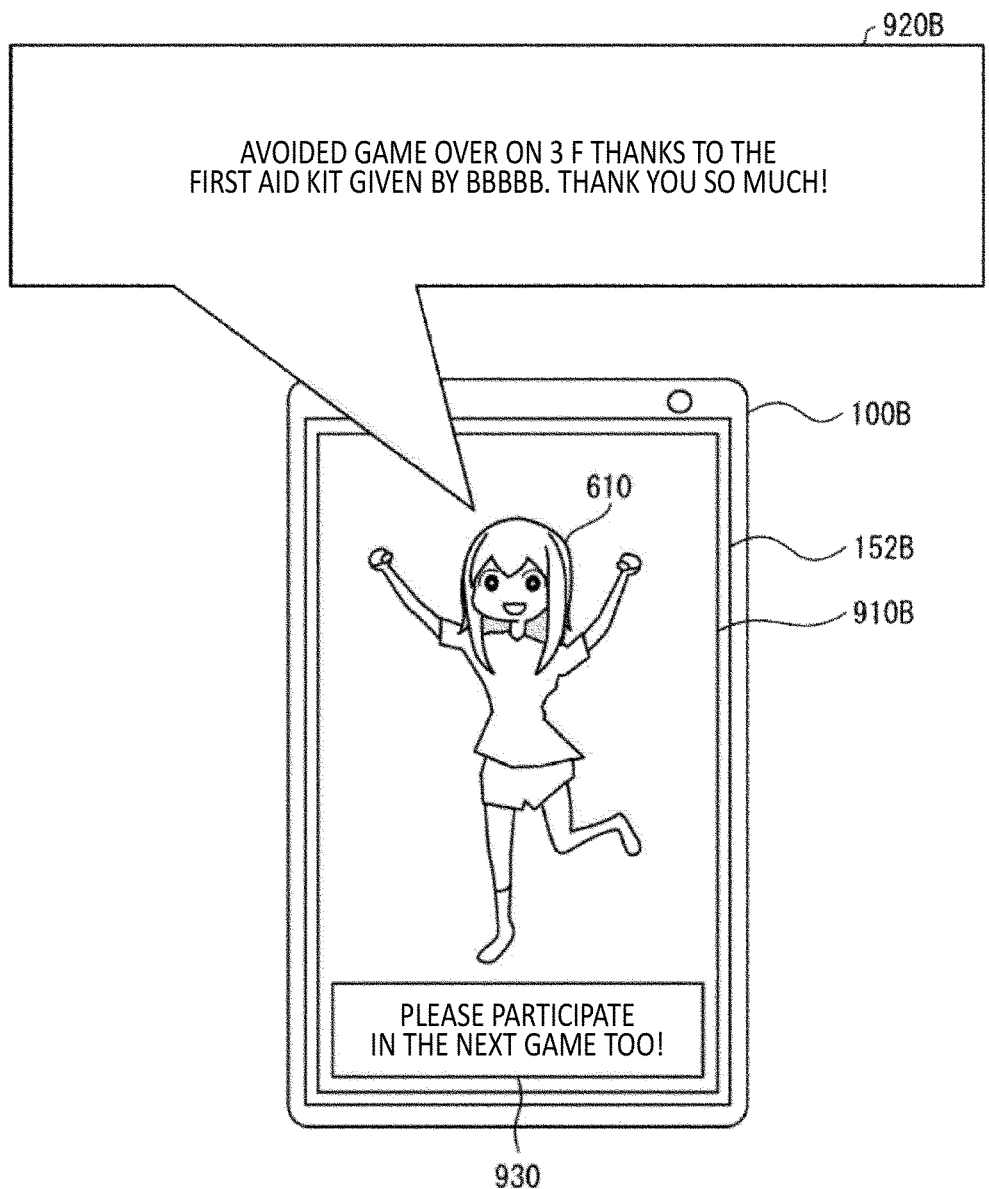
FIG. 27 illustrates another specific example of the moving picture playback.

FIG. 27 illustrates another specific example of the playback of the thank you moving picture. Specifically, FIG. 27 illustrates an example of the playback of the thank you moving picture in the user terminal 100 of the user 3B. In the thank you moving picture 910B played in the user terminal 100, the avatar object 610 makes a sound 920B while executing a certain motion. In other words, the processor 10 causes a speaker (not illustrated) to output the sound 920B while playing the thank you moving picture 910B including the avatar object 610 which executes the certain motion.

The motion in the thank you moving picture 910B is based on the motion data selected by the player 4 in the generation of the movement instruction data addressed to the user 3B, and the sound 920B is based on the audio data generated from the speech sound 820B input by the player 4 in the generation of the movement instruction data. Thus, in the example of FIG. 27, the motion performed by the avatar object 610 is different from the motion in the example of FIG. 26. In addition, the sound 920B is a sound including the content of the assistance provided by the user 3B in the game, and an acknowledgement of the assistance. Thus, in the example of FIG. 27, the content of the sound 920B is different from the content of the sound 920A in the example of FIG. 26.

In this manner, the thank you moving pictures received after the end of the game by the user terminals 100 of at least some of the users 3 who have participated in the game are moving pictures having different speech content of the avatar object 610 for each of the users 3.

Note that the processor 10 may superimpose and display a UI image 930 including content for encouraging participation in the next game on the moving picture 910. The UI image 930 may be distributed together with the movement instruction data, or may be stored by the user terminal 100 as the game information 132.

In the above described embodiment, the example has been described in which the avatar object 610 which moves in real time according to the motion of the performer is caused to move in the same virtual space 600B as the virtual space 600A defined by the game play terminal 300, and the field of view image 660 in the field of view area 640B in accordance with the position, the orientation, and the inclination of the virtual camera 620B arranged in the virtual space 600B is displayed on the touch screen 15 of the user terminal 100. At this time, the position, the orientation, and the like of the virtual camera 620B are changed according to the swipe operation, the pinching-in operation/pinching-out operation, or the like on the touch screen 15 of the user terminal 100. However, the changes of the position, the orientation, and the like of the virtual camera 620B are not limited to this.

For example, a camera object 630 a position, an orientation, an inclination, and the like of which are to be varied according to an operation of a switcher which is not illustrated in the drawing by the operator of the system 1 or the performer may be arranged in the virtual space 600A, and the position, the orientation, and the like of the virtual camera 620B arranged in the virtual space 600B may be changed according to the changes of the position, the orientation, and the like of the camera object 630. Note that in order to enable checking by the performer, the camera object 630 is displayed on only the monitor 51 of the HMD 500 connected to the game play terminal 300. As a result, the performer can make a speech or the like while looking at the camera object.

In addition, the space in which the avatar object 610 or the like is caused to move is not limited to a virtual space, and may be a reality space. The reality space may be, for example, a space identified by the acquired image which is captured and acquired by the camera (image capturing unit) 17. In this case, a space (hereinafter, also referred to as an augmented reality space) obtained by arranging the avatar object 610 and the like in the acquired image from the camera 17 may be generated, and also the virtual camera 620B may be arranged in the augmented reality space, such that a position, an orientation, and the like of the virtual camera 620B may be changed according to changes of a position, an orientation, and the like of the camera 17, for example.

Furthermore, a method of changing the position, the orientation, and the like of the virtual camera 620B may be selectable by the user. For example, a plurality of types of viewing modes is provided as viewing modes selectable by the user terminal 100, and when a TV mode (third viewing mode) is selected in the user terminal 100, the position, the orientation, and the like of the virtual camera 620B may be changed in conjunction with a camera object 630 the position, the orientation, and the like of which are varied according to an operation of the switcher by the operator or the performer. When a normal mode (first viewing mode) is selected in the user terminal 100, the position, the orientation, and the like of the virtual camera 620B may be changed according to the swipe operation or the like by the user. When an AR mode (second viewing mode) is selected, a space (hereinafter, also referred to as an augmented reality space) may be generated by arranging the avatar object 610 and the like in an image acquired from the camera 17, and also the virtual camera 620B may be arranged in the augmented reality space, so that the position, the orientation, and the like of the virtual camera 620B may be changed according to the changes of the position, the orientation, and the like of the camera 17. With this configuration, a perspective of the image to be displayed on the touch screen 15 can be changed according to a preference of the user. For example, a change icon labeled "AR" and a change icon labeled "TV" may be displayed (an example will be illustrated in FIG. 28 described below) in a predetermined area (for example, an upper right area or the like) of the display screen during live stream. When the touch operation on the "AR" change icon is performed, the viewing mode may be switched from the normal mode to the AR mode, and when the touch operation on the "TV" change icon is performed, the viewing mode may be switched from the normal mode to the TV mode. The change icon on which the tap operation has been performed may be deselected by the touch operation, and the viewing mode may be switched (returned) to the normal mode.

In the above described embodiment, the example has been described in which an item is input by the input operation from the user during a live stream part (an example of a first part), so that an object corresponding to the item is reflected (arranged) in the virtual space, and a game status, a parameter, and the like are varied (strength recovery, replenishment of the number of bullets, and the like) according to the item. For example, it may be also possible to change costumes of the avatar object 610 by inputting a costume object associated with the avatar object 610 (an example of a specific object). In this case, in the user terminal owned by the user who has input the costume object, the avatar object 610 is displayed in a costume change manner in which a costume object in a corresponding region of the avatar object 610 is changed to the input costume object, but the costume change manner is not reflected in user terminals owned by other users.

Figure 28:
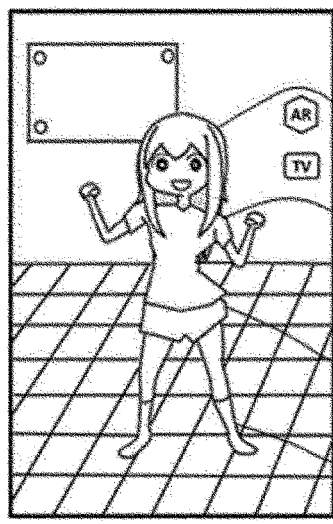
FIG. 28 illustrates a display example of a screen displayed on the user terminal during a live stream part.
Figure 28:
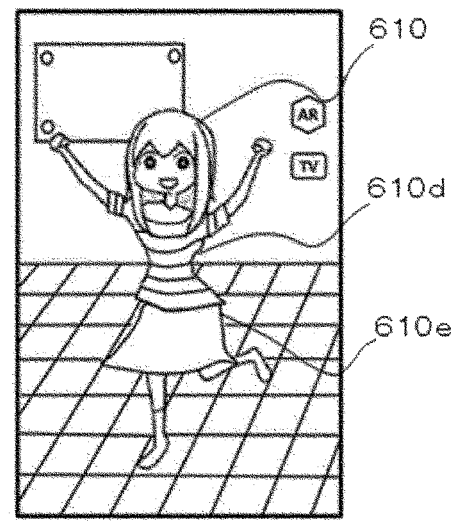
Figure 28:
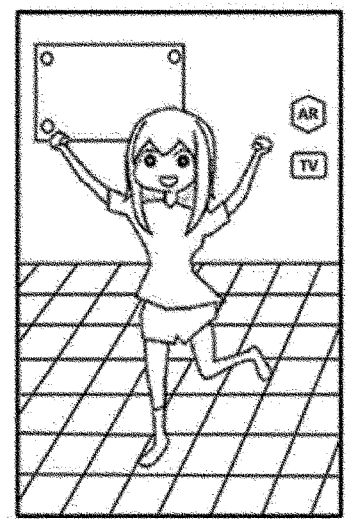

FIG. 28 illustrates a display example of a screen displayed on the user terminal during the live stream part. Live stream illustrated in FIG. 28 is assumed to be content generated while a player X, for example, is a performer (the avatar object 610 is caused to move and speak). In FIG. 28, such content is assumed to be live streamed that after the avatar object 610 expands a talk while moving as illustrated in (A) of FIG. 28, a predetermined game (for example, a quiz, playing rock-paper-scissors, or the like) is carried out. In (A) of FIG. 28, as costume objects of the avatar object 610, a solid-colored T-shirt object 610a is associated with a region corresponding to an upper body, a short pant object 610b is associated with a region corresponding to a lower body, and a sock object 610c is associated with a foot. The user who has started viewing the live stream can view the avatar object 610 in the costumes illustrated in (A) of FIG. 28. In addition, users can change the position, the orientation, and the like of the virtual camera 620B according to the swipe operation, the pinching-in operation/pinching-out operation, or the like on the touch screen 15 of the respectively owned user terminals.

A display example in the user terminal owned by a user A when the user A inputs costume objects at a certain timing during the live stream is illustrated in (B) of FIG. 28. It is assumed that the user A selects and inputs, for example, a striped T-shirt object and a white skirt object from among a plurality of types of costume objects which can be input. In this case, as illustrated in (B) of FIG. 28, the costume objects associated with the avatar object 610 are changed to the striped T-shirt object 610d and the white skirt object 610e to be displayed in the costume change manner. With this configuration, the satisfaction of the user can be improved.

A display example at the same timing as that of (B) of FIG. 28 in user terminals owned by other users (users who have not input any costume objects) other than the user A is illustrated in (C) of FIG. 28. In the user terminals owned by the other users, as illustrated in (C) of FIG. 28, the costume objects associated with the avatar object 610 are not changed by the input of the costume objects by the user A.

The virtual currency is spent when a costume object is input similarly as in other objects. The item input information with which the input of the costume object can be identified is also transmitted to the server 200 to update the play log (S55 in FIG. 15 or the like). When the live stream is ended, a user list of users who have viewed the live stream is generated (see FIG. 16). The user list includes information for identifying the presence or absence of the input of the costume object, a type of the input costume object, or the like for each of the viewing users. With this configuration, after the end of the live stream, the player (for example, the player X) referring to the user list by using the distribution terminal 400 can accurately grasp the content of the assistance including the input costume object. Note that the user list also include information for identifying a result of the game performed during the live stream or the like. The user list may be downloaded to the distribution terminal 400 from the server 200 by the predetermined operation illustrated in (A) of FIG. 18, or may be already downloaded in the distribution terminal 400 without the predetermined operation by being output from the server 200 after the end of the live stream.

Next, modified examples with regard to technical matters related to the thank you moving pictures illustrated in FIG. 17 to FIG. 23 will be described. Hereinafter, since the thank you moving picture includes a message (speech content) individually prepared for each user from the player, the thank you moving picture will be also referred to as an individual message hereinafter. In FIG. 17 to FIG. 23, the example has been described in which the display manner (for example, the costume) of the avatar object to be displayed in the thank you moving picture (individual message) is common among all users, but is not limited to this. The display manner may be set to be different (varied) for each user. For example, the costume of the avatar object displayed in the individual message may be common among users who have not input the costume object during the live stream. On the other hand, for the user who has input a costume object during the live stream, the costume of the avatar object displayed in the individual message may be the individually input costume object (object which is different from that of the users who have not input). In addition, in FIG. 17 to FIG. 23, the example has been described in which when the player (performer) creates an individual message, a user to which the individual message is to be transmitted is selected by the operation (S64 in FIG. 17), but is not limited to this. Users may be presented in a predetermined order without requiring the operation. In addition, in FIG. 17 to FIG. 23, the example has been described in which when the player (performer) creates an individual message, a motion of the avatar object 610 is selected by the operation (S66 in FIG. 17), but is not limited to this. Any motion may be decided among a plurality of types of motions without requiring the operation. In addition, in FIG. 17 to FIG. 23, the example has been described in which at a timing at which the player (performer) creates an individual message, the individual message is distributed to the user terminal at the destination (S69 in FIG. 17), but is not limited to this. The created individual message may be temporarily accumulated on a server side, and the accumulated individual messages may be simultaneously distributed to the user terminals at the destinations at a predetermined timing. Technical matters related to the modified individual messages in such aspects and the like will be described with reference to FIG. 29 to FIG. 32.

Figure 29:
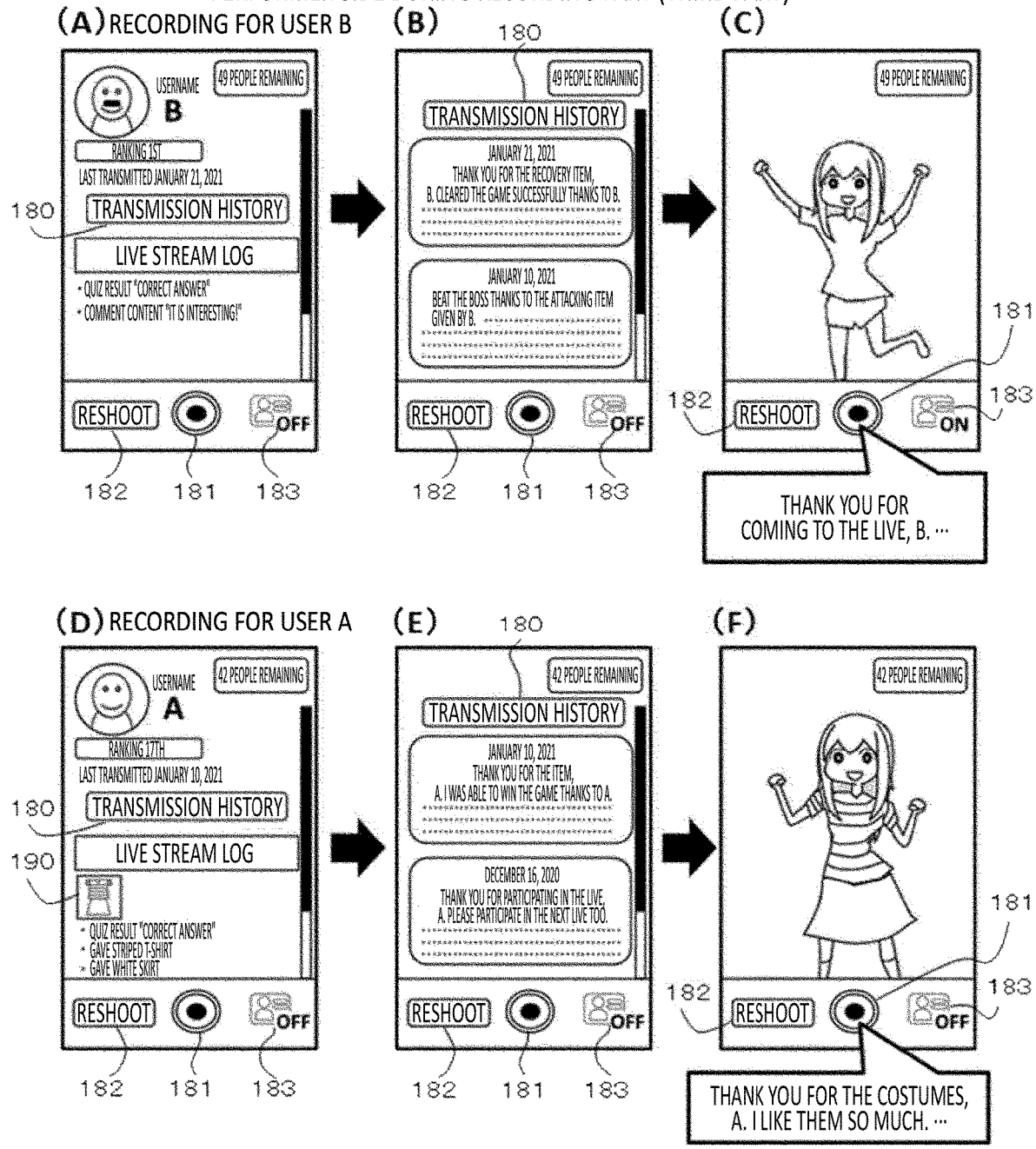
FIG. 29 illustrates a display example of a recording screen during a recording part.

FIG. 29 illustrates a display example of a recording screen during a recording part (an example of a third part) for recording (creating) an individual message in the distribution terminal 400. In the present example, when the player (for example, the player X) starts the recording part (for example, by the touch operation on a recording icon) in the distribution terminal 400, based on a user list of a most recent live stream distributed by the player, the users who have viewed the live stream are presented in a predetermined order by one user at a time. When the recording of the individual message for the presented user is completed, the next user is presented according to the predetermined order. Thus, operation burden on the player can be mitigated. It is possible to avoid spending time to decide for which user the individual message is going to be recorded, and recording (creation) efficiency can be improved. The predetermined order in the present embodiment is determined in an order from the top based on a ranking which will be described below among the users who have viewed the most recently distributed live stream, for example. The predetermined order is not limited to this as long as the order may be automatically identified. The predetermined order may be decided based on a contribution degree and an intervention degree such as the number of times to input items or the number of times to transmit comments during the distributed live stream (presented in descending order of such degree), may be decided depending on a word order of usernames, or the like, or may be randomly decided by using random numbers. In addition, it suffices when a decision-making body with regard to the predetermined order is an entity other than the player (for example, the player X). The predetermined order may be decided by processing on a server 200 side, or may be decided by processing on a distribution terminal 400 side.

Furthermore, in the present example, as the motion (display movement) of the avatar object 610 in the individual message to the presented user, any of a plurality of types of motions is decided for each user. Thus, the operation burden on the player can be mitigated. It is possible to avoid spending time to decide which motion is going to be recorded, and the creation efficiency can be improved. An order may be previously set for each of the plurality of types of motions, and the motion may be identified according to the order. In addition, for example, the motion may be decided by a ranking which will be described below, the number of times to input items during the live stream, the number of times to transmit comments, or the like. The motion may be randomly decided by using random numbers. In addition, it suffices when the decision-making body with regard to the motion is an entity other than the player (for example, the player X). The motion may be decided by processing on the server 200 side, or may be decided by processing on the distribution terminal 400 side.

A display example of a creation screen of an individual message for a user B when the user B is presented is illustrated in (A) of FIG. 29. Note that the user B is assumed to be a user who has not input a costume object during the most recent live stream. As the recording screen for the individual message, user information related to a user is displayed in the upper left, the number of remaining users for which an individual message is to be recorded is displayed in the upper right. As the user information, an icon corresponding to the user, a name of the user, and a ranking position are included. For example, the ranking is an order based on the contribution degree and the intervention degree, and the like of the user in the live stream distributed thus far by the player (for example, the player X) who records and creates an individual message. As the contribution degree and the intervention degree are higher, the ranking position is higher. Note that the ranking may be a monthly ranking, for example. An icon of the user B, a name of the user, and a ranking at the 1st are illustrated in (A) of FIG. 29. In addition, as the number of remaining users, a state of "49 people remaining" is indicated. In the present example, all the users who have viewed the live stream are set as recording targets of individual messages, but the configuration is not limited to this. A user decided by a lottery drawn from among the users who viewed the live stream may be set as the target, or a user who has input an item or transmitted a comment may be set as the target. The decision-making body with regard to the user to be set as the recording target may be any entity other than the player (for example, the player X). The user to be set as the recording target may be decided by processing on the server 200 side, or may be decided by processing on the distribution terminal 400 side.

In addition, transmission history information related to a transmission history of individual messages is displayed below the user information. As the transmission history information, a last transmission date of the individual message by the player (for example, the player X) to the user (in (A) of FIG. 29, "Jan. 21, 2021") and a transmission history icon 180 are displayed. When the tap operation is performed on the transmission history icon 180, a letter (text) converted by speech recognition based on audio data of previously transmitted individual messages are displayed. A display example of the transmission history of the individual messages transmitted to the user B is illustrated in (B) of FIG. 29. In (B) of FIG. 29, a character string ("thank you for the recovery item, B . . . thanks to B") converted based on the audio data of the individual message transmitted last time on Jan. 21, 2021, and a character string (" . . . attacking item given by B") converted based on the audio data of the individual message transmitted two times before on Jan. 10, 2021, are displayed. With this configuration, the player (for example, the player X) can visually check the content of the messages transmitted in the past to be used as a consideration material and reference for content to be recorded later (so as not to mention similar topics, for example). Processing of conversion into a character string by speech recognition may be performed on the server 200 side after the simultaneous transmission which will be described below, or may be performed on the distribution terminal 400 side when the individual message is recorded. Note that by scrolling in a downward direction by the swipe operation or the like, character strings of older individual messages can also be displayed, and when the tap operation is performed on the transmission history icon 180 again, the screen returns to the screen of (A) of FIG. 29.

Live stream log information is displayed below the transmission history information. The live stream log information refers to information including interactions (item input, comment transmission, and the like) taken by the user during the live stream, the tag information illustrated in (B) of FIG. 18, and the like. In (A) of FIG. 29, it is displayed that the user has given a "correct answer" in the quiz held as the game during the live stream, and the user has transmitted a comment "it is interesting!" addressed to the avatar object. With this configuration, the live stream log information can be checked to be used as the consideration material and reference for content to be recorded later. The live stream log information is preferably displayed for each live stream of the past. Note that the accumulated live stream log information can be displayed by scrolling in the downward direction by the swipe operation or the like.

A recording icon 181, a reshoot icon 182, and a switch icon 183 are displayed below the recording screen. The recording icon 181 is an icon for accepting a start operation for starting recording of a spoken sound by the player (for example, the player X) and an end operation for ending the recording, in which by a first operation after a certain user is presented in a predetermined order, the recording for the user is started, and by a second operation, the recording for the user is ended. When the recording is ended, the recording for the user is completed, and the recording icon 181 changes to a next icon for presenting a next user. The reshoot icon 182 is an icon for reshooting (re-recording) an individual message for the user again although the recording has been performed. When the reshoot icon 182 is operated, the next icon which has been changed after the recording changes again to the recording icon 181.

The switch icon 183 is an icon for switching an information display screen on which information of (A) of FIG. 29, (B) of FIG. 29, and the like are displayed, and a motion display screen on which the motion of the avatar object 610 which has been already decided in a stage of being presented is displayed. By performing the tap operation on the switch icon 183 on the information display screen, as illustrated in (C) of FIG. 29, it is possible to check an image in which the avatar object 610 moves in the already decided motion. With this configuration, while the motion is taken into account, it is possible to review a timing to speak, a pace, and content. Before the recording or during the recording too, each time the tap operation on the switch icon 183 is performed, the information display screen and the motion display screen can be switched. Thus, before the recording, the information display screen and the motion display screen can be checked to decide content to speak, a timing, and the like to some extent. During the recording, a speech can be made while the information display screen and the motion display screen are switched and checked at the timing decided by the player (for example, the player X), and the convenience can be improved. "ON" and "OFF" in the switch icon 183 mean turning "ON" and "OFF" of information in (A) of FIG. 29, (B) of FIG. 29, and the like. Thus, "OFF" is labeled on the information display screen as illustrated in (A) of FIG. 29 and the like, and "ON" is labeled on the motion display screen as illustrated in (C) of FIG. 29 and the like.

Note that the user B is a user who has not input a costume object during the most recent live stream. Thus, the avatar object 610 associated with the solid-colored T-shirt object 610a and the short pant object 610b moves which are the costume objects at the start of the most recent live stream.

In addition, a situation is illustrated in (C) of FIG. 29 where the tap operation on the recording icon 181 is performed on the motion display screen, and a sound such as "Thank you for coming to the live, B . . . ." is recorded by the player X. Note that "." indicates a speech. In addition, although not illustrated in the drawing, a predetermined background object is assumed to be arranged in a background of the avatar object 610. When the recording is ended, the switch icon 183 changes to a playback icon for checking and playing the recorded individual message. When the tap operation on the playback icon is performed, by playing the recorded individual message and checking the content, the player can review on whether to reshoot or complete. By performing the tap operation on the next icon to complete the recording for the presented user, the player can shift to recording for the next user, or by performing the tap operation on the reshoot icon 182, the player can reshoot the recording.

A display example of the creation screen when the user A who has input the costume objects during the live stream is presented is illustrated in (D) of FIG. 29. An icon corresponding to the user A as the user information, "user A" as a name of the user, and a ranking at the 17th are illustrated. In addition, as the number of remaining users, a state of "42 people remaining" is indicated. In addition, as the transmission history information, it is indicated that the last individual message is transmitted to the user A on "Jan. 10, 2021". In addition, when the tap operation on the transmission history icon 180 is performed, as illustrated in (E) of FIG. 29, character strings of previously transmitted individual messages are displayed.

With reference to (D) of FIG. 29 again, a costume object image 190 input by the user A is displayed as the live stream log information, and it is also displayed that the user has given a "correct answer" in the quiz held as the game during the live stream, the user gave a striped T-shirt, and the user gave a white skirt. In addition, by performing the tap operation on the switch icon 183 on the information display screen, as illustrated in (F) of FIG. 29, an image is displayed in which the avatar object 610 moves in the already decided motion (note that this is a different motion from the motion illustrated in (C) of FIG. 29), and the player (for example, the player X) can check the motion. The costumes of the avatar object 610 at the time of recording of an individual message for a user who has input costume objects are costumes of the costume objects input by the user. Thus, in a case of the user A, the avatar object 610 associated with the costume objects which are the striped T-shirt and the white skirt moves as illustrated in (F) of FIG. 29.

In addition, a situation is illustrated in (F) of FIG. 29 where the tap operation on the recording icon 181 is performed on the motion display screen, and a sound such as "Thank you for the costumes, A. I like them so much . . . ." is recorded by the player X. In addition, although not illustrated in the drawing, a predetermined background object is assumed to be arranged in the background of the avatar object 610. After the recording, by performing the tap operation on the next icon to complete the recording for the presented user, the player can shift to recording for the next user, or by performing the tap operation on the reshoot icon 182, the player can reshoot the recording. In this manner, one user is presented at a time, and the individual message for the presented user is recorded. The recorded individual message is transmitted to the user terminal owned by the user at the destination. Note that the recorded individual messages exemplified in FIG. 29 are assumed to be simultaneously transmitted at 18:00 on Jan. 23, 2021.

Figure 30:
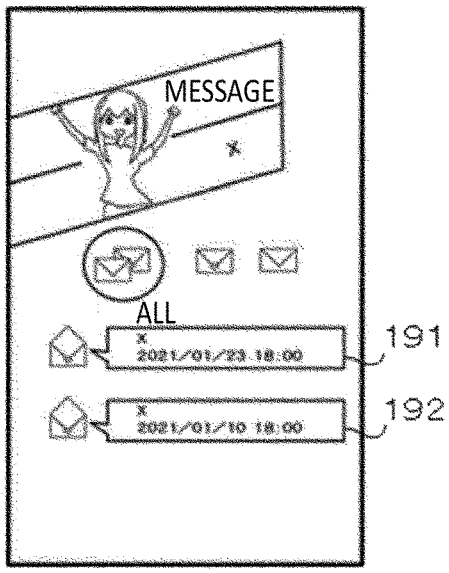
FIG. 30 illustrates a display example of a display screen during a playback part.
Figure 30:
Figure 30:
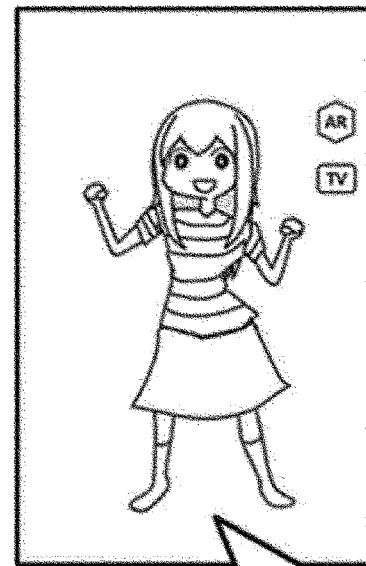
Figure 30:
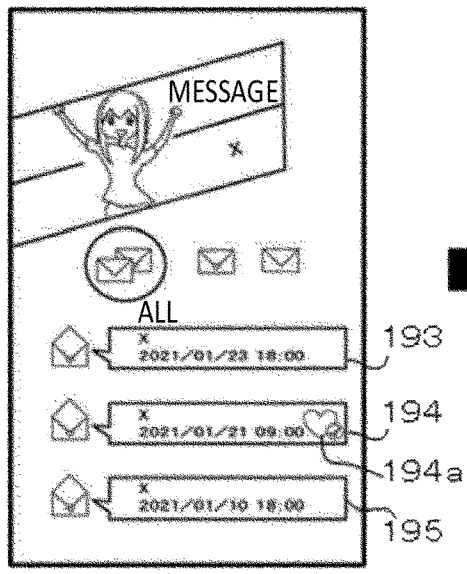
Figure 30:
Figure 30:
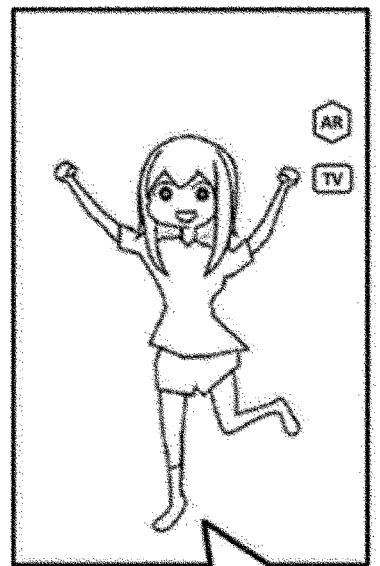

FIG. 30 illustrates a display example of the display screen during a playback part (an example of a second part) for playing the individual message in the user terminal. In the user terminal owned by the user A, by selecting the player X by the user A on a predetermined message reception screen, a list of individual messages from the player X exemplified in (A) of FIG. 30 is displayed. In (A) of FIG. 30, an individual message 191 dated Jan. 23, 2021, and an individual message 192 dated Jan. 10, 2021, are displayed. When the user A performs a touch operation on an individual message, the individual message on which the touch operation has been performed is played.

A display example and a sound example when the touch operation is performed to play the individual message 191 dated Jan. 23, 2021, are illustrated in (B) of FIG. 30. In (B) of FIG. 30, the content recorded in (F) of FIG. 29 is played. That is, the avatar object 610 associated with the costume objects which are the striped T-shirt and the white skirt input by the user A during the last live stream moves, and also a sound such as "Thank you for the costumes, A. I like them so much." is output.

Next, the individual message for the user B will be described. In the user terminal owned by the user B, by selecting the player X by the user B on a predetermined message reception screen, a list of individual messages from the player X exemplified in (C) of FIG. 30 is displayed. In (C) of FIG. 30, an individual message 193 dated Jan. 23, 2021, an individual message 194 dated Jan. 21, 2021, and an individual message 195 dated Jan. 10, 2021, are displayed.

A display example and a sound example when the touch operation is performed to play the individual message 193 dated Jan. 23, 2021, are illustrated in (D) of FIG. 30. In (D) of FIG. 30, the content recorded in (C) of FIG. 29 is played. That is, the avatar object 610 associated with the costume objects which are the solid-colored T-shirt and the short pant input by the user A during the last live stream moves, and also a sound such as "Thank you for coming to the live, B." is output.

Note that although not illustrated in FIG. 30, a predetermined background object is assumed to be arranged in the background of the avatar object 610 similarly as in the time of the recording. In addition, during the playback of the individual message similarly as in the time during the live stream or the like, it is possible to change the position, the orientation, and the like of the virtual camera 620B according to the swipe operation, the pinching-in operation/pinching-out operation, or the like on the touch screen 15 of the user terminal, and to switch the viewing mode to a corresponding mode by performing a touch operation on the "AR" change icon or the "TV" change icon.

In addition, the individual messages include an individual message with privilege. Along with playback of the individual message with privilege (for example, an item, an object, or the like that can be input), the privilege is awarded to a user who has played the individual message. For example, an individual message which is to be distributed after the end of a special live stream becomes an individual message with privilege. That is, an individual message with privilege is distributed according to a type of the first part. When an individual message to be recorded is an individual message with privilege, the player is to record a sound which allows for the privilege to be awarded. Note that a setting on whether the individual message is with privilege is not limited to this. For example, this setting may be decided by the player at the time of recording (for example, whether the individual message is with privilege is set for each user, or the like), or this setting may be decided randomly or the like.

Figure 31:
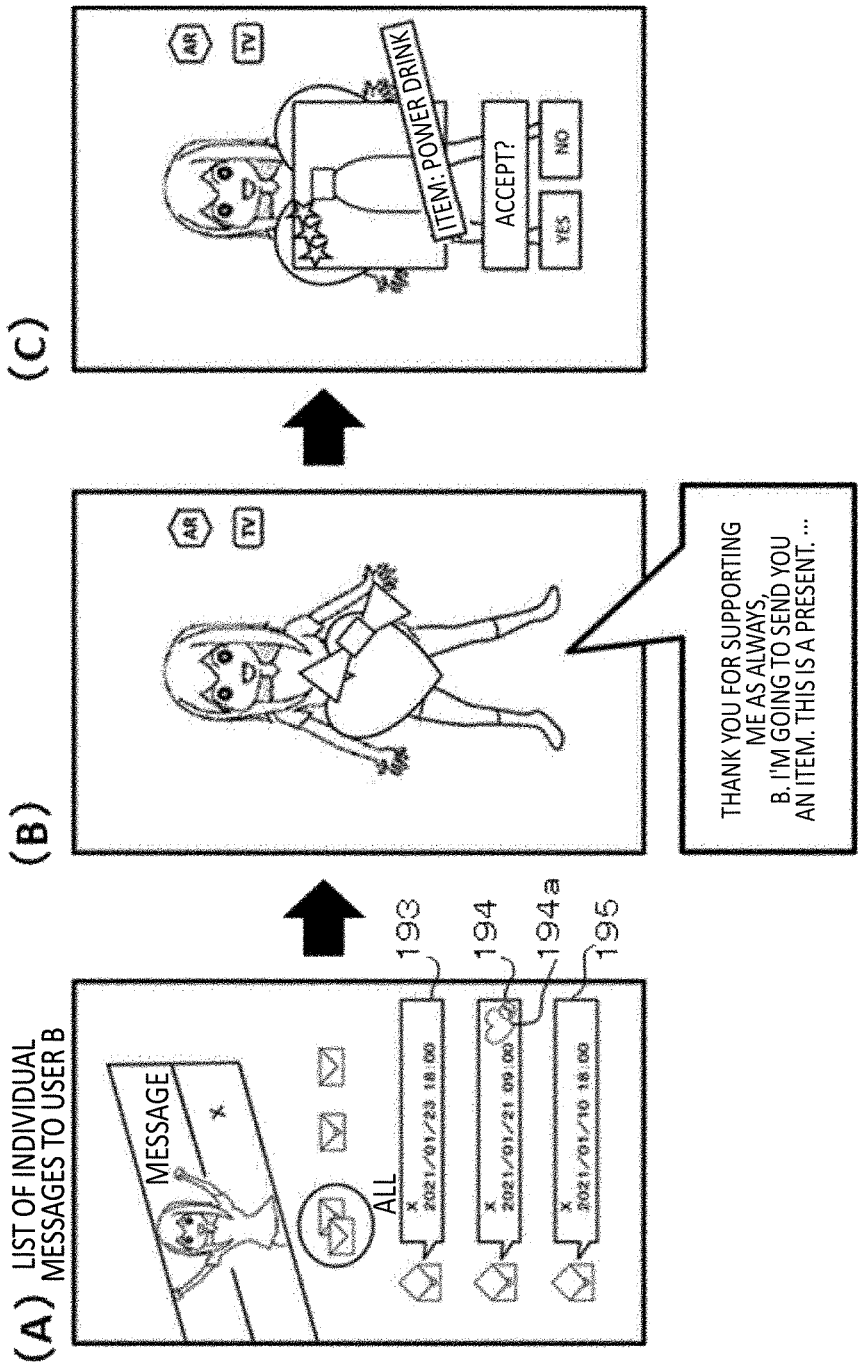
FIG. 31 illustrates a display example of the display screen during the playback part for playing an individual message with privilege.

The individual message with privilege is displayed in a manner different from that of a normal individual message without privilege in a list of individual messages, and for example, is displayed in a manner added with a heart mark 194a as illustrated in (C) of FIG. 30. FIG. 31 illustrates a display example of the display screen during the playback part (an example of the second part) for playing an individual message with privilege in the user terminal. The user B can play and view the individual message with privilege by performing the touch operation on the individual message 194 dated Jan. 21, 2021. A display example and a sound example when the individual message with privilege is played are illustrated in (B) of FIG. 31 and (C) of FIG. 31.

As illustrated in (B) of FIG. 31, at a predetermined timing after the start of the playback, a box object with a heart mark is superimposed and displayed on the avatar object 610, and also a sound such as "Thank you for supporting me as always. I'm going to send you an item. This is a present." is output. Subsequently, as illustrated in (C) of FIG. 31, the box object is opened, and an item object (in (C) of FIG. 31, power drink) is displayed. Below the objects, an icon to select whether the item is accepted is displayed. When the touch operation is performed on "YES", the item is successfully acquired. On the other hand, when the touch operation is performed on "NO", another item is presented and can be acquired.

Figure 32:
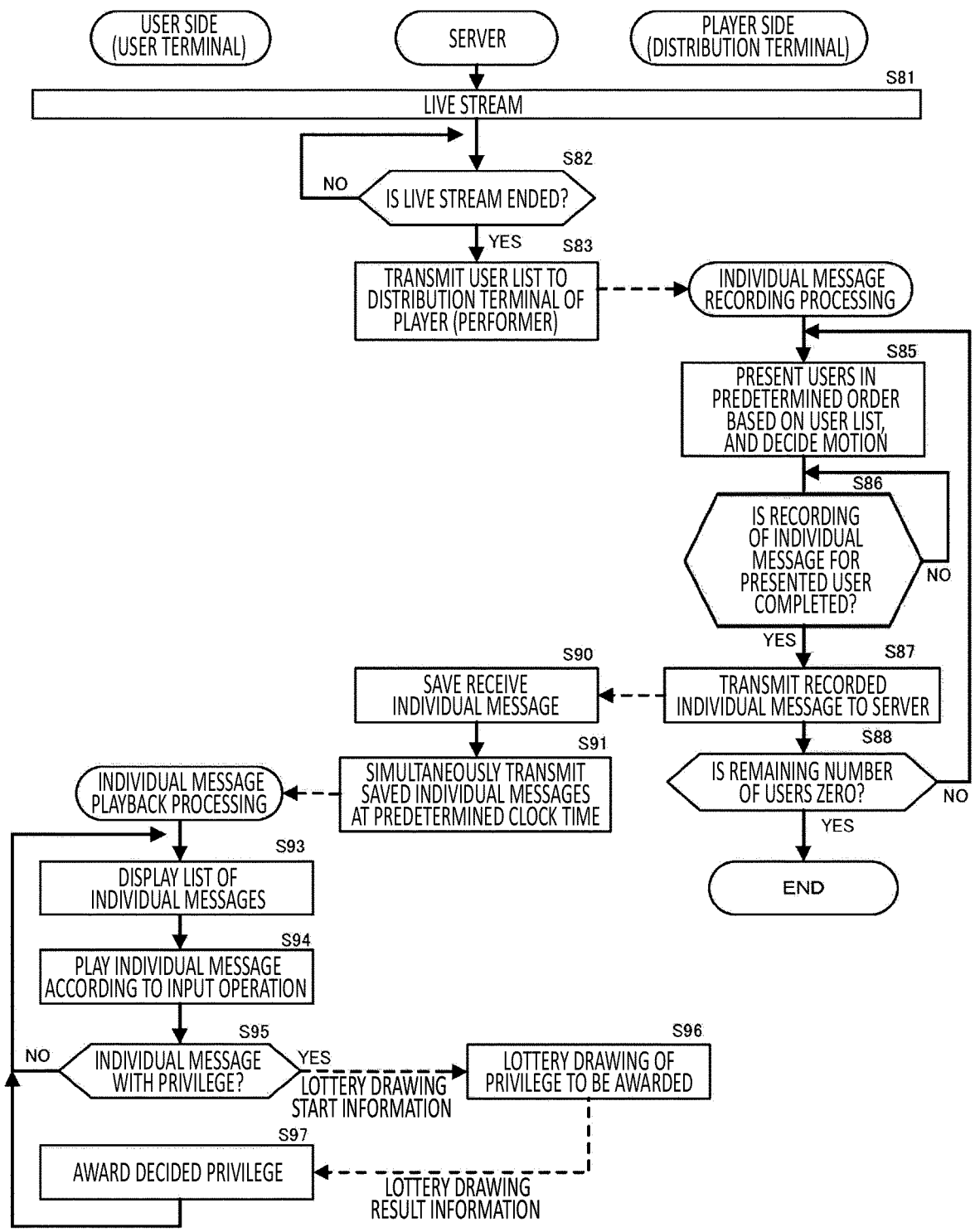
FIG. 32 is a flowchart representing an example of a flow of processing after an end of the live stream part through the recording part until the playback part is performed.

FIG. 32 is a flowchart illustrating an example of a flow of processing after the end of the live stream part through the recording part in the distribution terminal 400 until the playback part is performed in the user terminal 100. In FIG. 32, processing in the user terminal 100 is illustrated in a left column, processing in the server 200 is illustrated in a center column, and processing in the distribution terminal 400 is illustrated in a right column.

In step S81, processing for performing the live stream is performed. During the live stream, as illustrated in FIG. 28, the costumes of the avatar object 610 can be varied by an input operation from the user. In step S82, it is determined whether the live stream is ended. When it is determined that the live stream is ended, in step S83, the user list in the ended live stream is transmitted to the distribution terminal 400 owned by the player (performer) who has distributed the live stream.

In the distribution terminal 400, when the player starts the recording part (for example, by performing the touch operation on the recording icon), individual message recording processing is performed. In step S85, users are presented in a predetermined order based on the user list from the server 200, and also a motion for the presented user is decided from among a plurality of types of motions. The recording screen illustrated in FIG. 29 is displayed based on a result of this processing, and the processing for the recording which is described in FIG. 29 is performed. In step S86, whether the recording of the individual message for the presented user is completed (with the touch operation on the next icon, for example) is determined. In step S86, when it is determined that the recording of the individual message for the presented user is completed, the recorded individual message is transmitted to the server 200. At this time, the distribution terminal 400 generates individual message data including data for identifying the user at the destination of the individual message, information for identifying the player who has recorded the individual message, the recorded sound (message), the movement instruction data for identifying the motion, and the like, and transmits the individual message data to the server 200. On the server 200 side, as illustrated in step S90, the received individual message (individual message data) is saved in a predetermined area.

In step S88 in the individual message recording processing, it is determined whether the number of remaining users for which individual messages are to be recorded is zero. When the number of remaining users is not zero, the flow shifts to step S85 to perform processing for recording an individual message for the next user. On the other hand, when the remaining number of users is zero, the individual message recording processing is ended.

On the other hand, in the server 200, in step S91, at a predetermined clock time (for example, 09:00, 18:00, or the like), individual messages saved at the clock time are simultaneously transmitted to the user terminals 100 owned by corresponding users.

In the user terminal 100, when the playback part for displaying and playing the message reception screen is started (for example, by performing the touch operation on a message browse icon), a list of individual messages received in step S93 is displayed. A screen illustrated in FIG. 30 or the like is displayed based on a result of this processing, and processing for playing the individual message is performed. When the touch operation is performed on the displayed individual message, the corresponding individual message is played in step S94.

In step S95, it is determined whether the selected individual message is an individual message with privilege. When it is not determined that the selected individual message is an individual message with privilege, the individual message is ended, and the flow shifts to step S93. On the other hand, when it is determined that the selected individual message is an individual message with privilege, after the start of the playback of the individual message, at a predetermined timing (at the time of the start, upon a lapse of a predetermined period of time since the start, or the like), lottery drawing start information is transmitted to the server 200. In response to this, in the server 200, as illustrated in step S96, a lottery drawing for the privilege to be awarded is performed, and lottery drawing result information with which the decided privilege can be identified is transmitted to the user terminal 100 of the transmission source of the lottery drawing start information. With this configuration, on the user terminal 100 side, as illustrated in step S97, the user is notified of the decided privilege in the individual message during the playback, and the privilege can be awarded to the user. With this configuration, the screen illustrated in FIG. 31 is displayed. When the individual message with privilege is ended, the flow shifts to step S93.

Example of Action Effect

In the above described embodiment, since the speech of the sound of the avatar object 610 based on the movement instruction data, that is, the speech content of the avatar object 610 in the individual message (thank you moving picture) is different for each user, a joy of the user when the individual message is browsed becomes larger than before. Thus, the user feels like to participate in the next game too to see another individual message. As a result, it is possible to encourage the continuous participation in the game by the user. In addition, since the speech content of the avatar object 610 in the individual message includes the username of the user, the content of the assistance or the like provided to the avatar object 610 in the game by the user, and the acknowledgement of this assistance, the user feels that the speech is a speech addressed to only oneself, and feels a great joy. In addition, the assistance to the avatar object 610 is an action which deserves an acknowledgement from the avatar object 610 for the user, and since the content of such an action is reflected in the speech content in the individual message, it is possible to make the user feel the great joy. As a result, it is possible to encourage the continuous participation in the game by the user.

Furthermore, as illustrated in FIG. 28, the costume object associated with each of the upper body region and the lower body region of the avatar object 610 among a plurality of types of objects which may be displayed during the live stream is a variable object, and as illustrated in (B) of FIG. 30, the costume object of the avatar object 610 which may be displayed in the playback part for playing the individual message is a varied costume object during the live stream. With this configuration, it is possible to arouse a special feeling and a premium feeling for the user, and as a result, a participation commitment to a game such as a live stream can be improved.

As described with reference to FIG. 31, the individual messages include an individual message with privilege. Along with playback of the individual message with privilege, the privilege may be awarded to a user who is viewing the individual message. With this configuration, not only the message is provided but also the privilege may be awarded to the user, and it is therefore possible to further improve the participation commitment to the game such as the live stream.

In addition, as illustrated in steps S95 to S97 in FIG. 32, the privilege to be awarded is decided by the lottery drawing at a predetermined timing after the playback of the individual message with privilege. In this manner, since the privilege to be awarded is decided in real time, such an expectation on what privilege is to be awarded lasts until the end and can be improved.

The data for displaying the live stream or the like illustrated in FIG. 28 includes the motion data which has been input by the player (performer) who plays the avatar object 610, but on the other hand, the data for playing the individual message illustrated in FIG. 30 or the like includes motion data randomly identified from among a plurality of predetermined types of motion data or the like. With this configuration, it is possible to further dramatize the live feeling during the live stream. When the player records an individual message, the player does not need to actually move to input a motion, and furthermore, time and effort to select a motion can be saved. Thus, burden on the player can be mitigated, and it is also possible to efficiently record (create) a large number of messages.

Since the motion is decided randomly or the like, the motion data included in the data of the individual messages becomes the motion data that is different among the users. With this configuration, it is possible to improve the special feeling and the premium feeling for the users.

As illustrated in FIG. 28 and FIG. 30, the costume object associated with the avatar object 610 among a plurality of types of objects which may be displayed during a live stream is variable according to an input operation from a user during a live stream viewed in a user terminal used by the user (user A). The costume object associated with the avatar object 610 which may be displayed in the playback part of the individual message to the user A which may be distributed after the live stream is a costume object which is varied according to an input operation from the user A during the most recently performed live stream, and is different from the costume object associated with the avatar object 610 which may be displayed in the playback part of the individual message distributed to other users. With this configuration, while the satisfaction from the variation of the costume object during the live stream is aroused, the satisfaction can be aroused again at the time of playback of the following individual message. As a result, the motivation to vary a costume object (to input a costume object) also in the next live stream can be improved, and as a result, it is possible to enliven the live stream.

The live stream illustrated in FIG. 28 is content based on data that is input by the performer who plays the avatar object 610 and that is data live streamed in real time. With this configuration, it is possible to arouse a live feeling for the user, and amusement of the game can be improved.

In the recording part on the distribution terminal 400 side, the performer who plays the avatar object 610 records a sound spoken to each of a plurality of users including the user A who inputs the costume object, and the movement instruction data including audio data with which the sound recorded for each of the plurality of users can be identified and motion data with which the motion decided randomly or the like can be identified is transmitted to the user terminal of each of the plurality of users. In addition, as illustrated in (B) of FIG. 29, (E) of FIG. 29, and the like, the recorded sound is converted into a character string by speech recognition, and the character string is displayed as a transmission history of having been transmitted to the user when a sound spoken to the presented user is to be recorded at the time of the next recording part. With this configuration, the player can visually check the content of the messages transmitted to the presented user in the past to be used as a consideration material and reference for content to be recorded later (for example, so as not to mention similar topics, so as to be able to mention a topic associated with the last time, or the like).

As illustrated in steps S87, S90, and S91 in FIG. 32, the data of the recorded individual messages is temporarily saved, and the individual messages are simultaneously transmitted to the user terminals respectively used by a plurality of users at a predetermined clock time. With this configuration, a clock time at which the individual message can be received is set, so that expectation of the user for a delivery of the individual message at the clock time can be increased, and it is possible to improve the amusement.

Modified Examples

Modified examples and the like of the embodiments described above will be listed below.

(1) In the above described embodiment, the example has been described in which as illustrated in step S95 to step S97 in FIG. 32, the privilege to be awarded along with the playback of the individual message with privilege is decided by the lottery drawing in real time after the start of the playback. However, a timing at which the privilege to be awarded is decided is not limited to this, and for example, the privilege to be awarded may be previously decided in a stage before the individual message with privilege is played. For example, when an individual message is saved in step S90, if the individual message is with privilege, processing corresponding to step S96 may be performed to previously decide the privilege to be awarded when the individual message with privilege is played. With this configuration, processing load when the individual message is played can be distributed over different timings and can be mitigated.

(2) In the above described embodiment, the example has been described in which the costume object associated with the avatar object 610 displayed in the first part such as the live stream is varied when the costume object is input according to the input operation from the user. However, in addition to or instead of this, the costume object associated with the avatar object 610 may be varied each time a live stream is performed.

For example, when a live by the player X is streamed from 12:00 every Monday, the costume object of the avatar object 610 performed by the player X may be varied each week. With this configuration, all the users viewing the live stream by the player X can check that the costume object of the avatar object 610 is varied every week, and it is possible to provide an interest to find out which costume object is to be worn this week. The costume object in this case may be randomly decided to save time and effort from the selection by the player. In addition, in the above mentioned case, the costume object of the avatar object 610 in the individual message distributed after the end of the live stream of a certain week may be a costume object planned to be associated with the avatar object 610 in a live stream of a next week. In this case, the costume object of the avatar object 610 in the individual message for any user becomes the same. With this configuration, it is possible to provide an advance notice on a next costume object by the individual message, and the motivation to view the next live stream can be increased. Note that even in the above mentioned case, for example, when the costume object is varied due to an input of a costume object according to an input operation from a user during a live stream of a certain week, the costume object of the avatar object 610 in the individual message distributed to the user after the end of the live stream may be the costume object input by the user (may be the costume object different from that of other users).

In addition, the costume object of the avatar object 610 in the individual message distributed after the end of the live stream of a certain week may be the costume object of the avatar object 610 in the live stream which has ended. In this case too, the costume object of the avatar object 610 in the individual message for any user becomes the same. Note that even in the above mentioned case, for example, when the costume object is varied due to an input of a costume object according to an input operation from a user during a live stream of a certain week, the costume object of the avatar object 610 in the individual message distributed to the user after the end of the live stream may be the costume object input by the user (may be the costume object different from that of other users).

In addition, the example has been described in which the costume object of the avatar object 610 displayed in the individual message may be the costume object input by the user or may be the costume object in the live stream, but is not limited to this. A costume object can be selected from among a plurality of types of costume objects by the player at the start of the recording part or the like, and a common costume object among a plurality of users may be set.

In addition, as a specific object a display manner of which may be varied in the live stream or the like, the costume objects associated with the upper body region and the lower body region of the avatar object 610 are exemplified, but the example is not limited to this. A sock object associated with a foot, a hat object associated with a head portion, an earring object associated with an earlobe, or the like may also be used. A further specific object may be an object different from the avatar object 610, and may be, for example, a background object (such as, for example, a painting object hanging on a wall or a stuffed toy object that is a decoration), or the like.

(3) The example has been described in which individual messages with speech content and motions which are different among users can be received and played in the user terminals in the above described embodiment, but in addition to this, a configuration may be adopted where a common message with speech content and motions of the avatar object 610 which are common among the users can be received, and can be played at a timing at which a playback operation is performed by the user. The common message is transmitted from the server 200 at a timing at which a predetermined condition is met according to a degree of progress (such as a ranking) in the game, for example, and a message with such content as to appreciate the meeting of the predetermined condition is played. A predetermined condition in a next step is newly set for a user who has met the predetermined condition. In addition, in a case of a common message, similarly as in an individual message with privilege, along with playback of the common message, privilege may be awarded to a user who is viewing the common message (user who has met the predetermined condition). With this configuration, not only the message is provided but also the privilege is awarded for the meeting of the predetermined condition, so that the motivation to meet a predetermined condition set in the next step can be improved.

(4) In the above described embodiment, the example has been described in which by inputting a costume object according to an input operation from a user, the costume object associated with the avatar object 610 displayed in the first part such as the live stream is varied in only the user terminal of the user, but is not limited to this. The costume object of the avatar object 610 displayed in other user terminals may also be varied to the input costume object. For example, when a special condition is met such as a case where a special costume object (rare and valuable costume object) among a plurality of types of costume objects is input by a certain user, a manner may be adopted in which the avatar object 610 in the user terminals of all the users is associated with the special costume object to change the costume. With this configuration, it is possible to arouse a special feeling for all the users who are viewing the live stream, and the live stream can be enlivened.

(5) In the above described embodiment, as illustrated in FIG. 29, when the screen is switched to the information display screen, the motion of the avatar object 610 cannot be checked, but the configuration is not limited to this. Even on the information display screen, the motion display screen with a decreased transmittance, for example, may be displayed on a layer with a lower priority than a layer for displaying the information display screen. With this configuration, while the information display screen is checked, the motion display screen can also be checked, so that the convenience of the player can be improved.

(6) In the above described embodiment, the example has been described in which privilege is awarded along with playback of an individual message with privilege among individual messages, but is not limited to this, and all individual messages to be distributed after the end of the live stream may be set as individual messages with privilege. With this configuration, the participation commitment to the first part such as the live stream can be improved.

(7) The example has been described in which since the motion is decided randomly or the like, the motion data included in the data of the individual messages in the above described embodiment becomes the motion data that is different among the users. However, the motion of the avatar object 610 in the individual messages may be set as a common motion regardless of users, and the motion data included in the data of the individual messages may be set as motion data that is common among the users.

(8) In the above described embodiment, the example has been described in which individual messages with different speech content among the users are transmitted, but is not limited to this as long as an individual message with speech content different from that of a first user is transmitted to another user (second user). A case may also occur where an individual message with the same speech content as that of the first user is transmitted to another user (third user). In addition, the example has been described in which the individual message is transmitted for each user, but is not limited to this. For example, when users belong to any of a plurality of teams and a predetermined game is performed on a team-by-team basis, an individual message is transmitted for each team, and speech content may be different for each team. In this case, an individual message with the same speech content is transmitted to users belonging to a same team.

(9) In the above described embodiment, the live stream part has been exemplified as the first part, but the first part is not limited to this as long as the content is common among a plurality of users. For example, content of the live game illustrated in FIG. 11 may be used, and content for the users to view a situation in which the avatar object 610 sings live may be used. In addition, the first part is not limited to a part to be distributed in real time, and content for playing a previously recorded part may be used.

(10) In the above described embodiment, a video in which the avatar object 610 is moving is displayed on the display unit 152 based on the movement instruction data distributed by real-time rendering. However, the video may be displayed based on 360-degree moving picture data or the like to be distributed by a moving picture distribution system, for example. In addition, in a case of the 360-degree moving picture data, an image may be displayed from a perspective to be controlled according to a viewing mode.

Supplementary Notes

Supplementary notes of the items described in the above respective embodiments will be mentioned below.

(Supplementary Note 1):

According to an aspect of an embodiment illustrated in the present disclosure, there is provided a program which causes a first computer used by a first user to execute a game in which a plurality of users including the first user participates, the program causing the first computer to execute: in a first part (for example, a live stream part), displaying, based on first data, a video in a virtual space where a plurality of types of objects including a character object which moves is arranged, the first data being data that is received from outside and that is common among a plurality of computers used by the plurality of users; and in a second part (for example, a playback part), displaying, based on second data received from outside, a video including at least the character object among the plurality of types of objects, in which the second data is data which includes information for causing the character object to at least speak for a speech and which is transmitted from outside to any one or more computers including the first computer among the plurality of computers used by the plurality of users, and whose content of the speech is different from that of data transmitted to a second computer used by at least a second user among the plurality of computers (for example, FIG. 29), a specific object among a plurality of types of objects which can be displayed in the first part is an object whose display manner is variable (for example, FIG. 28), and a display manner of the specific object which can be displayed in the second part is a display manner of the specific object which is varied in the first part (for example, FIG. 30).

(Supplementary Note 2):

In (Supplementary note 1), the specific object is an object associated with a specific region of the character object.

(Supplementary Note 3):

In (Supplementary note 1) or (Supplementary note 2), along with the displaying of the video including the character object in the second part, the first computer is caused to execute awarding privilege to a user who is viewing the second part.

(Supplementary Note 4):

In (Supplementary note 3), the privilege to be awarded is decided at a predetermined timing after the second part is started.

(Supplementary Note 5):

In (Supplementary note 3), the privilege to be awarded is previously decided before the second part is started.

(Supplementary Note 6):

In any of (Supplementary note 1) to (Supplementary note 5), the first data includes motion data that is input by a performer who plays the character object, and the second data includes motion data that is randomly identified from among a plurality of predetermined types of motion data.

(Supplementary Note 7):

In (Supplementary note 6), motion data included in second data transmitted to the first computer is different from motion data included in second data transmitted to the second computer.

(Supplementary Note 8):

In any of (Supplementary note 1) to (Supplementary note 7), a display manner of a specific object which can be displayed in the first part is variable each time the first part is performed, and a display manner of a specific object which can be displayed in the second part in the first computer is a display manner of a specific object in a first part to be performed next time and which is, sometimes, the same as that of a specific object which can be displayed in a second part in the second computer.

(Supplementary Note 9):

In any of (Supplementary note 1) to (Supplementary note 8), a display manner of a specific object which can be displayed in the first part is variable according to an input operation from a user during a first part in a computer used by the user, and a display manner of a specific object which can be displayed in the second part in the first computer is a display manner which is varied according to an input operation from a first user during a most recently performed first part and which is, sometimes, different from that of a specific object which can be displayed in a second part in the second computer.

(Supplementary Note 10):

In any of (Supplementary note 1) to (Supplementary note 9), the first data includes data that is input by a performer who plays the character object and that is data live streamed in real time, and the first part includes content based on first data live streamed in real time.

(Supplementary Note 11):

In any of (Supplementary note 1) to (Supplementary note 10), the first computer is caused to execute displaying, at a timing in accordance with an input operation from a user, a predetermined video based on data that is received from outside at a predetermined timing and that is common among the plurality of computers used by the plurality of users, and is caused to execute awarding privilege.

(Supplementary Note 12):

There is provided a program for an information processing apparatus which transmits data to a computer which is caused to execute the program according to any of (Supplementary note 1) to (Supplementary note 11), the program causing the information processing apparatus to execute: in a third part, recording a sound spoken to each of a plurality of users including the first user by a performer who plays the character object; outputting data including audio information with which a sound recorded for the first user in the recording can be identified, to be transmitted to the first computer as the second data; and converting the sound recorded for the first user in the recording into a letter, and displaying the letter when a sound spoken to the first user is recorded in a new third part such that the performer can visually recognize the letter.

(Supplementary Note 13):

In (Supplementary note 12), in the outputting, second data including audio information recorded for each of a plurality of users in the recording is stored, and is output to a computer used by each of the plurality of users at a predetermined timing for simultaneous transmission.

(Supplementary Note 14):

According to an aspect of an embodiment illustrated in the present disclosure, there is provided a method of causing a first computer used by a first user to execute a program for executing a game in which a plurality of users including the first user participates, the method including: in a first part (for example, a live stream part), displaying, based on first data, a video in a virtual space where a plurality of types of objects including a character object which moves is arranged, the first data being data that is received from outside and that is common among a plurality of computers used by the plurality of users; and in a second part (for example, a playback part), displaying, based on second data received from outside, a video including at least the character object among the plurality of types of objects, in which the second data is data which includes information for causing the character object to at least speak for a speech and which is transmitted from outside to any one or more computers including the first computer among the plurality of computers used by the plurality of users, and whose content of the speech is different from that of data transmitted to a second computer used by at least a second user among the plurality of computers (for example, FIG. 29), a specific object among a plurality of types of objects which can be displayed in the first part is an object whose display manner is variable (for example, FIG. 28), and a display manner of the specific object which can be displayed in the second part is a display manner of the specific object which is varied in the first part (for example, FIG. 30).

(Supplementary Note 15):

According to an aspect of an embodiment illustrated in the present disclosure, there is provided an information processing apparatus which is used by a first user and which executes a game in which a plurality of users including the first user participates, the information processing apparatus including: a storage unit which stores a program for causing the information processing apparatus to execute the game; and a control unit which controls an operation of the information processing apparatus by executing the program, in which the control unit executes: in a first part (for example, a live stream part), displaying, based on first data, a video in a virtual space where a plurality of types of objects including a character object which moves is arranged, the first data being data that is received from outside and that is common among a plurality of information processing apparatuses used by the plurality of users; and in a second part (for example, a playback part), displaying, based on second data received from outside, a video including at least the character object among the plurality of types of objects, the second data is data which includes information for causing the character object to at least speak for a speech and which is transmitted from outside to any one or more information processing apparatuses including an information processing apparatus used by the first user among the plurality of information processing apparatuses used by the plurality of users, and whose content of the speech is different from that of data transmitted to an information processing apparatus used by at least a second user among the plurality of information processing apparatuses (for example, FIG. 29), a specific object among a plurality of types of objects which can be displayed in the first part is an object whose display manner is variable (for example, FIG. 28), and a display manner of the specific object which can be displayed in the second part is a display manner of the specific object which is varied in the first part (for example, FIG. 30).

Implementation Examples by Software

Control blocks (in particular, the control units 110, 210, 310, and 410) of the user terminal 100, the server 200, the game play terminal 300 (HMD set 1000), and the distribution terminal 400 may be realized by a logic circuit (hardware) formed by an integrated circuit (IC chip) or the like, or may be realized by software.

In a case of the latter, the user terminal 100, the server 200, the game play terminal 300 (HMD set 1000), and the distribution terminal 400 are each provided with a computer which executes a command of a program that is software which realizes each function. This computer includes, for example, one or more processors, and also includes a computer readable recording medium storing the program. Then, in the computer, when the processor reads the program from the recording medium to execute the program, so that an aim of the present invention is accomplished. For example, a central processing unit (CPU) can be used as the processor. A "non-transitory tangible medium" such as, for example, in addition to a read only memory (ROM) or the like, a tape, a disk, a card, a semiconductor memory, a programmable logic circuit, or the like can be used as the recording medium. In addition, a random access memory (RAM) or the like configured to develop the program may further be provided. In addition, the program may be supplied to the computer via any transmission medium (such as a communication network or broadcast waves) with which the program can be transmitted. Note that an aspect of the present invention may be achieved in a form of a data signal embedded in a carrier wave which is realized when the program is realized by electronic transmission.

The present invention is not limited to each of the above described embodiments, and various alterations can be made within a scope of claims. Embodiments obtained by appropriately combining technical means respectively disclosed in different embodiments are also included in the technical scope of the present invention.

EXPLANATION OF REFERENCES

1: system; 2: network; 3, 3A, 3B: user (first user); 4: player (performer); 10, 20, 30, 40: processor; 11, 21, 31, 41: memory; 12, 22, 32, 42: storage; 13, 23, 33, 43: communication IF; 14, 24, 34, 44: input and output IF; 15, 45: touch screen; 17: camera; 18: ranging sensor; 51: monitor; 52: gaze sensor; 53: first camera; 54: second camera; 55: microphone; 56: speaker; 100, 100A, 100B, 100C: user terminal (computer, first computer, first information processing apparatus); 110, 210, 310, 410: control unit (first control unit, second control unit); 111, 311, 413: operation acceptance unit; 112, 312, 412: display control unit; 113, 313: UI control unit; 114, 314: animation generation unit; 115, 315: game progress unit; 116, 316: virtual space control unit; 117: moving picture playback unit; 120, 220, 320, 420: storage unit (first storage unit, second storage unit); 131, 231, 331: game program (program, first program); 132, 232, 332: game information; 133, 233, 333: user information; 151, 451: input unit; 152, 452: display unit (display); 200: server; 211: communication mediation unit; 212: log generation unit; 213: list generation unit; 234, 421: user list; 300: game play terminal (external device, second external device); 317: reaction processing unit; 400: distribution terminal (outside, first external device, computer, second information processing apparatus); 411: communication control unit; 414: sound acceptance unit; 415: motion identification unit; 416: movement instruction data generation unit; 422: motion list; 423: distribution program (program, second program); 540, 1020, 1021: controller; 500: HMD; 510: HMD sensor; 520: motion sensor; 530: display; 600A, 600B: virtual space; 610: avatar object (character); 620A, 620B: virtual camera; 631, 632, 633, 634: object; 640A, 640B: field of view area; 650, 660: field of view image; 671: enemy object; 672, 673: obstacle object; 674: dramatization object; 691, 692: speech; 701, 702, 703A, 70B, 704A, 704B, 705, 706, 711, 711A, 711B, 711C, 711D, 722, 723, 745, 745A, 745B, 745C, 752, 762, 763, 930, 2011, 2022, 2031, 2032, 2033, 2034, 2037, 2038, 2051, 2063, 2072, 2073, 2075: UI image (message UI, UI); 721: download screen; 731: user list screen (list); 732, 732A, 732B, 732C, 742, 742A, 742B, 742C: record image; 733, 733A, 733B, 733C: username; 734, 734A, 734B, 734C: tag information; 735, 735A, 735B, 735C: icon; 741: motion list screen (choice); 743, 743A, 743B, 743C: motion name; 744, 744A, 744B, 744C, 753: motion image; 751: distribution screen; 761: distribution completion screen; 810A, 810B: motion moving picture; 820A, 820B: speech sound; 910A, 910B: moving picture; 920A, 920B: sound; 1000: HMD set; 1010: object; 1030: storage medium.

What is claimed is:

1. A non-transitory computer-readable storage medium storing a program which causes a first computer used by a first user to execute a game in which a plurality of users including the first user participates, the program causing the first computer to execute:

in a first part, displaying, based on first data, a video in a virtual space where a plurality of types of objects including a character object which moves is arranged, the first data being data that is received from outside and that is common among a plurality of computers used by the plurality of users; and in a second part, displaying, based on second data received from outside, a video including at least the character object among the plurality of types of objects, wherein the second data is data which includes information for causing the character object to at least speak for a speech and which is transmitted from outside to any one or more computers including the first computer among the plurality of computers used by the plurality of users, and whose content of the speech is different from that of data transmitted to a second computer used by at least a second user among the plurality of computers, a specific object among a plurality of types of objects which can be displayed in the first part is an object whose display manner is variable, a display manner of the specific object which can be displayed in the second part is a display manner of the specific object which is varied in the first part, the first data includes motion data that is input by a performer who plays the character object in the game, one or more of the users participate in the game but are not players in the game, and the one or more of the users who participate in the game but are not players in the game are able to participate in the game in a way that can affect the outcome of the game.

2. The storage medium according to claim 1, wherein the specific object is an object associated with a specific region of the character object.

3. The storage medium according to claim 2, wherein the program causes, along with the displaying of the video including the character object in the second part, the first computer to execute awarding privilege to a user who is viewing the second part.

4. The storage medium according to claim 2, wherein
the second data includes motion data that is randomly identified from among a plurality of predetermined types of motion data.

5. The storage medium according to claim 2, wherein
a display manner of a specific object which can be displayed in the first part is variable each time the first part is performed, and
a display manner of a specific object which can be displayed in the second part in the first computer is a display manner which is of a specific object in a first part to be performed next time and which is, sometimes, the same as that of a specific object which can be displayed in the second part in the second computer.

6. The storage medium according to claim 2, wherein
a display manner of a specific object which can be displayed in the first part is variable according to an input operation from a user during a first part in a computer used by the user, and
a display manner of a specific object which can be displayed in the second part in the first computer is a display manner which is varied according to an input operation from a first user during a most recently performed first part and which is, sometimes, different from that of a specific object which can be displayed in the second part in the second computer.

7. The storage medium according to claim 2, wherein
the character is live streamed in real time, and
the first part includes content based on first data live streamed in real time.

8. The storage medium according to claim 1, wherein the program causes, along with the displaying of the video including the character object in the second part, the first computer to execute awarding privilege to a user who is viewing the second part.

9. The storage medium according to claim 8, wherein the privilege to be awarded is decided at a predetermined timing after the second part is started.

10. The storage medium according to claim 8, wherein the privilege to be awarded is previously decided before the second part is started.

11. The storage medium according to claim 1, wherein
the second data includes motion data that is randomly identified from among a plurality of predetermined types of motion data.

12. The storage medium according to claim 11, wherein motion data included in second data transmitted to the first computer is different from motion data included in second data transmitted to the second computer.

13. The storage medium according to claim 1, wherein
a display manner of a specific object which can be displayed in the first part is variable each time the first part is performed, and
a display manner of a specific object which can be displayed in the second part in the first computer is a display manner which is of a specific object in a first part to be performed next time and which is, sometimes, the same as that of a specific object which can be displayed in the second part in the second computer.

14. The storage medium according to claim 1, wherein
a display manner of a specific object which can be displayed in the first part is variable according to an input operation from a user during a first part in a computer used by the user, and
a display manner of a specific object which can be displayed in the second part in the first computer is a display manner which is varied according to an input operation from a first user during a most recently performed first part and which is, sometimes, different from that of a specific object which can be displayed in the second part in the second computer.

15. The storage medium according to claim 1, wherein
the character is live streamed in real time, and
the first part includes content based on first data live streamed in real time.

16. The storage medium according to claim 1, wherein the program causes the first computer to execute displaying, at a timing in accordance with an input operation from a user, a predetermined video based on data that is received from outside at a predetermined timing and that is common among the plurality of computers used by the plurality of users, and awarding privilege.

17. A storage medium storing a program for an information processing apparatus which transmits data to a computer which is caused to execute the program stored in the storage medium according to claim 1, the program causing the information processing apparatus to execute:
in a third part, recording a sound spoken to each of a plurality of users including the first user by a performer who plays the character object;
outputting data including audio information with which a sound recorded for the first user in the recording can be identified, to be transmitted to the first computer as the second data; and
converting the sound recorded for the first user in the recording into a letter, and displaying the letter when a sound spoken to the first user is recorded in a new third part such that the performer can visually recognize the letter.

18. The storage medium according to claim 17, wherein in the outputting, second data including audio information recorded for each of a plurality of users in the recording is stored, and is output to a computer used by each of the plurality of users at a predetermined timing for simultaneous transmission.

19. A method of causing a first computer used by a first user to execute a program for executing a game in which a plurality of users including the first user participates, the method comprising:
in a first part, displaying, based on first data, a video in a virtual space where a plurality of types of objects including a character object which moves is arranged, the first data being data that is received from outside and that is common among a plurality of computers used by the plurality of users; and
in a second part, displaying, based on second data received from outside, a video including at least the character object among the plurality of types of objects, wherein
the second data is data which includes information for causing the character object to at least speak for a speech and which is transmitted from outside to any one or more computers including the first computer among the plurality of computers used by the plurality of users, and whose content of the speech is different from that of data transmitted to a second computer used by at least a second user among the plurality of computers,
a specific object among a plurality of types of objects which can be displayed in the first part is an object whose display manner is variable,
a display manner of the specific object which can be displayed in the second part is a display manner of the specific object which is varied in the first part;
the first data includes motion data that is input by a performer who plays the character object in the game;
one or more of the users participate in the game but are not players in the game; and
the one or more of the users who participate in the game but are not players in the game are able to participate in the game in a way that can affect the outcome of the game.

20. An information processing apparatus which is used by a first user and which executes a game in which a plurality of users including the first user participates,
the information processing apparatus comprising:
a storage unit which stores a program for causing the information processing apparatus to execute the game; and
a control unit which controls an operation of the information processing apparatus by executing the program, wherein
the control unit executes:
in a first part, displaying, based on first data, a video in a virtual space where a plurality of types of objects including a character object which moves is arranged, the first data being data that is received from outside and that is common among a plurality of information processing apparatuses used by the plurality of users; and in a second part, displaying, based on second data received from outside, a video including at least the character object among the plurality of types of objects, wherein the second data is data which includes information for causing the character object to at least speak for a speech and which is transmitted from outside to any one or more information processing apparatuses including an information processing apparatus used by the first user among the plurality of information processing apparatuses used by the plurality of users, and whose content of the speech is different from that of data transmitted to an information processing apparatus used by at least a second user among the plurality of information processing apparatuses, a specific object among a plurality of types of objects which can be displayed in the first part is an object whose display manner is variable, a display manner of the specific object which can be displayed in the second part is a display manner of the specific object which is varied in the first part, the first data includes motion data that is input by a performer who plays the character object in the game, one or more of the users participate in the game but are not players in the game, and the one or more of the users who participate in the game but are not players in the game are able to participate in the game in a way that can affect the outcome of the game.

\* \* \* \* \*